(12) United States Patent
Miller et al.

(10) Patent No.: US 8,681,456 B1
(45) Date of Patent: Mar. 25, 2014

(54) CO-LOCATED GIMBAL-BASED DUAL STAGE ACTUATION DISK DRIVE SUSPENSIONS

(71) Applicant: Hutchinson Technology Incorporated, Hutchinson, MN (US)

(72) Inventors: Mark A. Miller, Darwin, MN (US); Jacob D. Bjorstrom, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/026,427

(22) Filed: Sep. 13, 2013

Related U.S. Application Data

(60) Provisional application No. 61/700,972, filed on Sep. 14, 2012.

(51) Int. Cl.
*G11B 5/55* (2006.01)
(52) U.S. Cl.
USPC .................................... 360/294.3; 360/245.3
(58) Field of Classification Search
CPC .. G11B 5/5552; G11B 5/4826; G11B 5/4873; G11B 5/4853; G11B 5/596
USPC ............. 360/294.3, 294.4, 245.3, 245.1, 245, 360/264.3, 264.5
See application file for complete search history.

(56) References Cited

U.S. PATENT DOCUMENTS

| | | | |
|---|---|---|---|
| 3,320,556 | A | 5/1967 | Schneider |
| 4,418,239 | A | 11/1983 | Larson et al. |
| 5,140,288 | A | 8/1992 | Grunwell |
| 5,321,568 | A | 6/1994 | Hatam-Tabrizi |
| 5,333,085 | A | 7/1994 | Prentice et al. |
| 5,427,848 | A | 6/1995 | Baer et al. |
| 5,459,921 | A | 10/1995 | Hudson et al. |
| 5,598,307 | A | 1/1997 | Bennin |
| 5,608,591 | A | 3/1997 | Klaassen |

(Continued)

FOREIGN PATENT DOCUMENTS

| | | |
|---|---|---|
| EP | 0591954 B1 | 4/1994 |
| EP | 0834867 B1 | 5/2007 |

(Continued)

OTHER PUBLICATIONS

U.S. Appl. No. 13/955,204 entitled Damped Dual Stage Actuation Disk Drive Suspensions, filed Jul. 31, 2013.

(Continued)

*Primary Examiner* — Brian Miller
(74) *Attorney, Agent, or Firm* — Faegre Baker Daniels LLP

(57) ABSTRACT

Various embodiments concern a suspension having a DSA structure on a gimbaled flexure. The suspension comprises a loadbeam and flexure attached thereto. The flexure comprises a pair of spring arms, a tongue located between the spring arms and structurally supported by the pair of spring arms, and a pair of struts. The struts are positioned respectively between the pair of spring arms and the tongue. The longitudinal axes of the struts are offset with respect to each other. The suspension further comprises a slider and a motor mounted on the flexure. The motor has a longitudinal axis that is parallel with the axes of the struts and perpendicular to a longitudinal axis of the loadbeam. Electrical activation of the motor bends the pair of struts to move the slider.

27 Claims, 53 Drawing Sheets

(56) References Cited

U.S. PATENT DOCUMENTS

| | | |
|---|---|---|
| 5,631,786 A | 5/1997 | Erpelding |
| 5,636,089 A | 6/1997 | Jurgenson et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,717,547 A | 2/1998 | Young |
| 5,734,526 A | 3/1998 | Symons |
| 5,737,152 A | 4/1998 | Balakrishnan |
| 5,764,444 A | 6/1998 | Imamura et al. |
| 5,790,347 A | 8/1998 | Girard |
| 5,796,552 A | 8/1998 | Akin, Jr. et al. |
| 5,805,382 A | 9/1998 | Lee et al. |
| 5,812,344 A | 9/1998 | Balakrishnan |
| 5,862,010 A | 1/1999 | Simmons et al. |
| 5,892,637 A | 4/1999 | Brooks, Jr. et al. |
| 5,921,131 A | 7/1999 | Stange |
| 5,924,187 A | 7/1999 | Matz |
| 5,973,884 A | 10/1999 | Hagen |
| 5,986,853 A | 11/1999 | Simmons et al. |
| 5,995,328 A | 11/1999 | Balakrishnan |
| 6,011,671 A | 1/2000 | Masse et al. |
| 6,038,102 A | 3/2000 | Balakrishnan et al. |
| 6,055,132 A | 4/2000 | Arya et al. |
| 6,075,676 A | 6/2000 | Hiraoka et al. |
| 6,078,470 A | 6/2000 | Danielson et al. |
| 6,108,175 A * | 8/2000 | Hawwa et al. ............ 360/294.4 |
| 6,118,637 A | 9/2000 | Wright et al. |
| 6,144,531 A | 11/2000 | Sawai |
| 6,146,813 A | 11/2000 | Girard et al. |
| 6,157,522 A | 12/2000 | Murphy et al. |
| 6,172,853 B1 | 1/2001 | Davis et al. |
| 6,246,546 B1 | 6/2001 | Tangren |
| 6,246,552 B1 | 6/2001 | Soeno et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,297,936 B1 * | 10/2001 | Kant et al. ............... 360/294.4 |
| 6,300,846 B1 | 10/2001 | Brunker |
| 6,320,730 B1 * | 11/2001 | Stefansky et al. ......... 360/294.4 |
| 6,376,964 B1 | 4/2002 | Young et al. |
| 6,396,667 B1 * | 5/2002 | Zhang et al. ............. 360/294.3 |
| 6,399,899 B1 | 6/2002 | Ohkawa et al. |
| 6,400,532 B1 | 6/2002 | Mei |
| 6,404,594 B1 | 6/2002 | Maruyama et al. |
| 6,424,500 B1 | 7/2002 | Coon et al. |
| 6,445,546 B1 | 9/2002 | Coon |
| 6,493,190 B1 | 12/2002 | Coon |
| 6,493,192 B2 * | 12/2002 | Crane et al. ............. 360/294.3 |
| 6,549,736 B2 | 4/2003 | Miyabe et al. |
| 6,596,184 B1 | 7/2003 | Shum et al. |
| 6,597,541 B2 | 7/2003 | Nishida et al. |
| 6,621,653 B1 | 9/2003 | Schirle |
| 6,636,388 B2 | 10/2003 | Stefansky |
| 6,639,761 B1 | 10/2003 | Boutaghou et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,714,384 B2 | 3/2004 | Himes et al. |
| 6,714,385 B1 | 3/2004 | Even et al. |
| 6,728,057 B2 | 4/2004 | Putnam |
| 6,728,077 B1 * | 4/2004 | Murphy ................... 360/294.4 |
| 6,735,055 B1 * | 5/2004 | Crane et al. ............. 360/294.6 |
| 6,737,931 B2 | 5/2004 | Amparan et al. |
| 6,738,225 B1 | 5/2004 | Summers et al. |
| 6,741,424 B1 | 5/2004 | Danielson et al. |
| 6,760,196 B1 * | 7/2004 | Niu et al. ................ 360/294.6 |
| 6,762,913 B1 | 7/2004 | Even et al. |
| 6,765,761 B2 | 7/2004 | Arya |
| 6,791,802 B2 | 9/2004 | Watanabe et al. |
| 6,798,597 B1 | 9/2004 | Aram et al. |
| 6,801,402 B1 | 10/2004 | Subrahmanyam et al. |
| 6,839,204 B2 | 1/2005 | Shiraishi et al. |
| 6,841,737 B2 | 1/2005 | Komatsubara et al. |
| 6,898,042 B2 * | 5/2005 | Subrahmanyan ............. 360/75 |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 * | 2/2006 | Summers ................. 360/294.4 |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 * | 6/2006 | Niu et al. ................ 360/245.4 |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,159,300 B2 | 1/2007 | Yao et al. |
| 7,161,765 B2 * | 1/2007 | Ichikawa et al. .......... 360/234.5 |
| 7,161,767 B2 | 1/2007 | Hernandez et al. |
| 7,256,968 B1 | 8/2007 | Krinke |
| 7,271,958 B2 | 9/2007 | Yoon et al. |
| 7,336,436 B2 | 2/2008 | Sharma et al. |
| 7,342,750 B2 | 3/2008 | Yang et al. |
| 7,345,851 B2 * | 3/2008 | Hirano et al. ............ 360/294.4 |
| 7,375,930 B2 | 5/2008 | Yang et al. |
| 7,379,274 B2 * | 5/2008 | Yao et al. ............... 360/294.4 |
| 7,382,582 B1 | 6/2008 | Cuevas |
| 7,408,745 B2 | 8/2008 | Yao et al. |
| 7,417,830 B1 | 8/2008 | Kulangara |
| 7,460,337 B1 | 12/2008 | Mei |
| 7,466,520 B2 | 12/2008 | White et al. |
| 7,499,246 B2 * | 3/2009 | Nakagawa ............... 360/294.4 |
| 7,595,965 B1 | 9/2009 | Kulangara et al. |
| 7,643,252 B2 | 1/2010 | Arai et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,701,673 B2 | 4/2010 | Wang et al. |
| 7,701,674 B2 | 4/2010 | Arai |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 * | 8/2010 | Yao et al. ............... 360/294.4 |
| 7,782,572 B2 | 8/2010 | Pro |
| 7,821,742 B1 | 10/2010 | Mei |
| 7,835,113 B1 | 11/2010 | Douglas |
| 7,875,804 B1 | 1/2011 | Tronnes et al. |
| 7,923,644 B2 | 4/2011 | Ishii et al. |
| 7,924,530 B1 | 4/2011 | Chocholaty |
| 7,983,008 B2 | 7/2011 | Liao et al. |
| 7,986,494 B2 | 7/2011 | Pro |
| 8,004,798 B1 | 8/2011 | Dunn |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,436 B2 | 3/2012 | Iriuchijima et al. |
| 8,149,542 B2 | 4/2012 | Ando |
| 8,161,626 B2 | 4/2012 | Ikeji |
| 8,169,746 B1 | 5/2012 | Rice et al. |
| 8,194,359 B2 | 6/2012 | Yao et al. |
| 8,248,735 B2 | 8/2012 | Fujimoto et al. |
| 8,264,797 B2 | 9/2012 | Emley |
| 8,289,652 B2 | 10/2012 | Zambri et al. |
| 8,295,012 B1 | 10/2012 | Tian et al. |
| 8,310,790 B1 * | 11/2012 | Fanslau, Jr. ............. 360/294.4 |
| 8,331,061 B2 | 12/2012 | Hanya et al. |
| 8,339,748 B2 | 12/2012 | Shum et al. |
| 8,363,361 B2 | 1/2013 | Hanya et al. |
| 8,379,349 B1 | 2/2013 | Pro et al. |
| 8,446,694 B1 | 5/2013 | Tian et al. |
| 8,456,780 B1 | 6/2013 | Ruiz |
| 8,498,082 B1 | 7/2013 | Padeski et al. |

(56) References Cited

U.S. PATENT DOCUMENTS

| | | |
|---|---|---|
| 8,526,142 B1 | 9/2013 | Dejkoonmak et al. |
| 8,559,137 B2 | 10/2013 | Imuta |
| 2001/0012181 A1 | 8/2001 | Inoue et al. |
| 2002/0149888 A1 | 10/2002 | Motonishi et al. |
| 2003/0053258 A1 | 3/2003 | Dunn et al. |
| 2003/0174445 A1 | 9/2003 | Luo |
| 2003/0202293 A1 | 10/2003 | Nakamura et al. |
| 2004/0027727 A1 | 2/2004 | Shimizu et al. |
| 2004/0070884 A1 | 4/2004 | Someya et al. |
| 2004/0125508 A1* | 7/2004 | Yang et al. .............. 360/294.3 |
| 2005/0061542 A1 | 3/2005 | Aonuma et al. |
| 2005/0063097 A1 | 3/2005 | Maruyama et al. |
| 2005/0105217 A1* | 5/2005 | Kwon et al. .............. 360/245.3 |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0193086 A1* | 8/2006 | Zhu et al. .............. 360/294.4 |
| 2006/0209465 A1 | 9/2006 | Takikawa et al. |
| 2006/0238924 A1* | 10/2006 | Gatzen .............. 360/294.4 |
| 2007/0133128 A1 | 6/2007 | Arai |
| 2007/0223146 A1* | 9/2007 | Yao et al. .............. 360/294.4 |
| 2007/0253176 A1 | 11/2007 | Ishii et al. |
| 2008/0144225 A1 | 6/2008 | Yao et al. |
| 2008/0192384 A1 | 8/2008 | Danielson et al. |
| 2008/0198511 A1* | 8/2008 | Hirano et al. .............. 360/294.4 |
| 2008/0273266 A1 | 11/2008 | Pro |
| 2008/0273269 A1 | 11/2008 | Pro |
| 2009/0080117 A1 | 3/2009 | Shimizu et al. |
| 2009/0244786 A1* | 10/2009 | Hatch .............. 360/294.4 |
| 2010/0067151 A1 | 3/2010 | Okawara et al. |
| 2010/0177445 A1 | 7/2010 | Fuchino |
| 2010/0290158 A1 | 11/2010 | Hanya et al. |
| 2011/0096438 A1* | 4/2011 | Takada et al. .............. 360/244.2 |
| 2011/0228425 A1 | 9/2011 | Liu et al. |
| 2011/0242708 A1 | 10/2011 | Fuchino |
| 2012/0002329 A1 | 1/2012 | Shum et al. |
| 2012/0087041 A1* | 4/2012 | Ohsawa .............. 360/234.5 |
| 2013/0020112 A1* | 1/2013 | Ohsawa .............. 174/255 |
| 2013/0242434 A1 | 9/2013 | Bjorstrom et al. |
| 2013/0242436 A1 | 9/2013 | Yonekura et al. |
| 2013/0265674 A1* | 10/2013 | Fanslau .............. 360/245.3 |

FOREIGN PATENT DOCUMENTS

| | | |
|---|---|---|
| JP | 9198825 A | 7/1997 |
| JP | 10003632 A | 1/1998 |
| JP | 2001202731 A | 7/2001 |
| JP | 2002170607 A | 6/2002 |
| JP | 2003223771 A | 8/2003 |
| JP | 2004039056 A | 2/2004 |
| JP | 2005209336 A | 8/2005 |
| WO | WO9820485 A1 | 5/1998 |

OTHER PUBLICATIONS

U.S. Appl. No. 13/972,137 entitled Co-Located Gimbal-Based Dual Stage Actuation Disk Drive Suspensions With Offset Motors, filed Aug. 21, 2013.

U.S. Appl. No. 14/044,238 entitled Co-Located Gimbal-Based Dual Stage Actuation Disk Drive Suspensions With Motor Stifeners, filed Oct. 2, 2013.

U.S. Appl. No. 14/050,060 entitled Co-Located Gimbal-Based Dual Stage Actuation Disk Drive Suspensions With Dampers, filed Oct. 10, 2013.

International Search Report and Written Opinion issued in PCT/US2013/031484, mailed May 30, 2013, 13 pages.

U.S. Appl. No. 13/827,622 entitled Mid-Loadbeam Dual Stage Actuated (DSA) Disk Drive Head Suspension, filed Mar. 14, 2013.

U.S. Appl. No. 13/365,443 entitled Elongated Trace Tethers for Disk Drive Head Suspension Flexures, filed Feb. 3, 2012.

U.S. Appl. No. 13/690,883 entitled Microstructure Patterned Surfaces for Integrated Lead Head Suspensions, filed Nov. 30, 2012.

U.S. Appl. No. 14/056,481 entitled Two-Motor Co-Located Gimbal-Based Dual Stage Actuation Disk Drive Suspensions With Motor Stiffeners, filed Oct. 17, 2013.

U.S. Appl. No. 14/103,955 entitled Electrical Contacts to Motors in Dual Stage Actuated Suspensions, filed Dec. 12, 2013.

U.S. Appl. No. 14/141,617 entitled Disk Drive Suspension Assembly Having a Partially Flangeless Load Point Dimple, filed Dec. 27, 2013, 53 pages.

U.S. Appl. No. 14/145,515 entitled Balanced Co-Located Gimbal-Based Dual Stage Actuation Disk Drive Suspensions, filed Dec. 31, 2013, 39 pages.

* cited by examiner

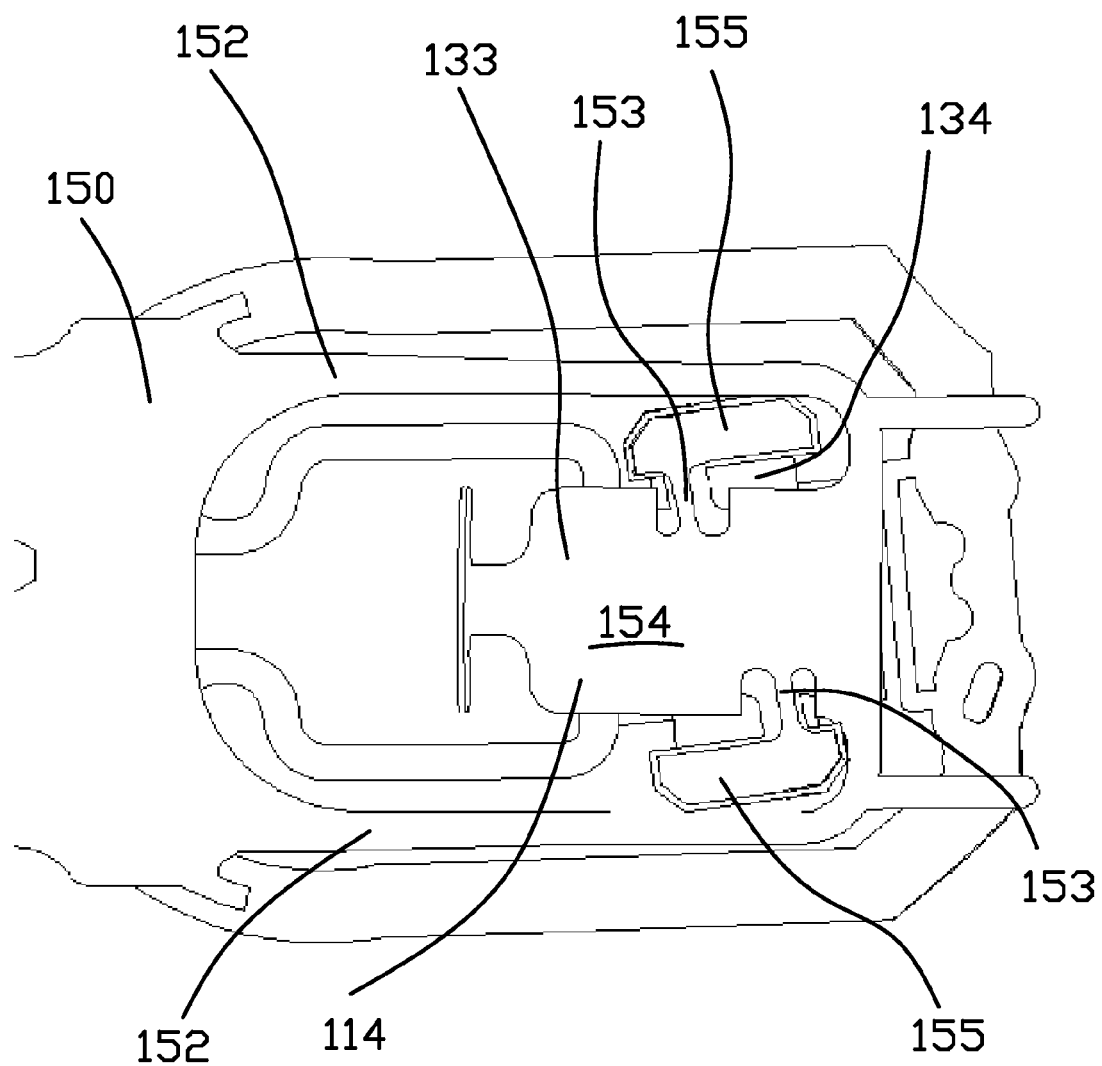
FIG 16A1

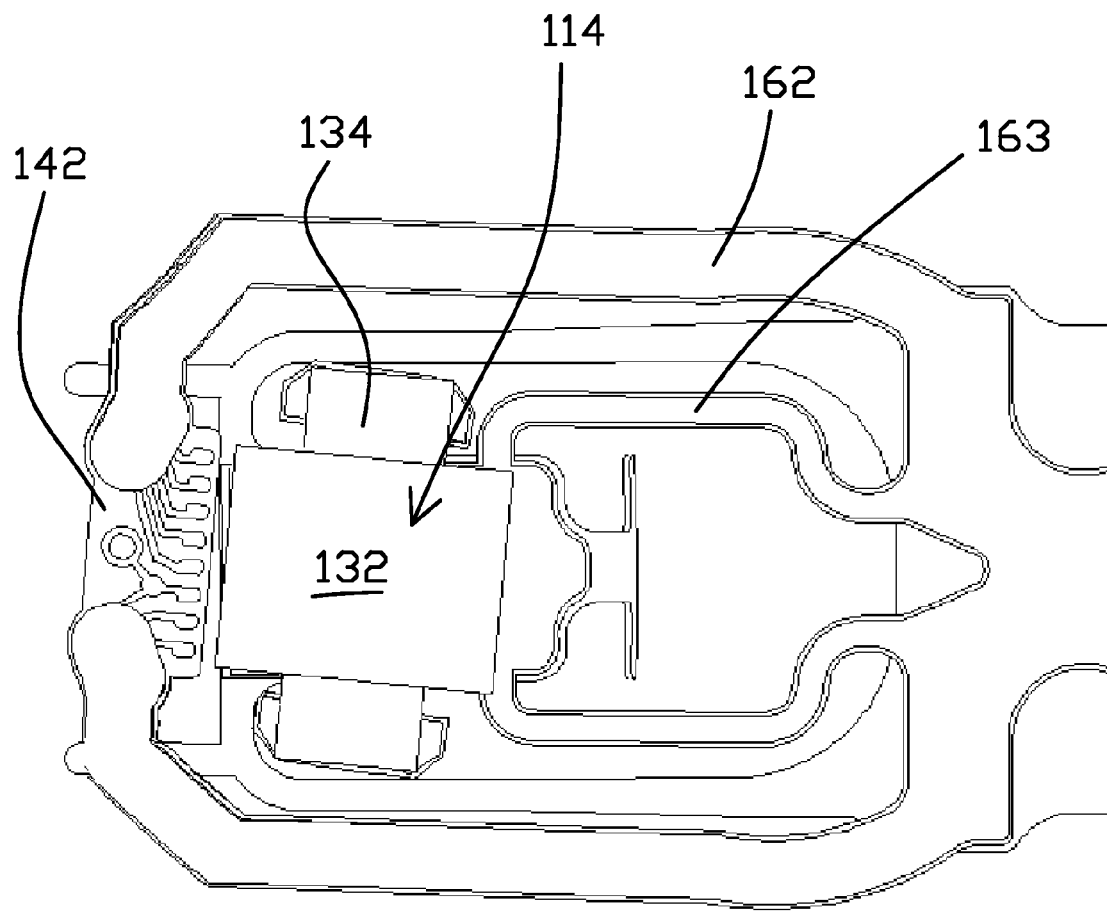
FIG 16A2

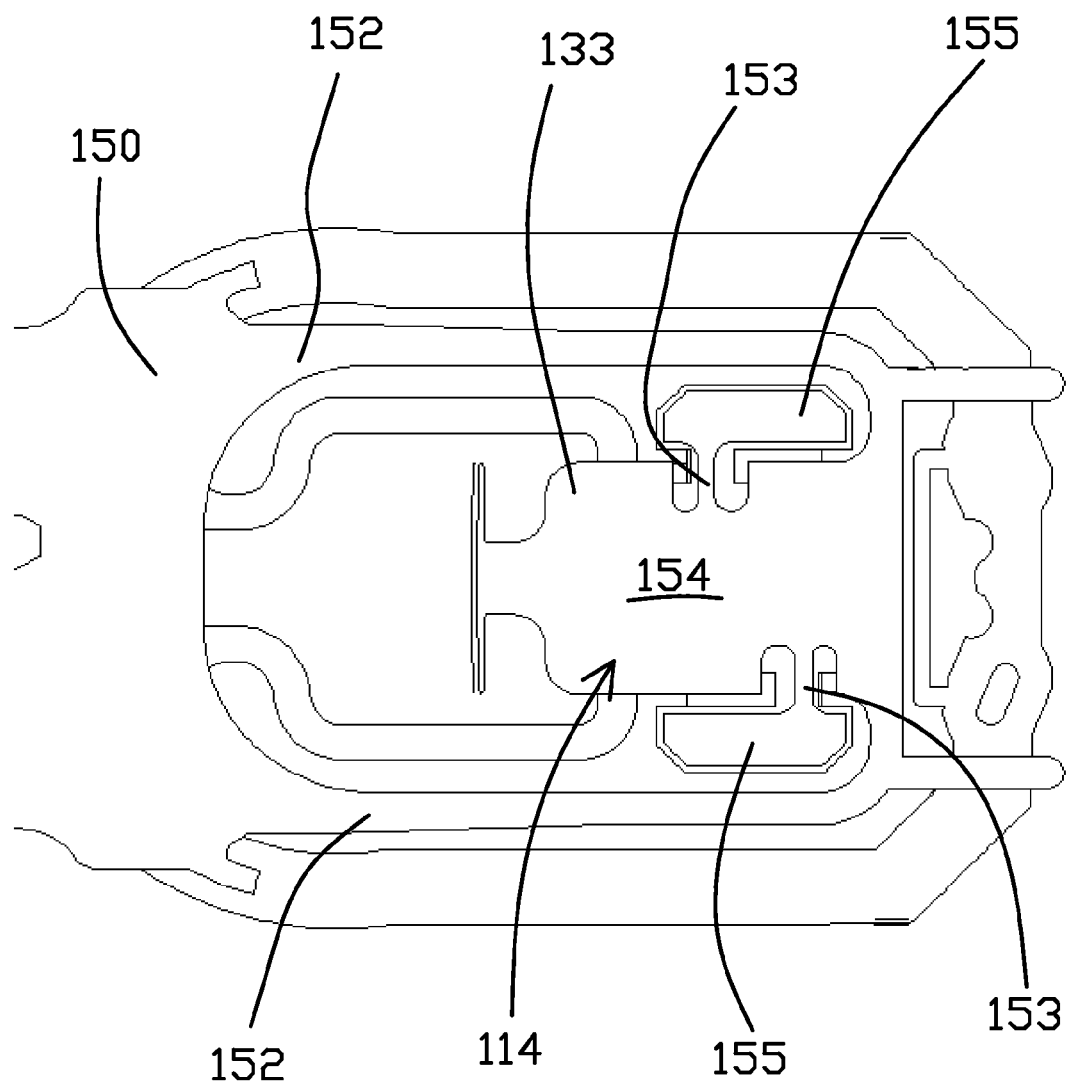
FIG 16B1

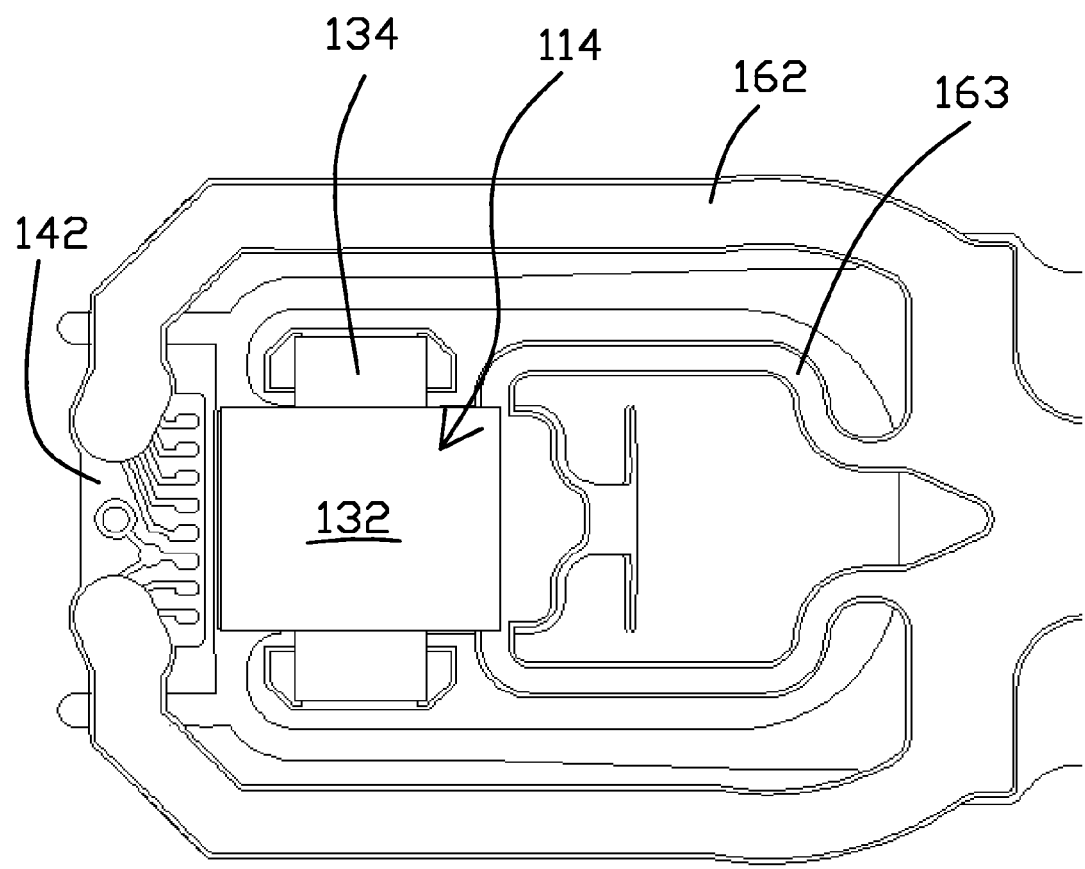
FIG 16B2

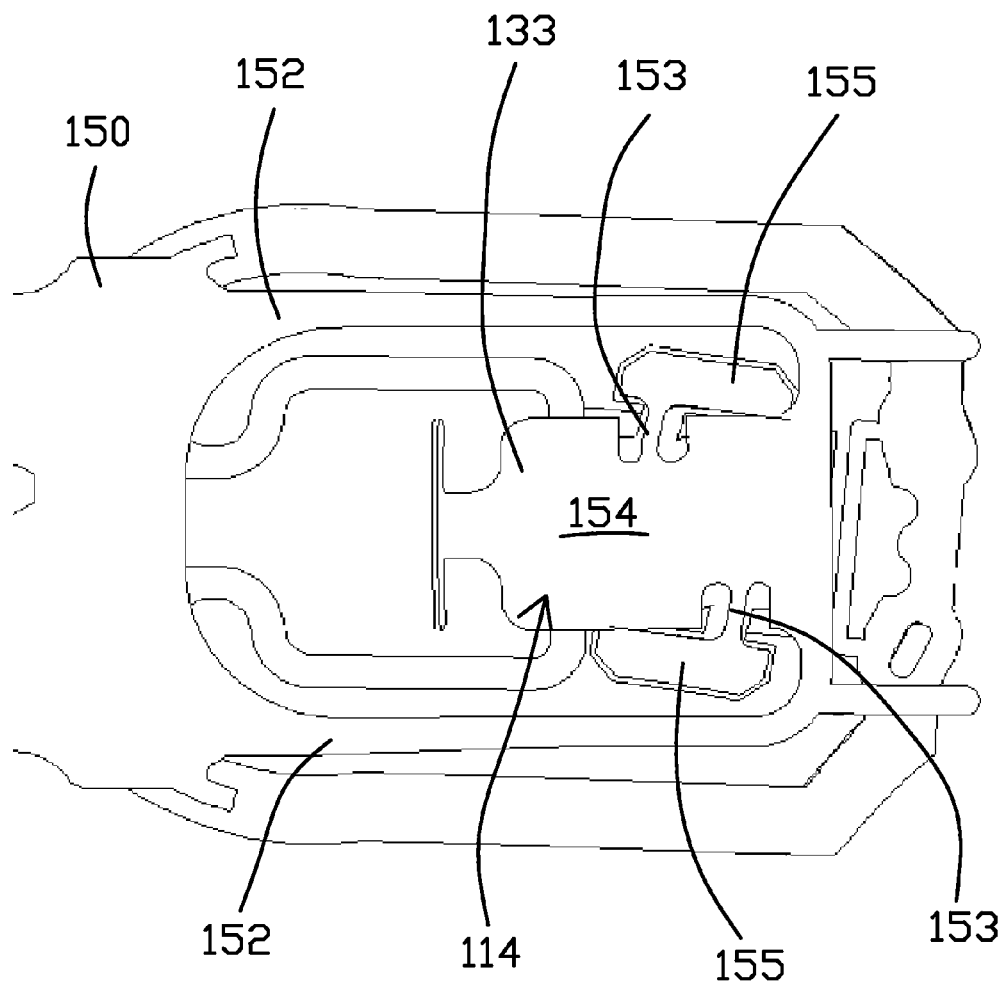
FIG 16C1

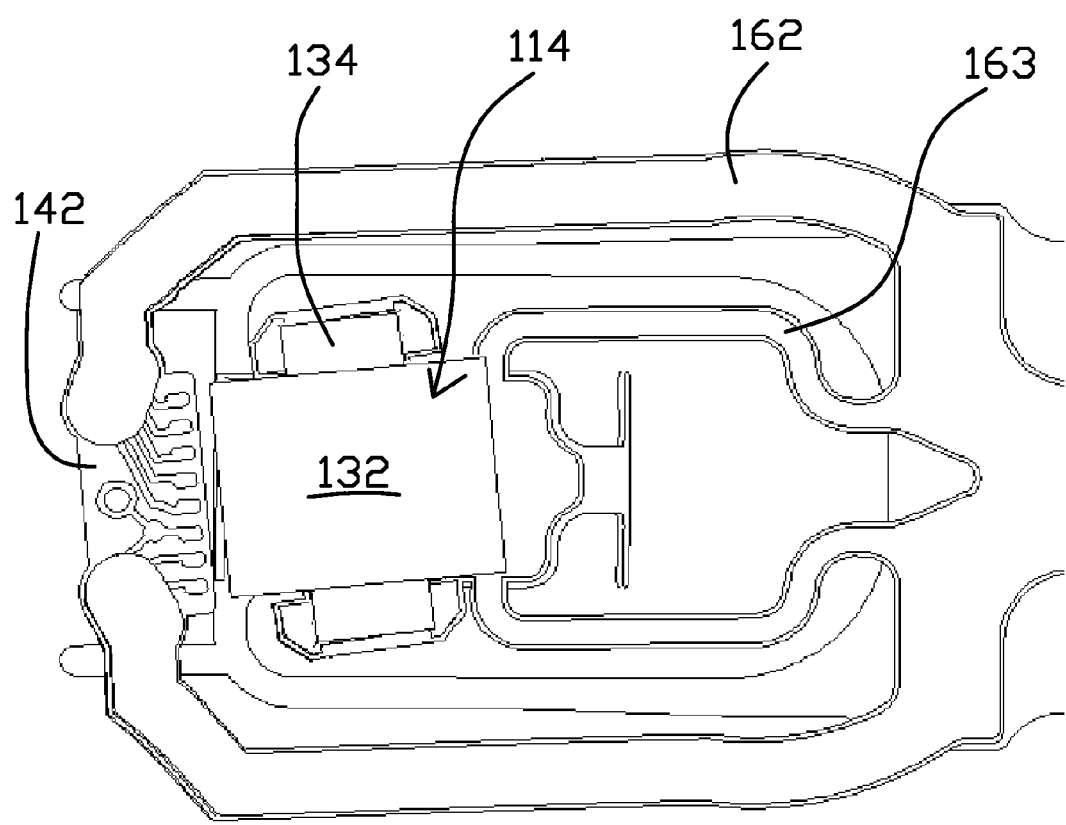
FIG 16C2

CO-LOCATED GIMBAL-BASED DUAL STAGE ACTUATION DISK DRIVE SUSPENSIONS

CROSS-REFERENCE TO RELATED APPLICATION

This application claims the benefit of U.S. Provisional Application No. 61/700,972, filed Sep. 14, 2012, which is herein incorporated by reference in its entirety and for all purposes.

TECHNICAL FIELD

The present invention relates to disk drives and suspensions for disk drives. In particular, the invention is a dual stage actuation (DSA) suspension.

BACKGROUND

DSA disk drive head suspensions and disk drives incorporating DSA suspensions are generally known and commercially available. For example, DSA suspensions having an actuation structure on the baseplate or other mounting portion of the suspension, i.e., proximal to the spring or hinge region of the suspension, are described in the Okawara U.S. Patent Publication No. 2010/0067151, the Shum U.S. Patent Publication No. 2012/0002329, the Fuchino U.S. Patent Publication No. 2011/0242708 and the Imamura U.S. Pat. No. 5,764,444. DSA suspensions having actuation structures located on the loadbeam or gimbal portions of the suspension, i.e., distal to the spring or hinge region, are also known and disclosed, for example, in the Jurgenson U.S. Pat. No. 5,657,188, the Krinke U.S. Pat. No. 7,256,968 and the Yao U.S. Patent Publication No. 2008/0144225. All of the above-identified patents and patent applications are incorporated herein by reference in their entirety and for all purposes.

There remains a continuing need for improved DSA suspensions. DSA suspensions with enhanced performance capabilities are desired. The suspensions should be capable of being efficiently manufactured.

SUMMARY

Various embodiments concern a suspension having a dual stage actuation structure on a gimbaled flexure. The suspension comprises a loadbeam having a longitudinal axis and flexure attached to the loadbeam. The flexure comprises a pair of spring arms, a tongue located between the spring arms and structurally supported by the pair of spring arms, and a pair of struts. The struts are positioned respectively between the pair of spring arms and the tongue. Each strut has a longitudinal axis. The longitudinal axes of the struts are parallel and offset with respect to each other. The suspension further comprises a slider and a motor mounted on the flexure. The motor has a longitudinal axis that is parallel with the axes of the struts and perpendicular to a longitudinal axis of the loadbeam. Electrical activation of the motor bends the pair of struts to move the slider.

Various embodiments concern a suspension having a dual stage actuation structure on a gimbaled flexure. The suspension comprises flexure which itself comprises a pair of spring arms, a tongue located between the spring arms, and a pair of struts, the pair of struts respectively connecting the pair of spring arms and the tongue. The suspension further comprises a slider mounted on the tongue. The suspension further comprises a motor having opposite ends respectively mounted on the pair of spring arms. Electrical activation of the motor bends the pair of struts to move the slider. Such activation rotates the tongue while the spring arms remain relatively stationary.

Various embodiments concern a suspension having a dual stage actuation structure on a gimbaled flexure. The flexure comprises a pair of spring arms, a tongue located between the spring arms and structurally supported by the pair of spring arms, and a pair of motor mounting pads, the motor mounting pads respectively connected to the tongue by a pair of struts. The suspension further comprises a slider and a motor having opposite ends respectively mounted on the pair of motor mounting pads, wherein the slider is mounted on the motor and electrical activation of the motor bends the pair of struts and moves the slider. The tongue remains relatively stationary while the slider is moved by electrical activation of the motor.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

Figure 9:
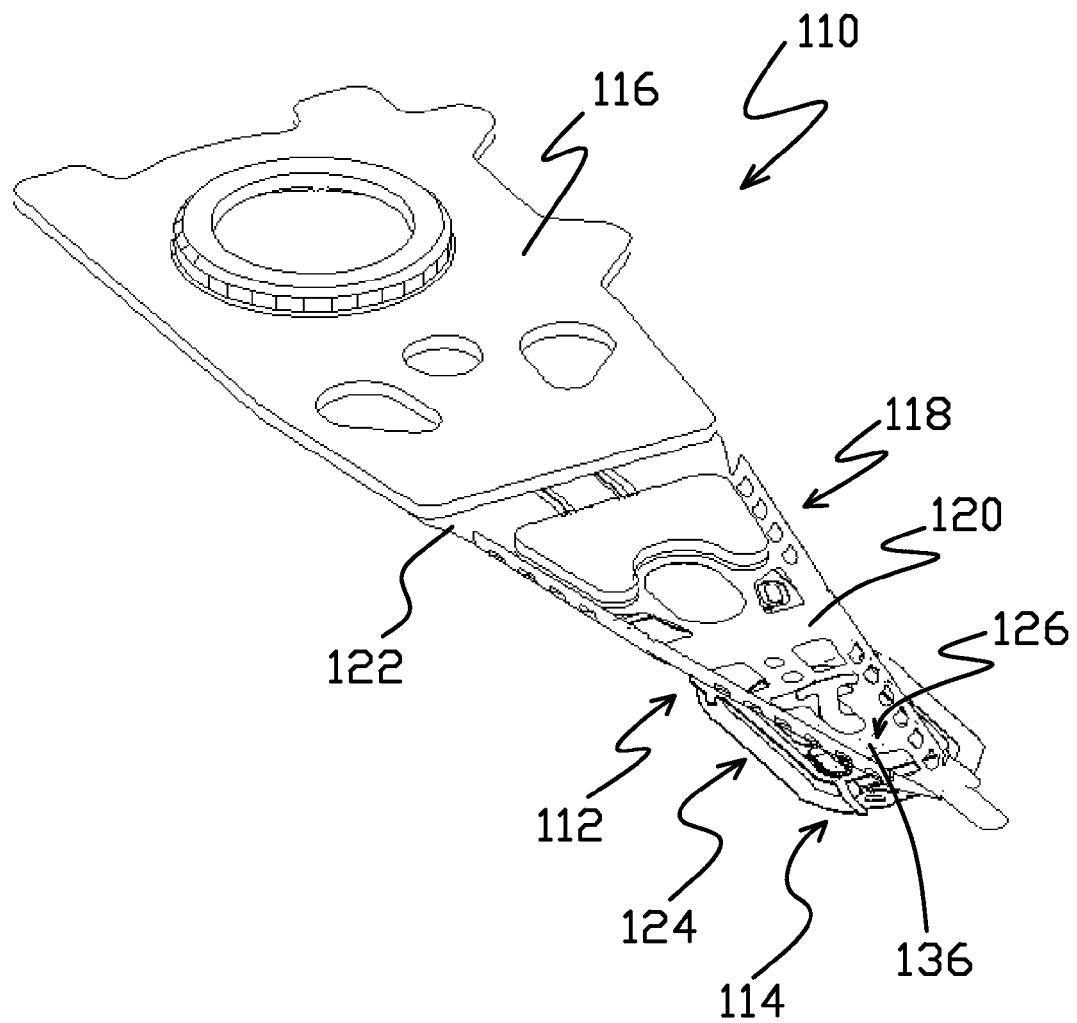
FIG. 9 is an isometric view of the loadbeam side of a suspension having a flexure with a dual stage actuation (DSA) structure in accordance with a second embodiment (trace side version) of the invention.

FIGS. $16A_1$, $16B_1$, and $16C_1$ are overhead views of the stainless steel side of the flexure shown in FIG. 9.

FIGS. $16A_2$, $16B_2$, and $16C_2$ are overhead views of the trace side of the flexure shown in FIGS. $16A_1$, $16B_1$, and $16C_1$, respectively.

Figure 17:
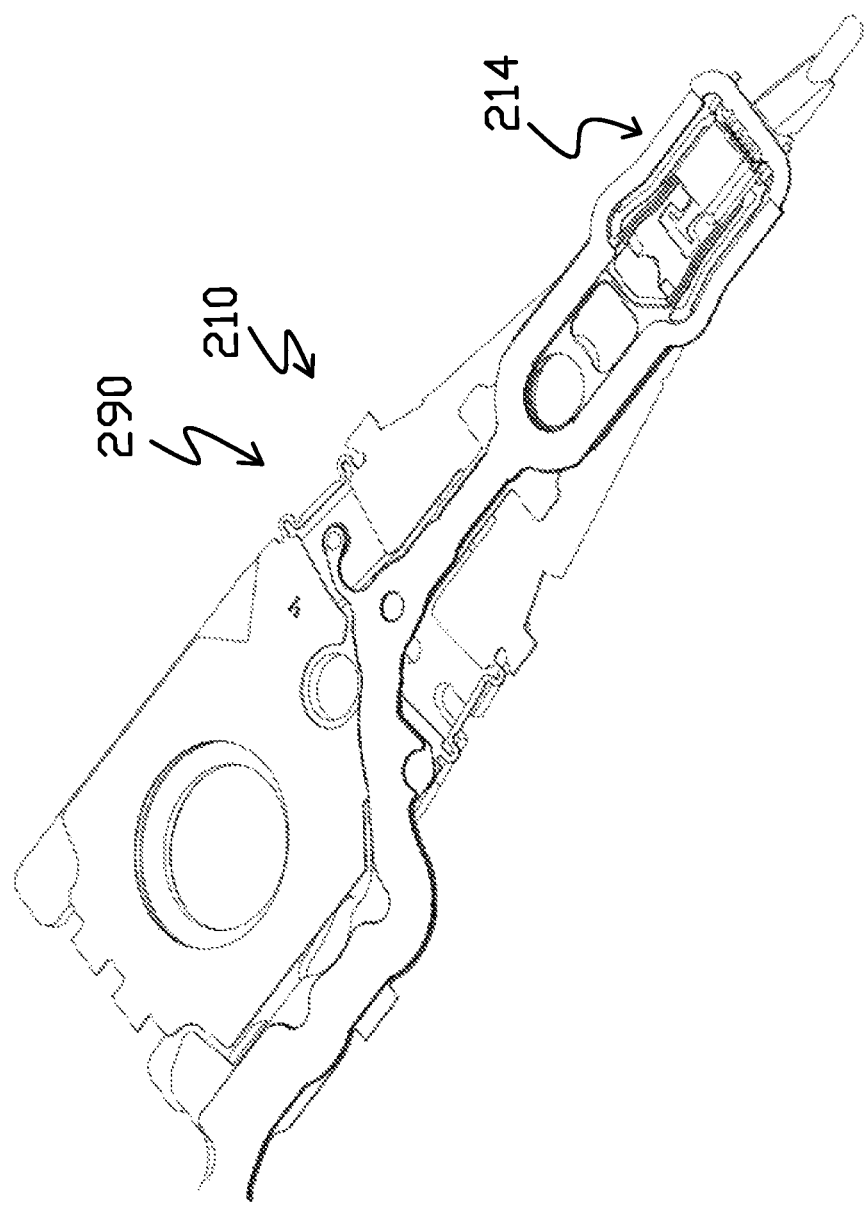

FIG. 17 is an isometric view of a tri-stage actuated suspension in accordance with various embodiments of the invention.

Figure 18:
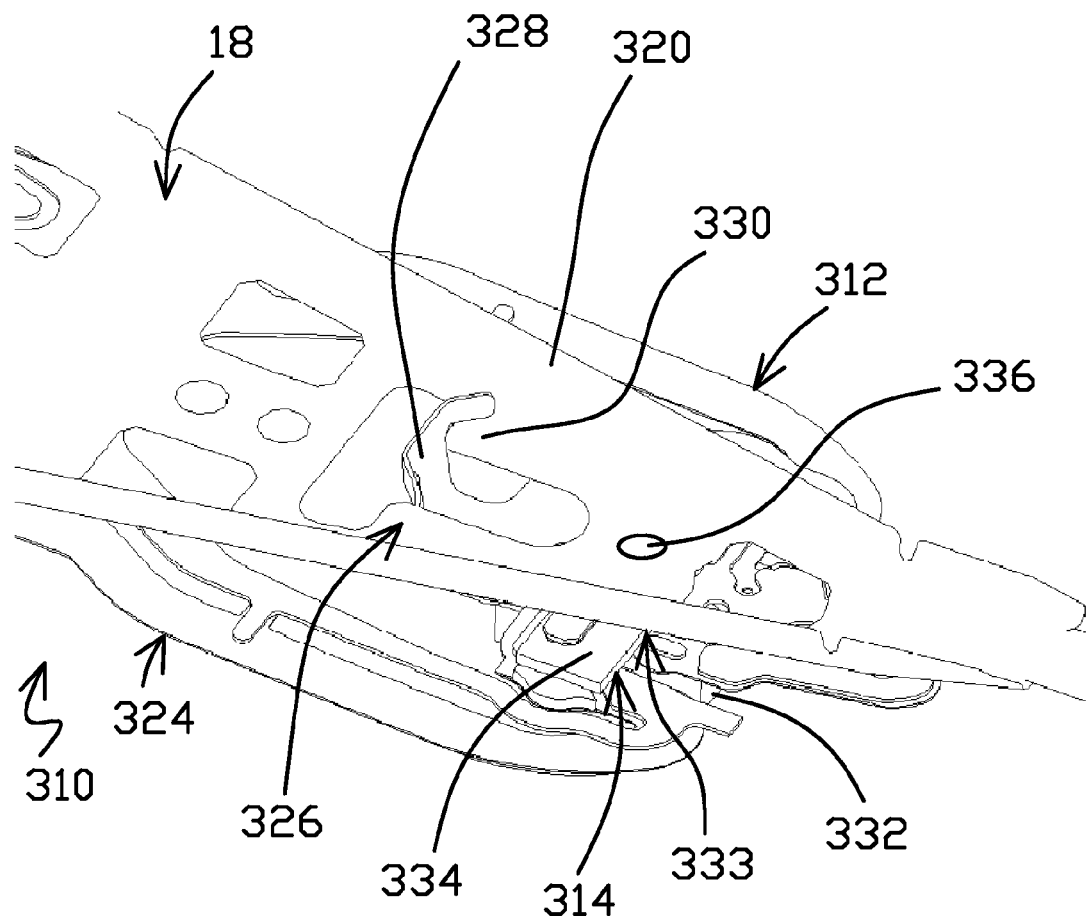

FIG. 18 is an isometric view of a suspension in accordance with another embodiment of the invention.

Figure 19:
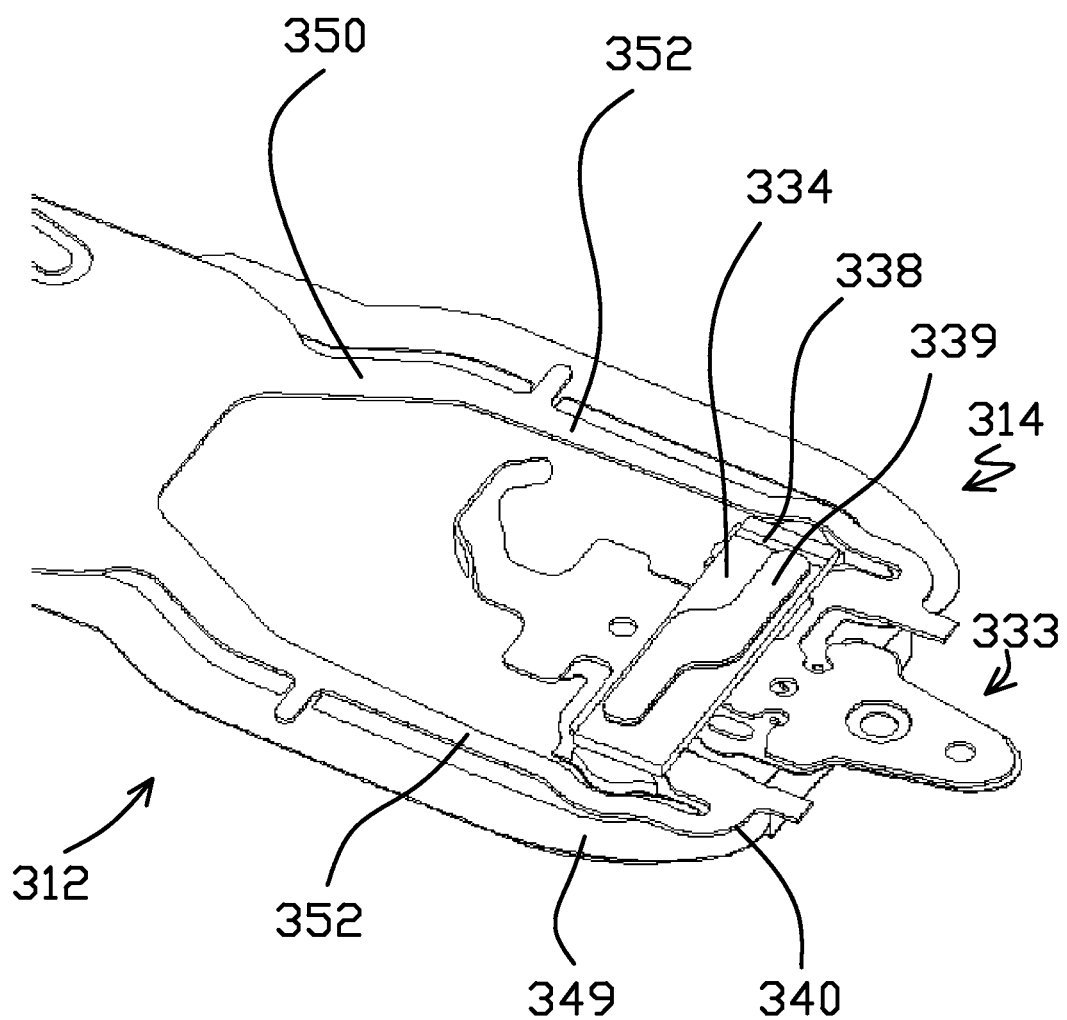

FIG. 19 is an isometric view of the flexure and DSA structure of the suspension of FIG. 18.

Figure 20:
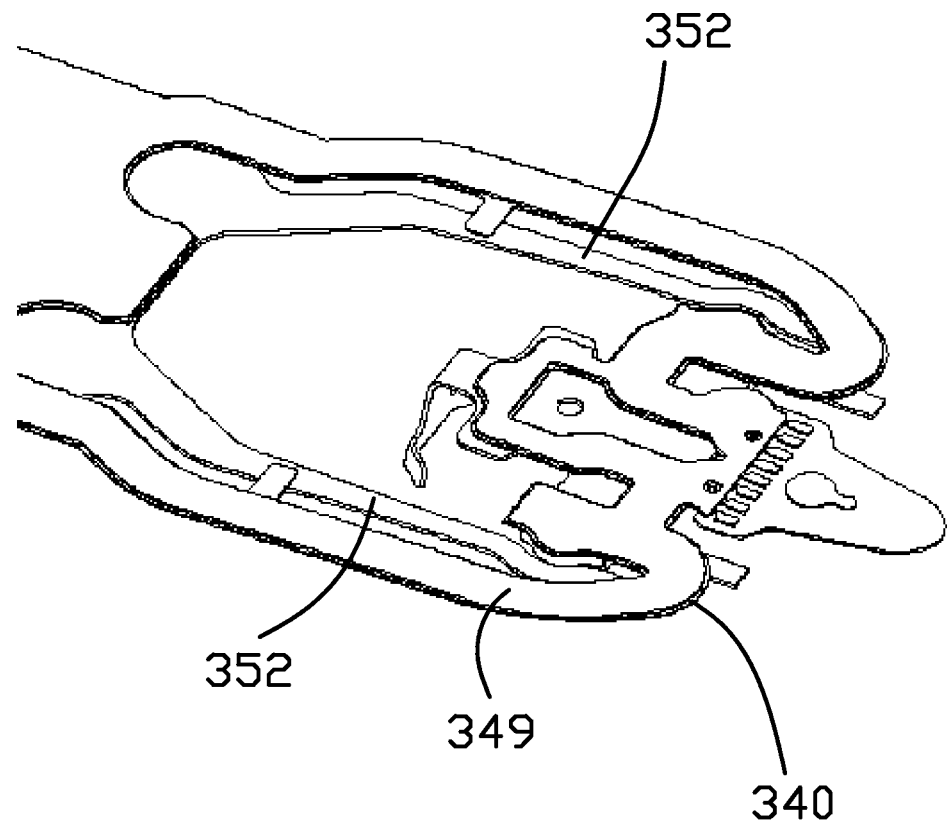

FIG. 20 is an isometric view of the flexure from the suspension of FIG. 18.

Figure 21:
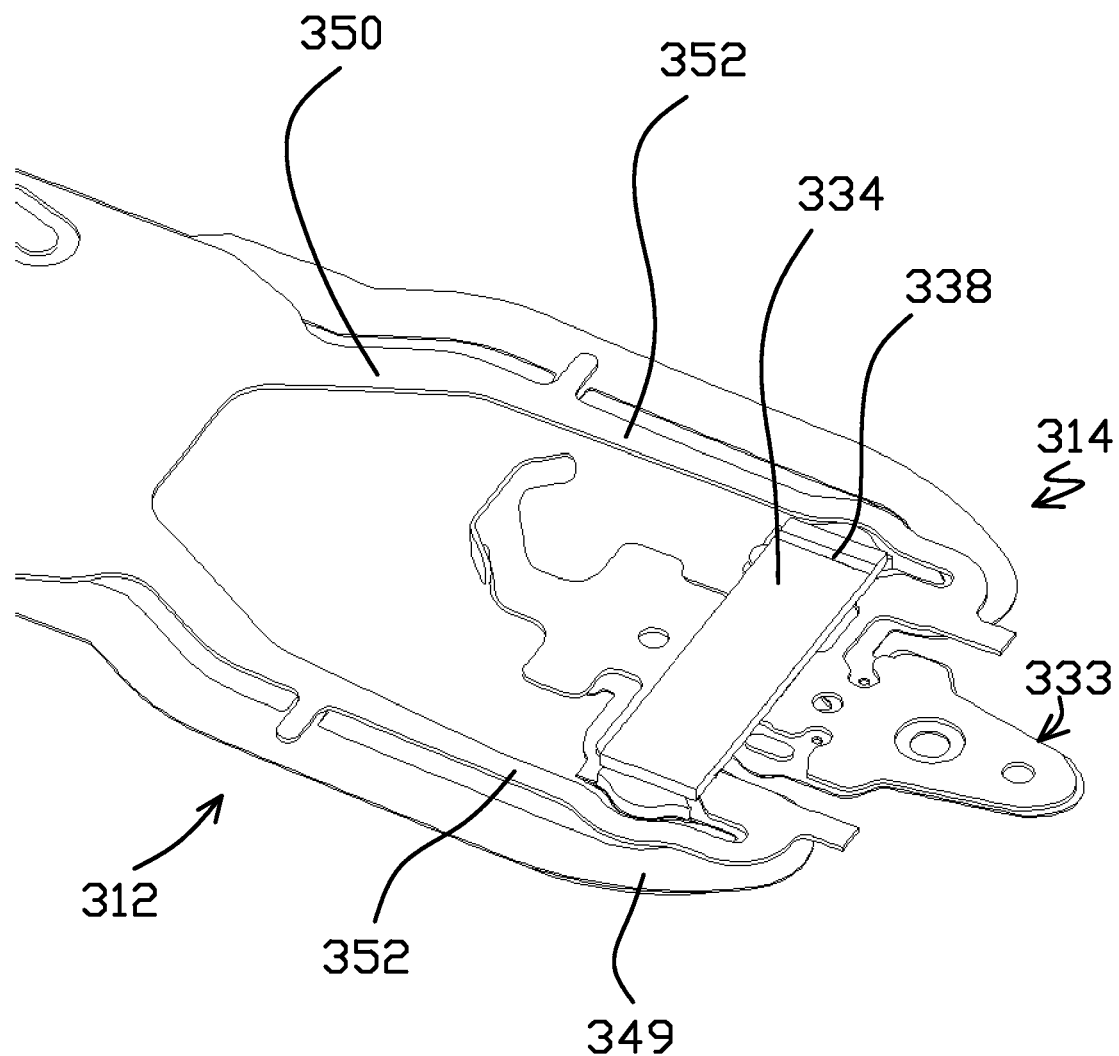

FIG. 21 is an isometric view of the flexure and DSA structure of FIG. 19.

Figure 22:
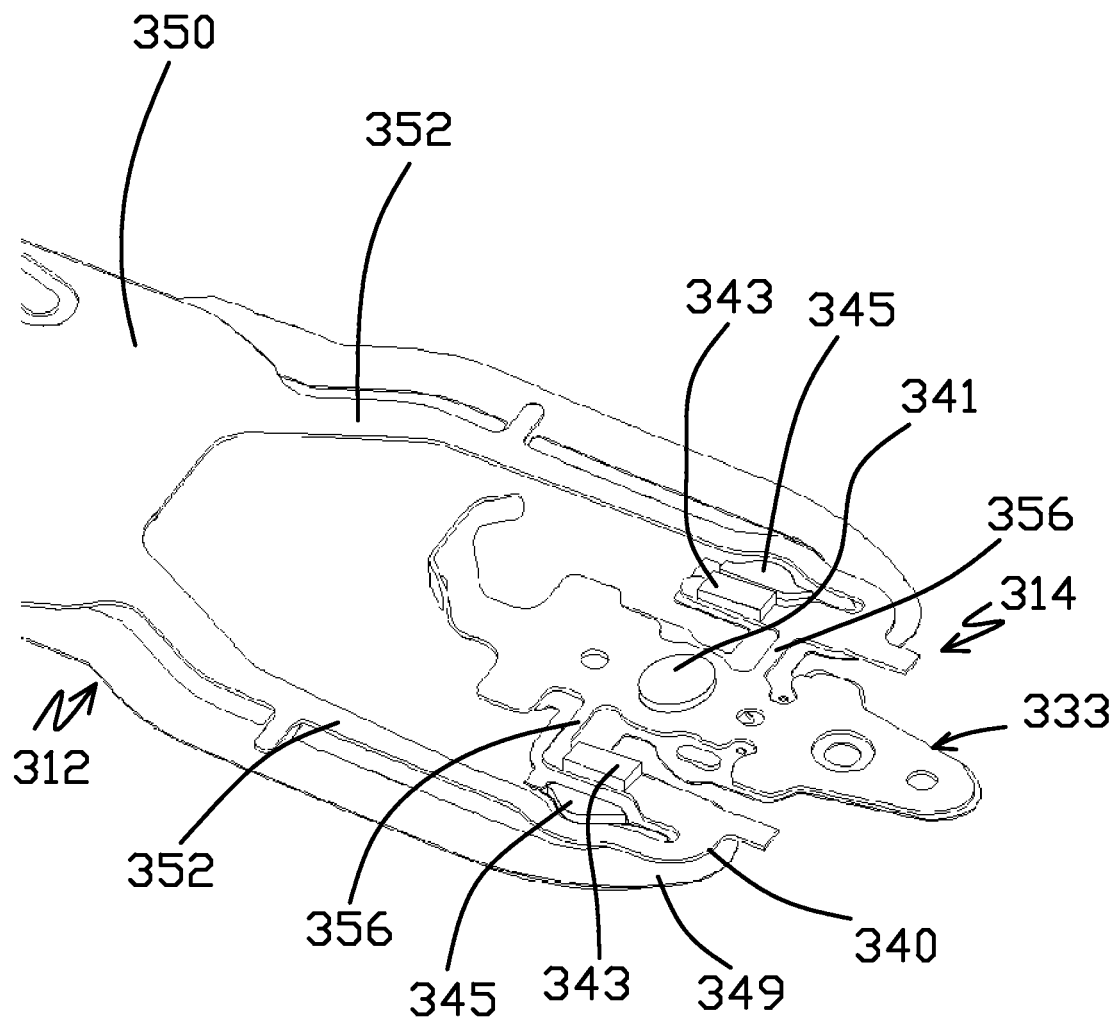

FIG. 22 is an isometric view of the flexure of FIG. 19.

Figure 23:
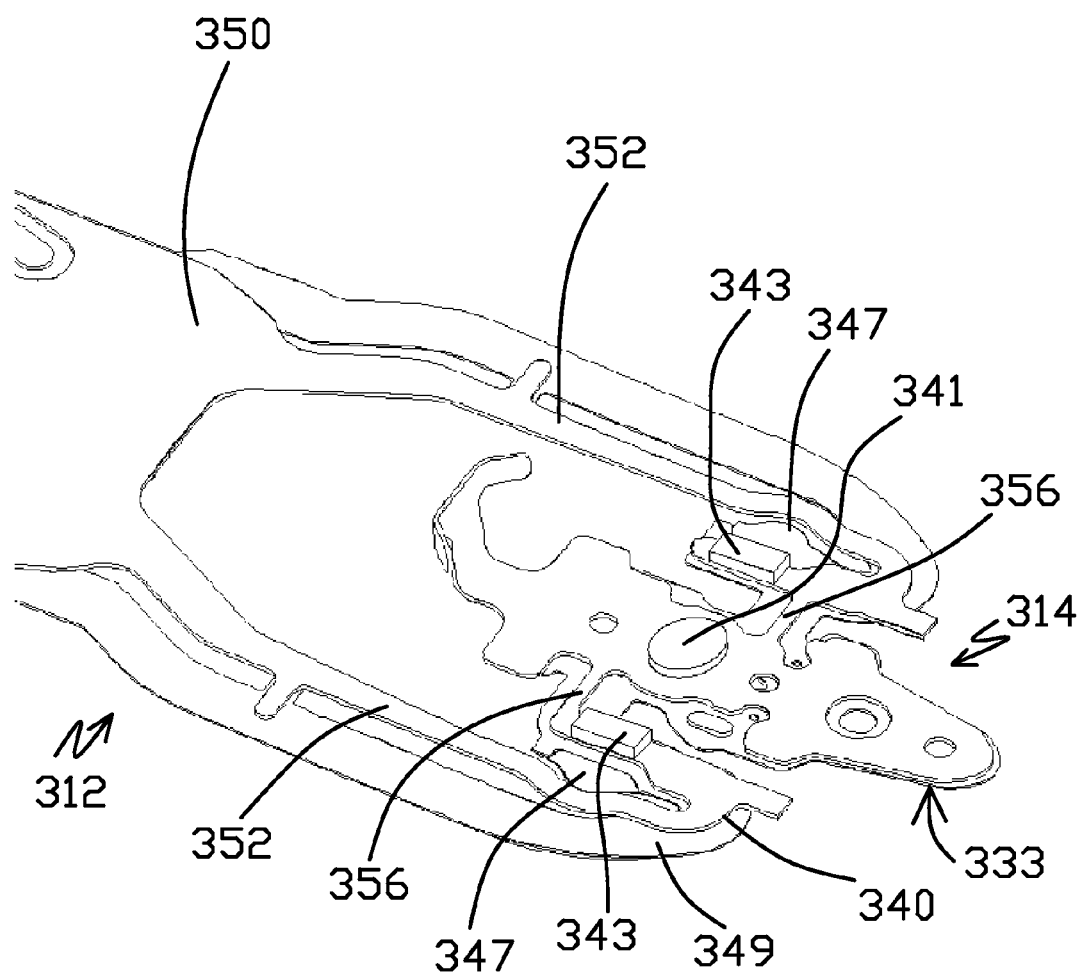

FIG. 23 is an isometric view of the flexure of FIG. 19.

Figure 24:
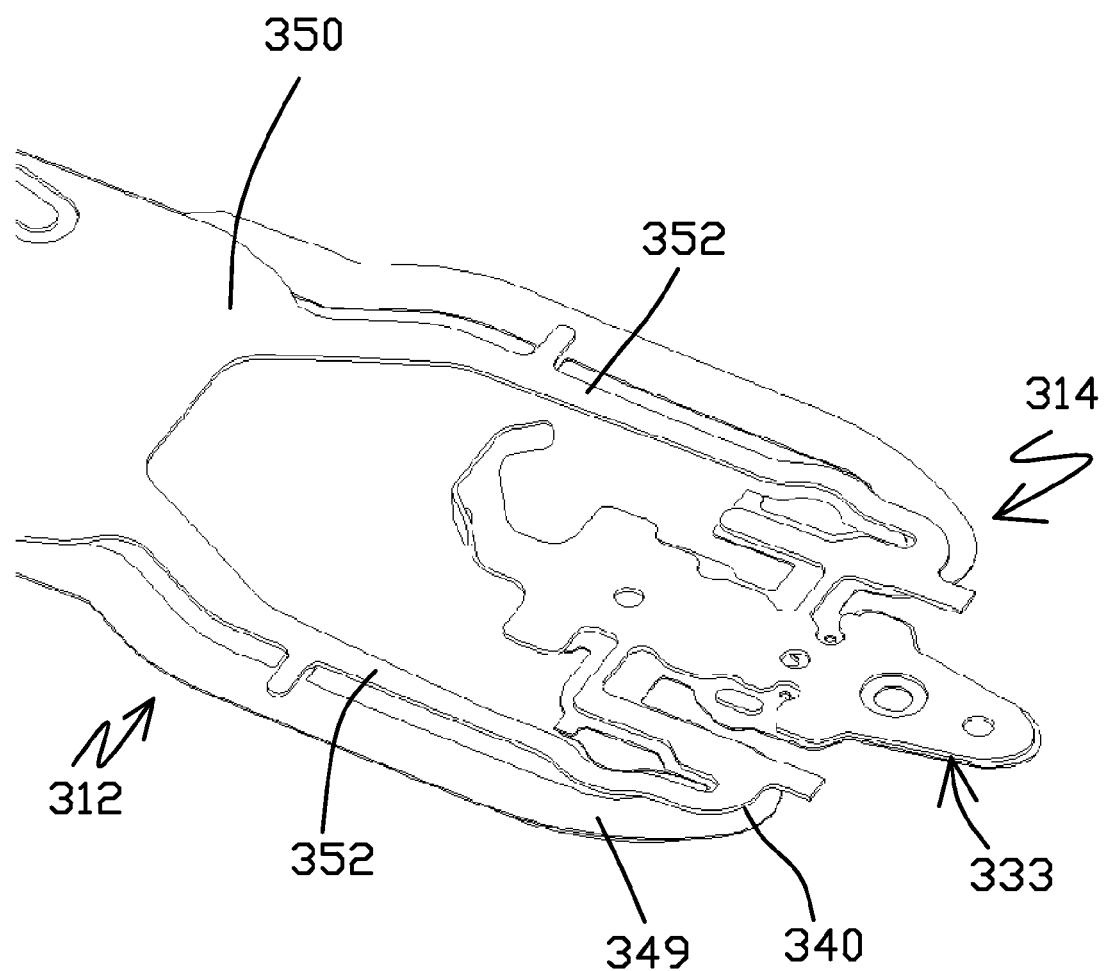

FIG. 24 is an isometric view of the flexure of FIG. 19.

Figure 25:
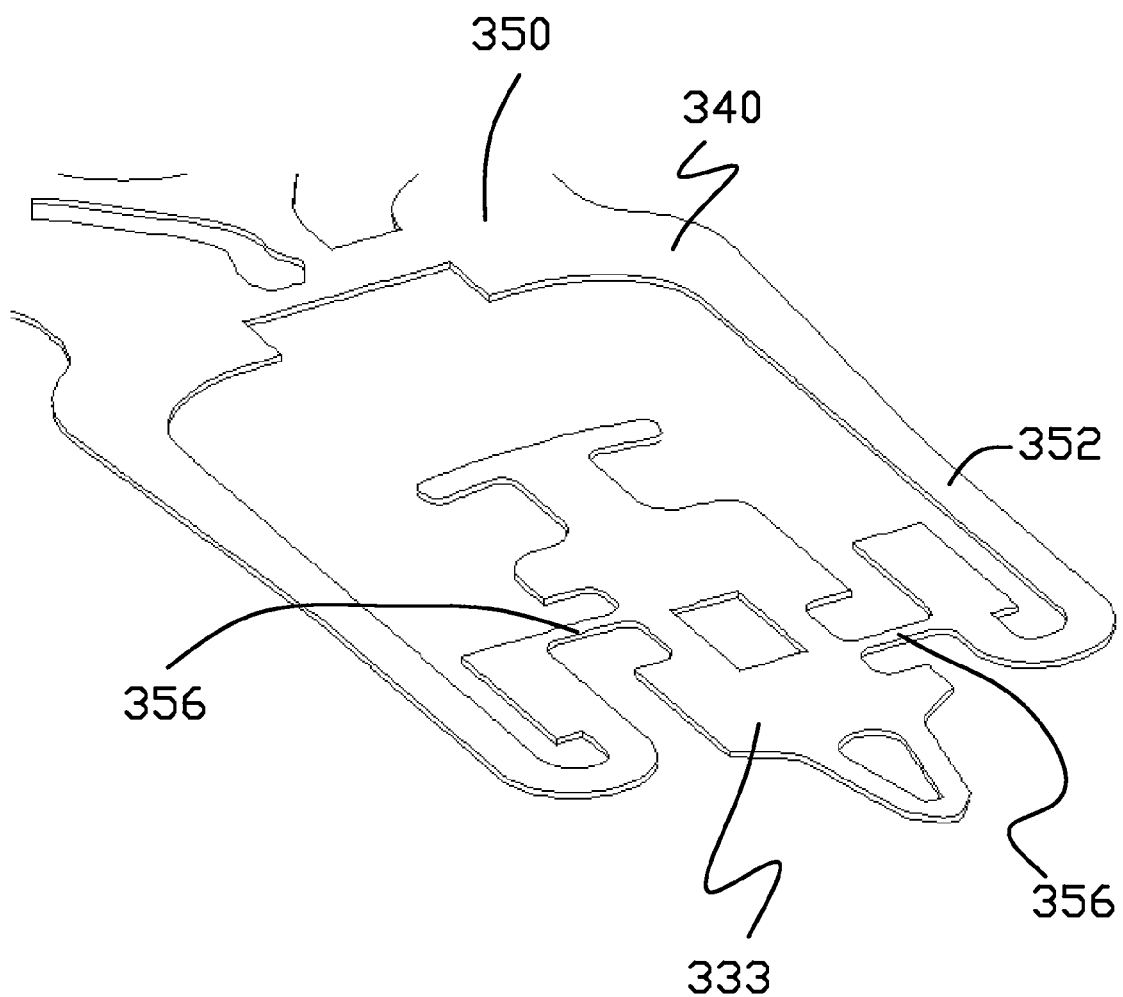

FIG. 25 is an isometric view of the spring metal layer of the flexure of FIG. 19.

Figure 26:
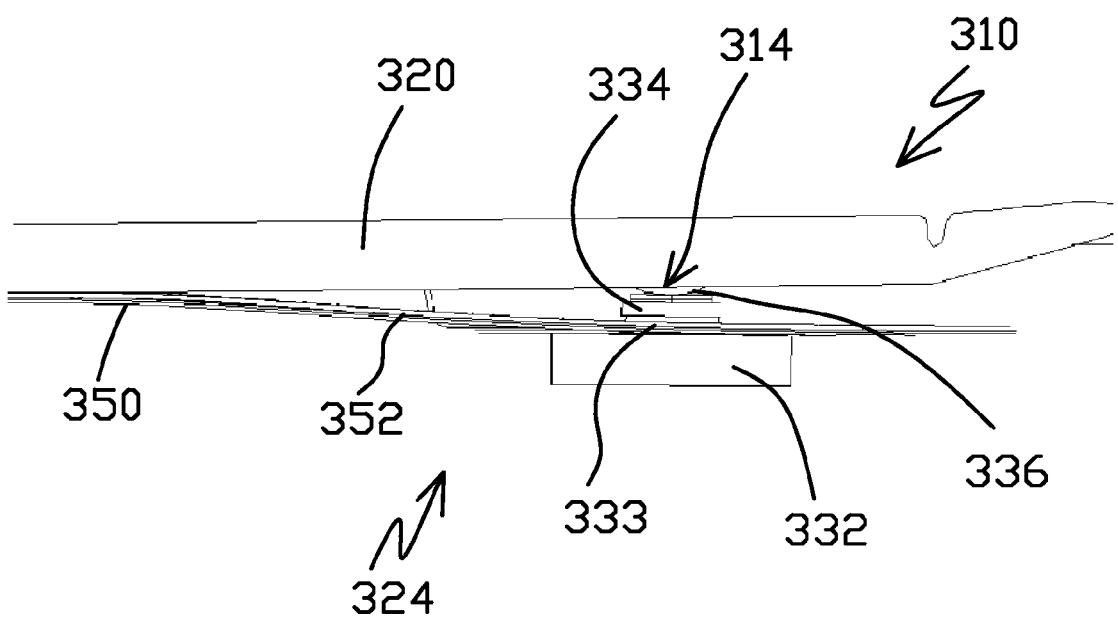

FIG. 26 is a side view of the suspension of FIG. 18.

Figure 27:
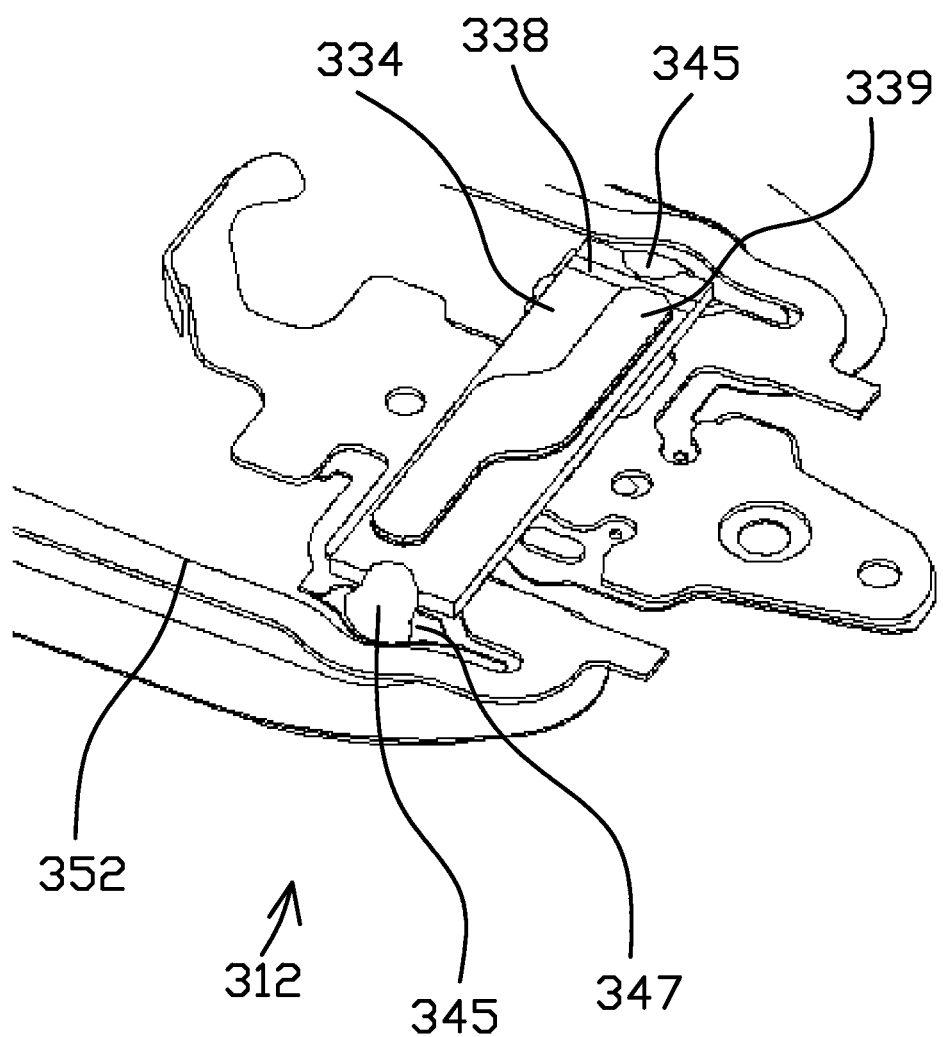

FIG. 27 is a detailed view of the motor mounting of the suspension of FIG. 18.

Figure 28:
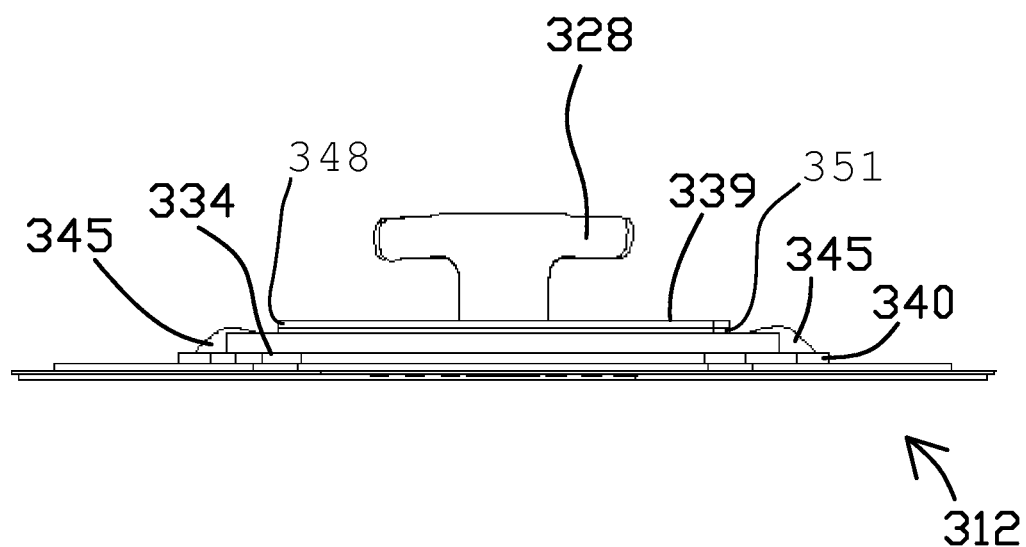

FIG. 28 is a front view of the flexure of FIG. 19.

Figure 29A:
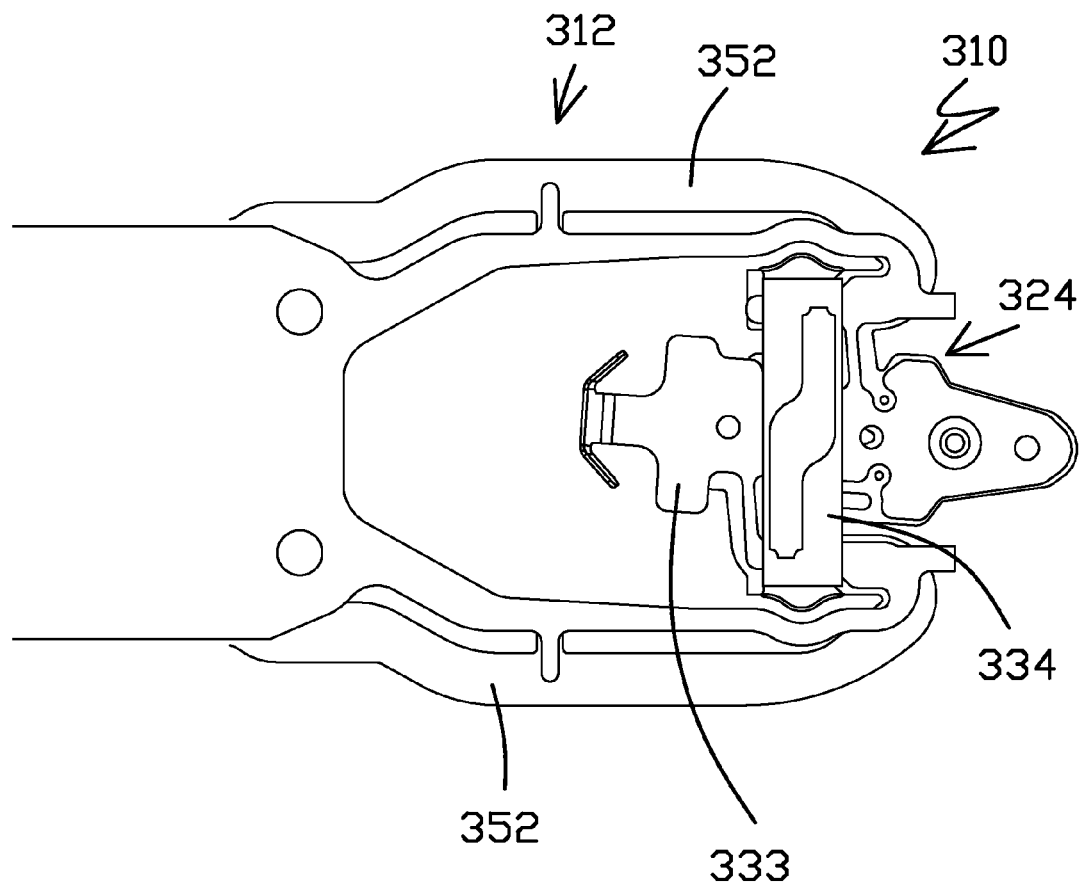
Figure 29B:
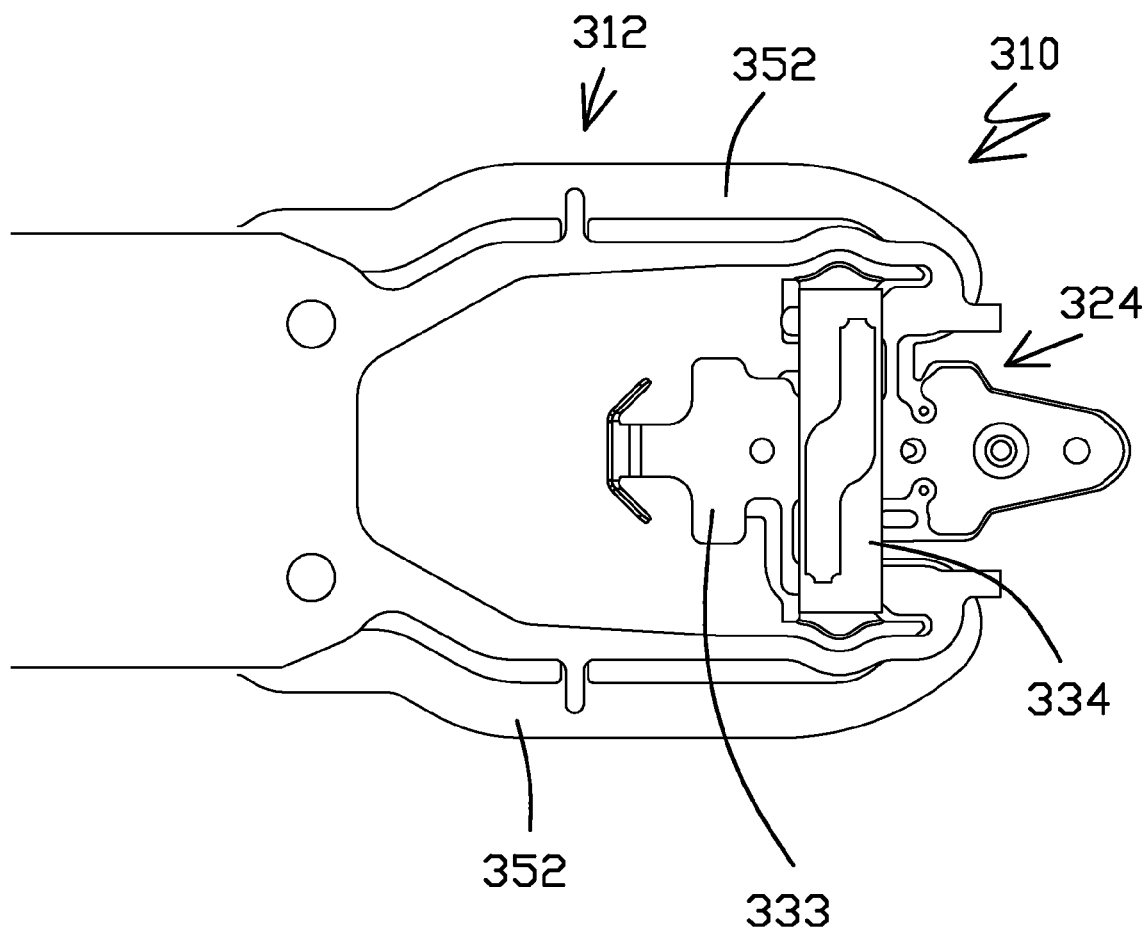
Figure 29C:
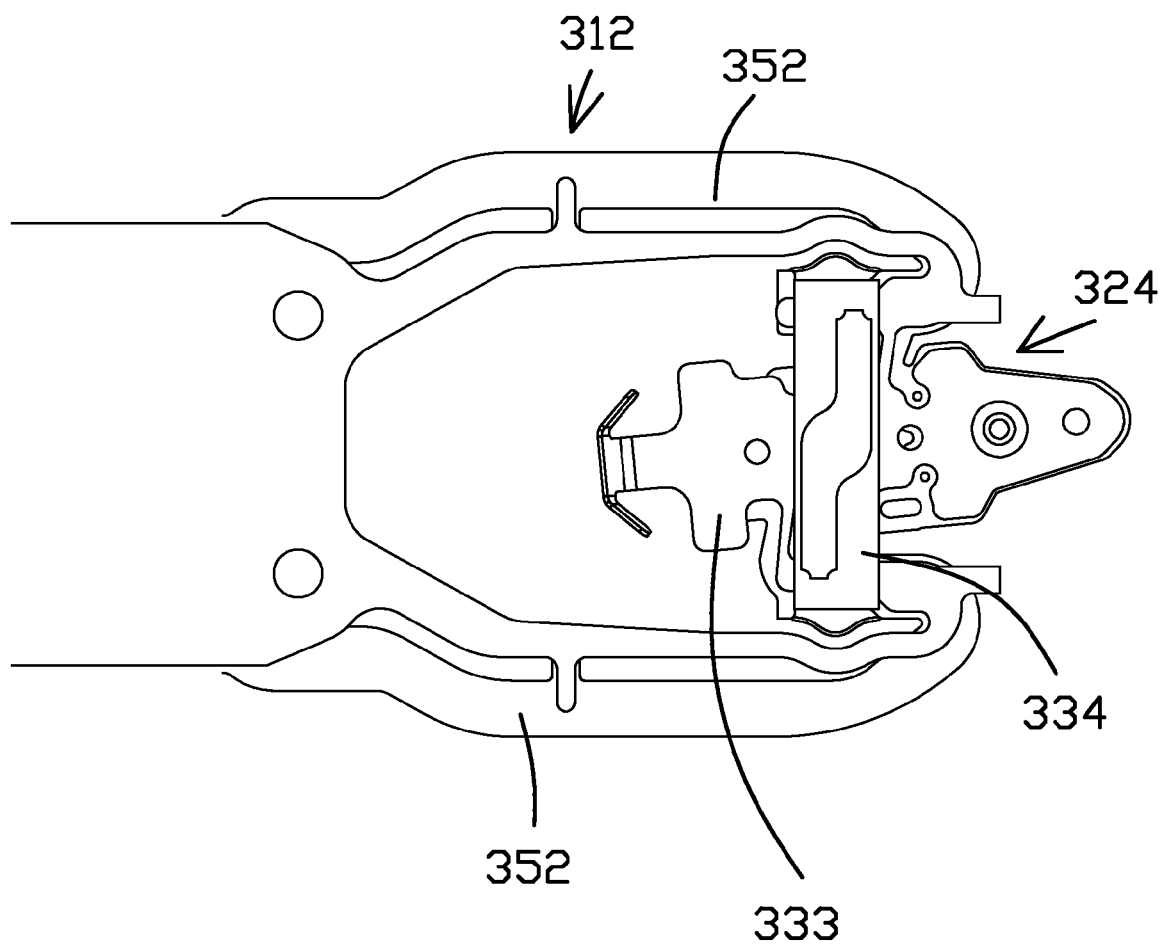

FIGS. 29A-C are isometric views of the flexure of FIG. 19 in different movement states.

Figure 30:
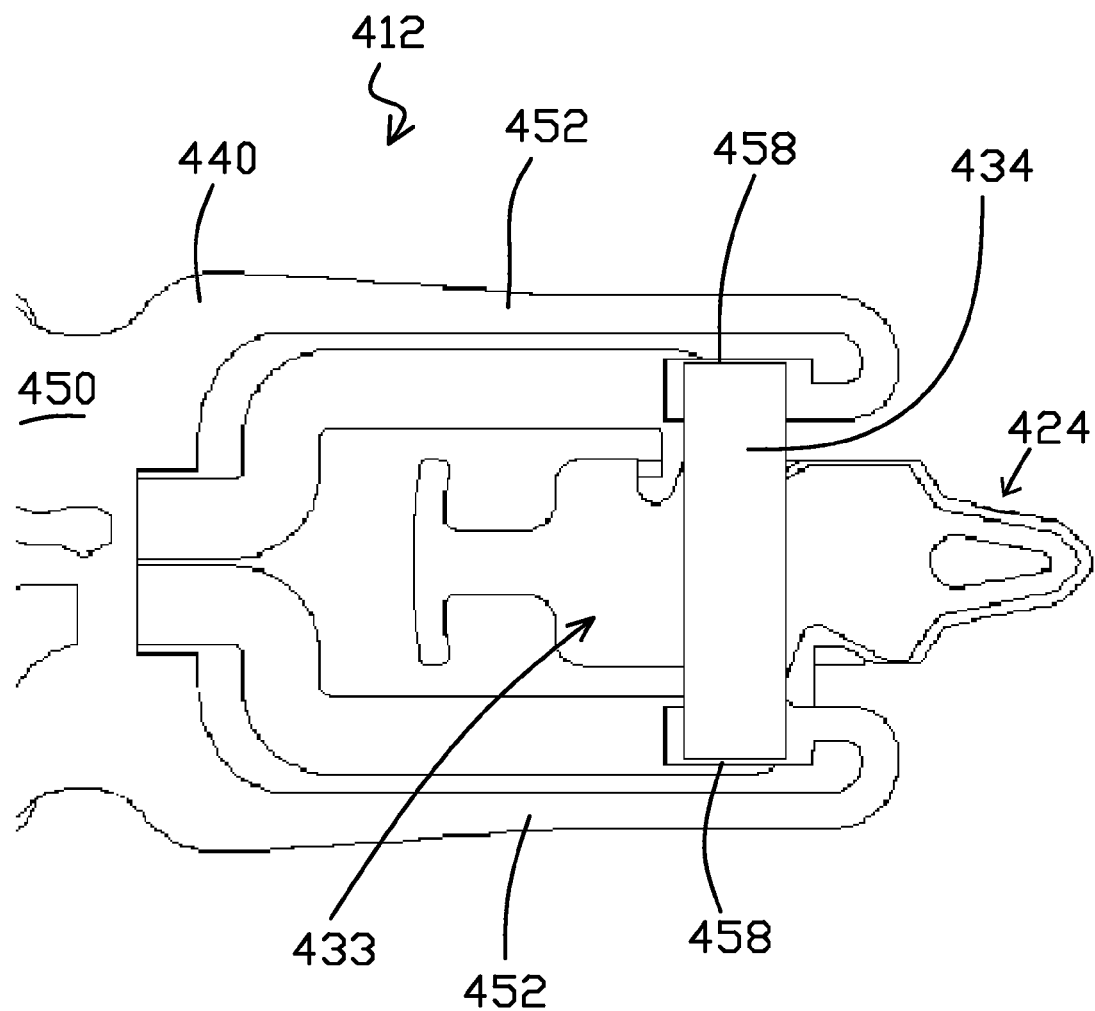

FIG. 30 is an overhead view of a flexure that can be used in a suspension.

Figure 31A:
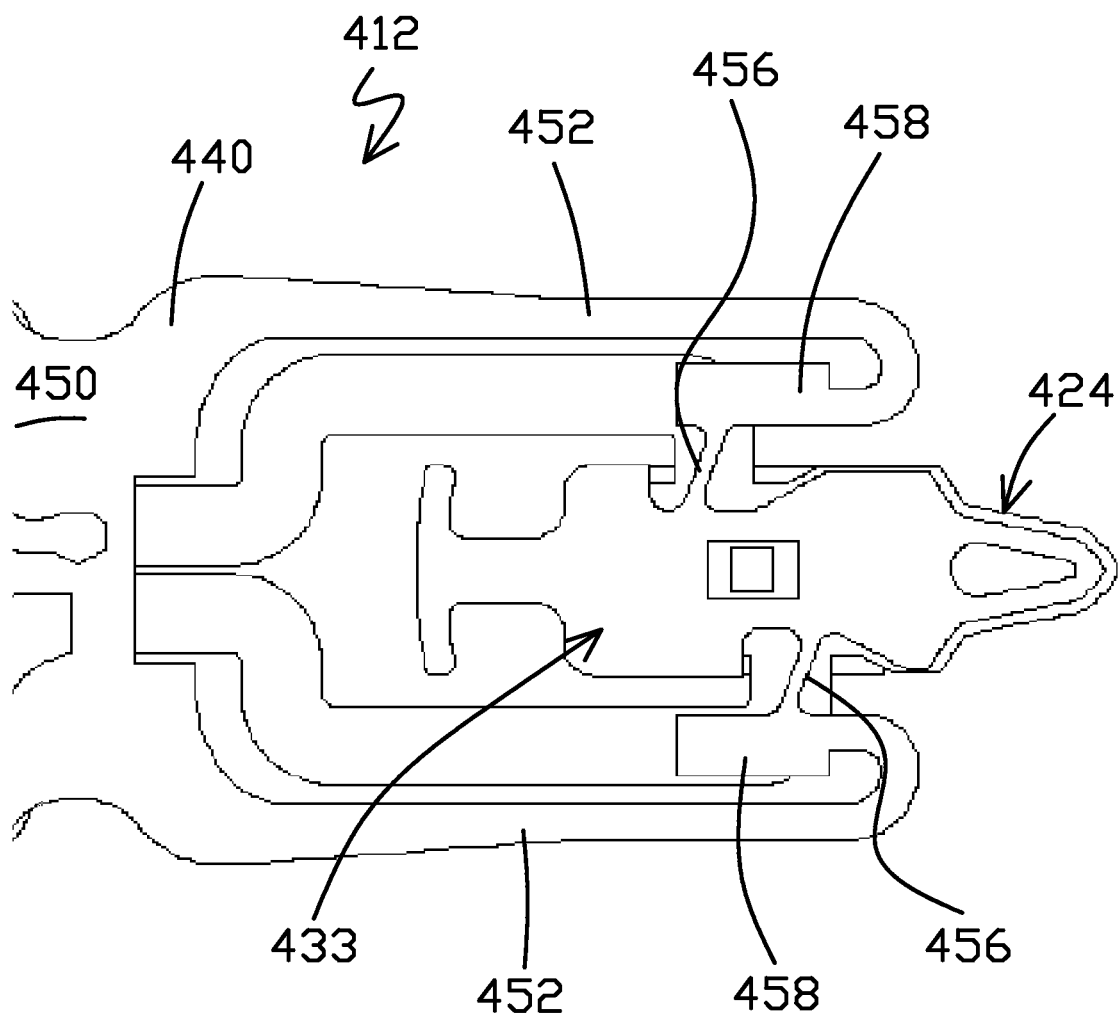
Figure 31B:
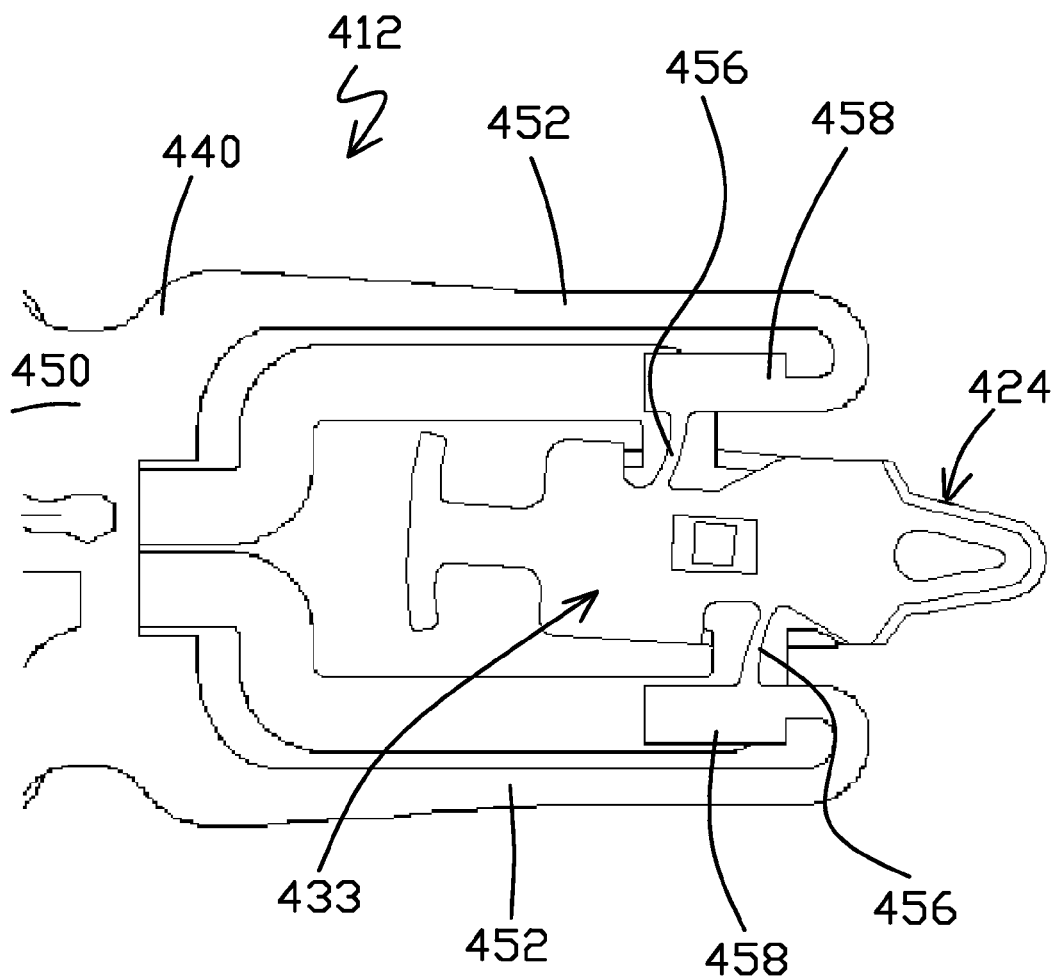
Figure 31C:
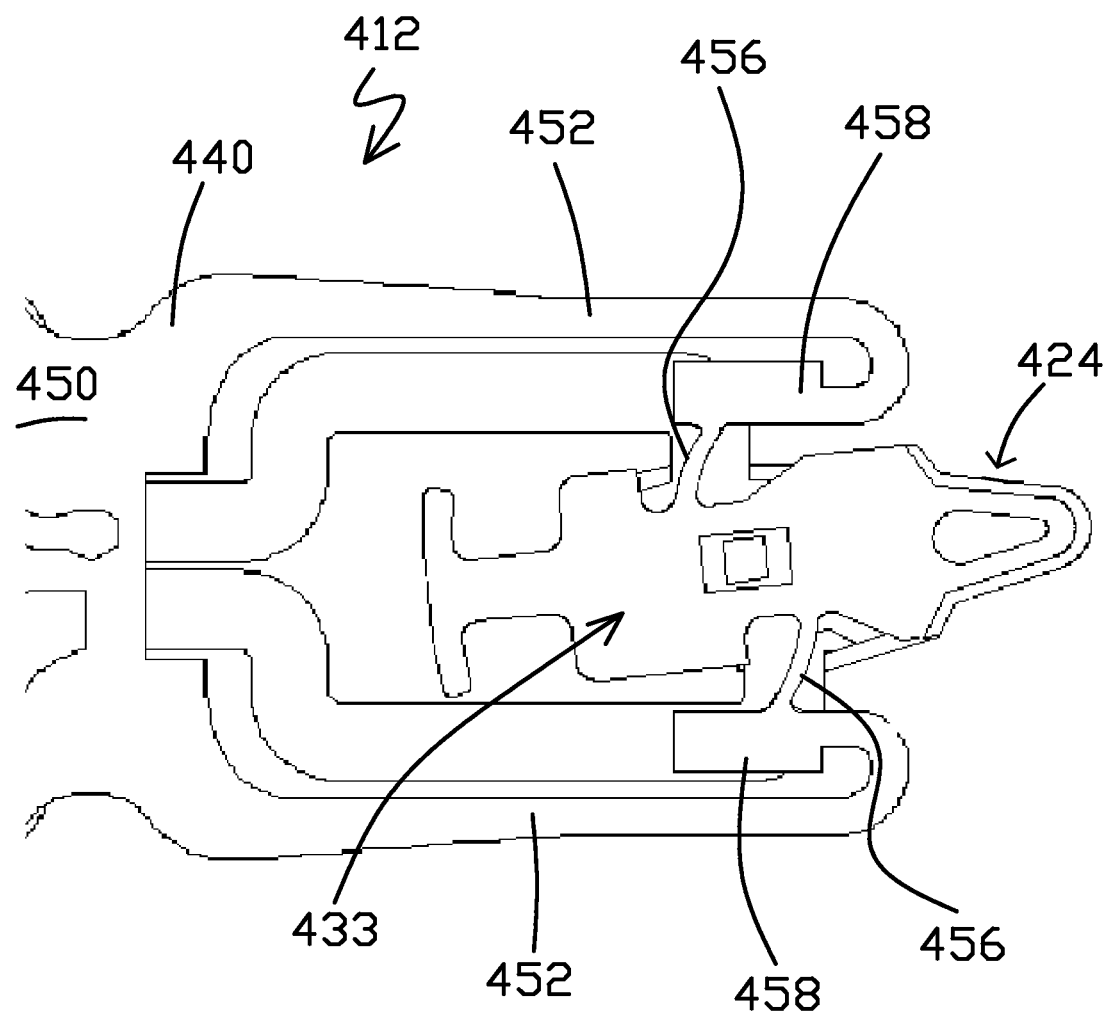

FIGS. 31A-C are overhead views of the flexure of FIG. 30 in different movement states.

While the subject matter of this disclosure is amenable to various modifications and alternative forms, specific embodiments have been shown by way of example in the drawings and are described in detail below. The intention, however, is not to limit this disclosure to the particular embodiments described. On the contrary, this disclosure is intended to cover all modifications, equivalents, and alternatives falling within the scope of this disclosure as defined by the appended claims.

DESCRIPTION OF THE INVENTION

Figure 1:
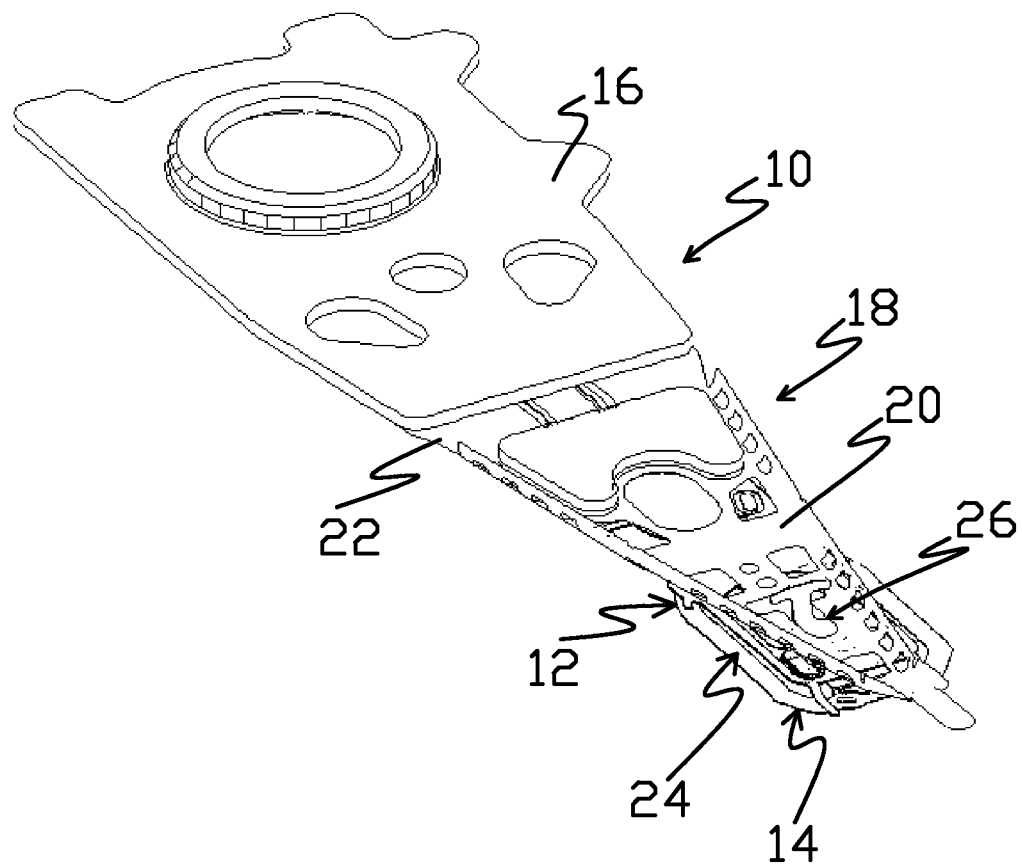
FIG. 1 is an isometric view of the loadbeam side of a suspension having a flexure with a dual stage actuation (DSA) structure in accordance with one embodiment of the invention.
Figure 2:
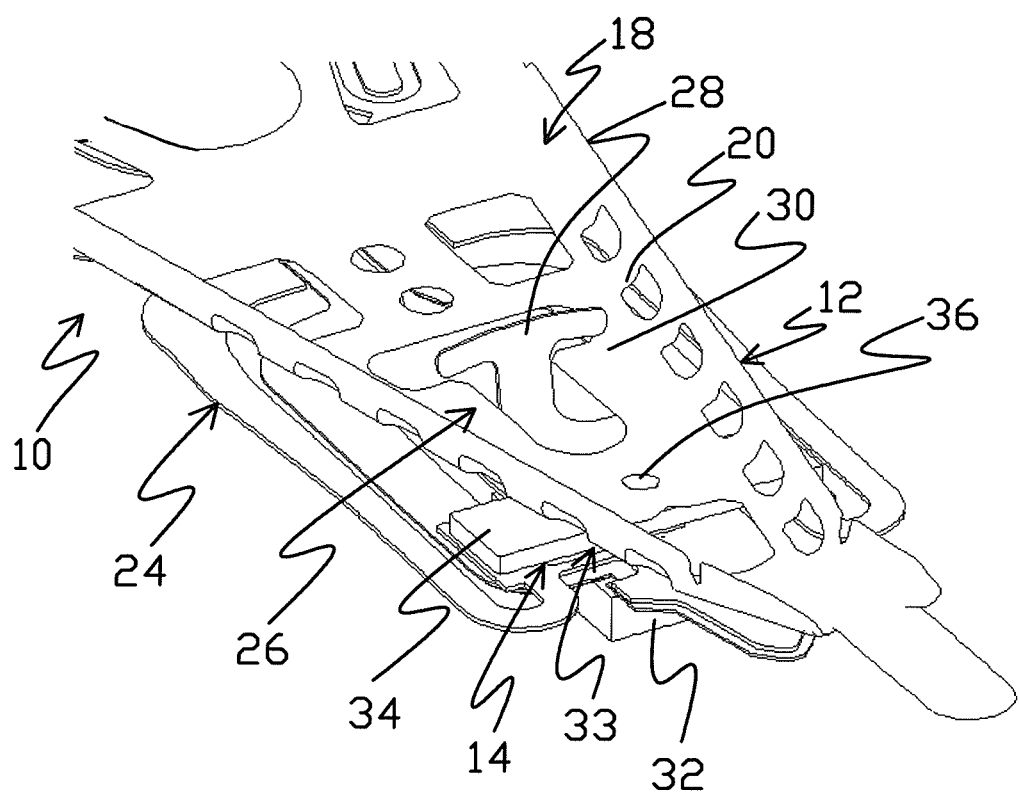
FIG. 2 is an isometric view of the loadbeam side of the distal end of the suspension shown in FIG. 1.
Figure 3:
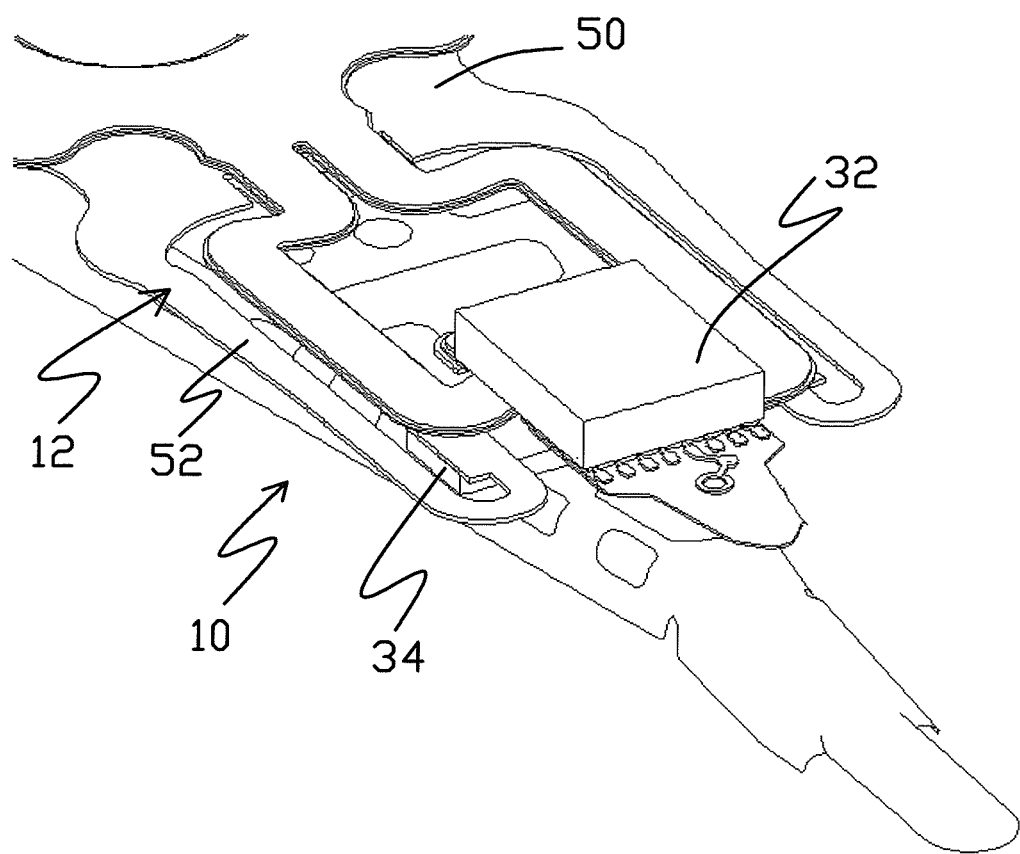
FIG. 3 is an isometric view of the flexure side (i.e., the side opposite that shown in FIG. 2) of the distal end of the suspension shown in FIG. 1.

FIG. 1 is an isometric view of the loadbeam side of a suspension 10 having a flexure 12 with a co-located or gimbal-based dual stage actuation (DSA) structure 14 in accordance with a first embodiment of the invention (i.e., a stainless steel side version). FIG. 2 is a detailed isometric view of the distal end of the suspension 10. FIG. 3 is a detailed isometric view of the flexure side of the distal end of the suspension 10, which shows the side opposite that shown in FIG. 2. As shown in FIG. 1, the suspension 10 includes a baseplate 16 as a proximal mounting structure. As further shown in FIG. 1, the suspension 10 includes a loadbeam 18 having a rigid or beam region 20 coupled to the baseplate 16 along a spring or hinge region 22. The loadbeam 18 can be formed from stainless steel.

Flexure 12 includes a gimbal 24 at the distal end of the flexure 12. A DSA structure 14 is located on the gimbal 24, adjacent the distal end of the loadbeam 18. As best shown in FIG. 2, the suspension 10 includes a gimbal limiter 26 comprising a tab 28 configured to engage a stop portion 30 of the loadbeam 18. A head slider 32 is mounted to a slider mounting region or tongue 33 of the gimbal 24, on the side of the suspension 10 that is opposite the loadbeam 18. DSA structure 14 includes a motor 34, which is a PZT or other piezoelectric actuator in the illustrated embodiment, mounted to the gimbal 24 of the flexure 12 between the load beam 18 and the head slider 32. As described in greater detail below, in response to electrical drive signals applied to the motor 34, the motor drives portions of the gimbal 24, including the tongue 33 and slider 32, about a generally transverse tracking axis.

Figure 4A:
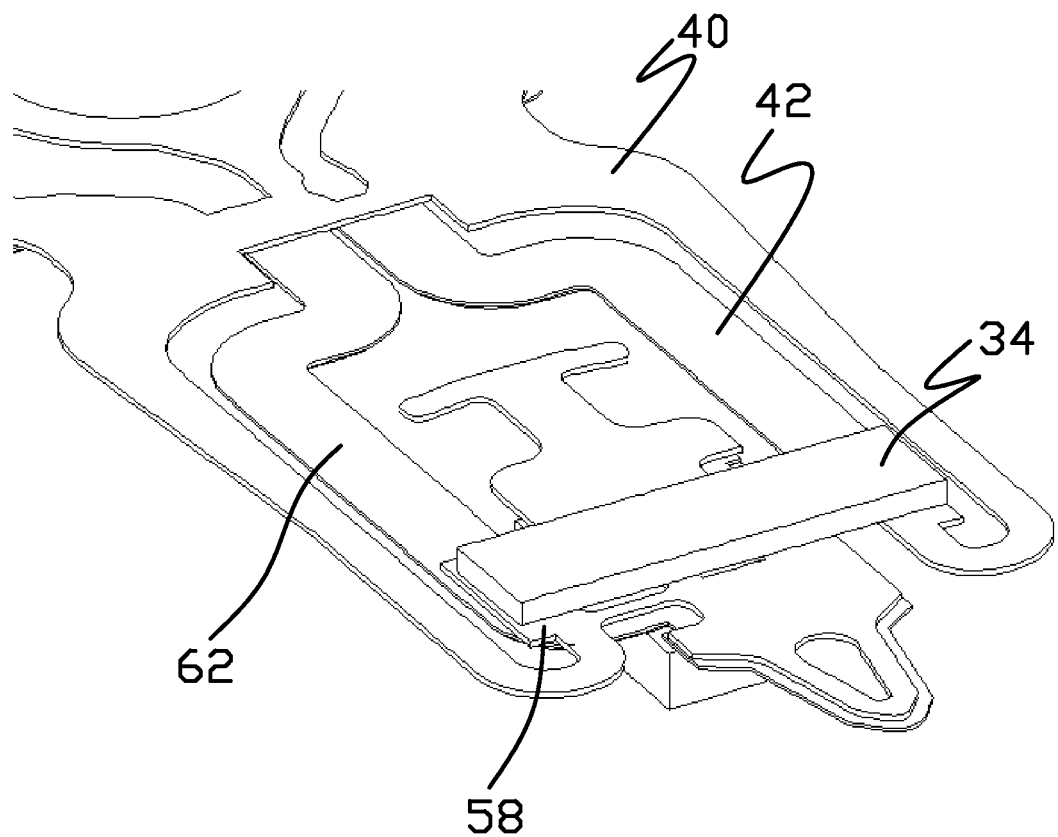
FIG. 4A is an isometric view of the stainless steel side of the flexure shown in FIG. 1.
Figure 4B:
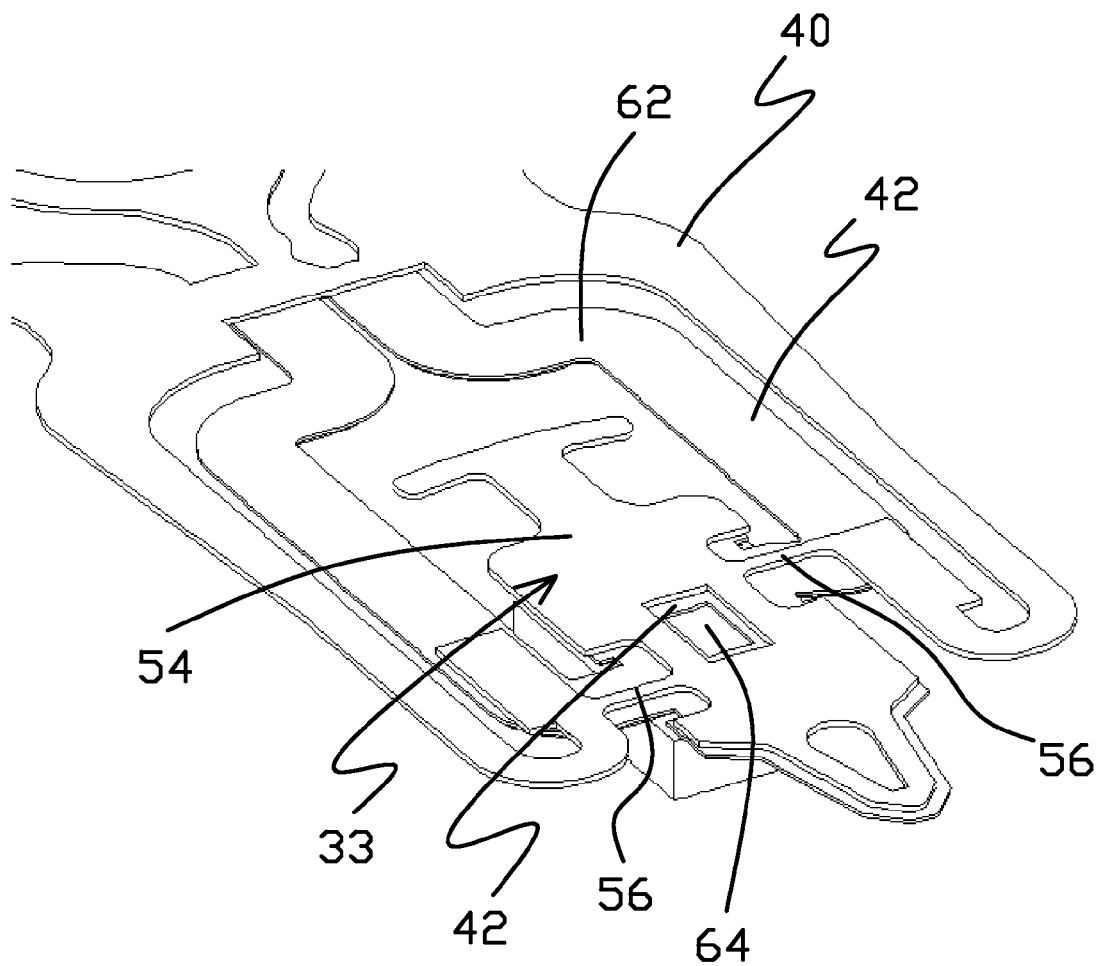
FIG. 4B is the view of FIG. 4A but with the piezoelectric motor removed.

FIGS. 4A and 4B are isometric views of the stainless steel side of the flexure 12 and DSA structure 14 shown in FIG. 1. The motor 34 is not shown in FIG. 4B to show further details of the tongue 33. FIGS. 5A-5F are isometric views of the trace side (i.e., the side opposite that shown in FIGS. 4A and 4B) of the flexure 12 and DSA structure 14. Specifically, FIGS. 5A-5F show the various layers that comprise the flexure 12 and DSA structure 14. FIG. 5B is the drawing of FIG. 5A but with the head slider 32 removed to further show details of the tongue 33. FIG. 5C is the drawing of FIG. 5B but with a polyimide coverlay 46 removed to reveal a conductive material layer 44 including traces 60 and other structures formed in the conductive material layer that is otherwise underneath the polyimide coverlay 46. FIG. 5D is the drawing of FIG. 5C but with the conductive material layer 44 removed to more fully reveal the dielectric layer 42 that is otherwise underneath the conductive material layer 44. FIG. 5E is the drawing of FIG. 5D but with the dielectric material layer 42 removed to show only the stainless steel layer 40 and the motor 34. FIG. 5F is the drawing of FIG. 5E but with the motor 34 removed to illustrate only the stainless steel layer 40 of the flexure 12. It will be understood that the stainless steel layer 40 could alternatively be formed from another metal or rigid material.

Figure 8A:
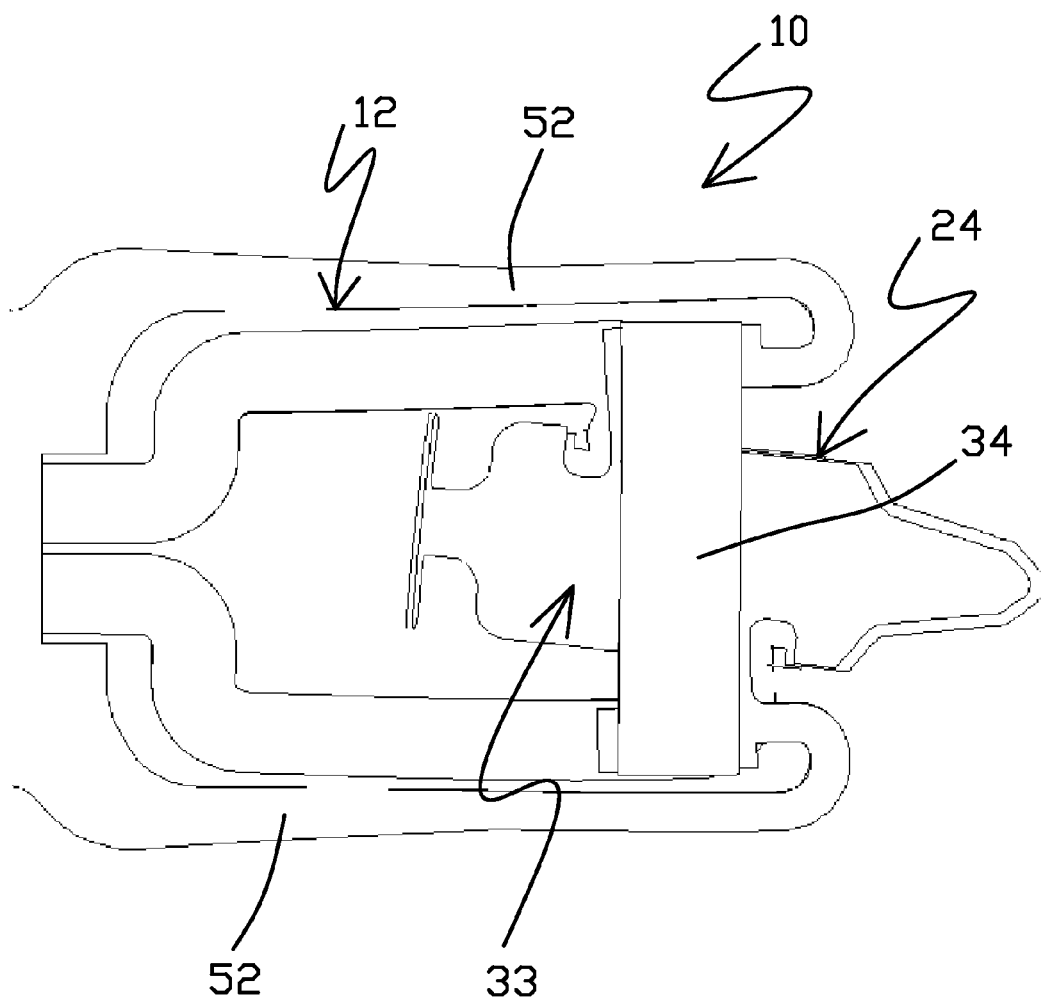
FIGS. 8A-8C are overhead views of the stainless steel side of the flexure shown in FIG. 1, illustrating the operation of the DSA structure.
Figure 8B:
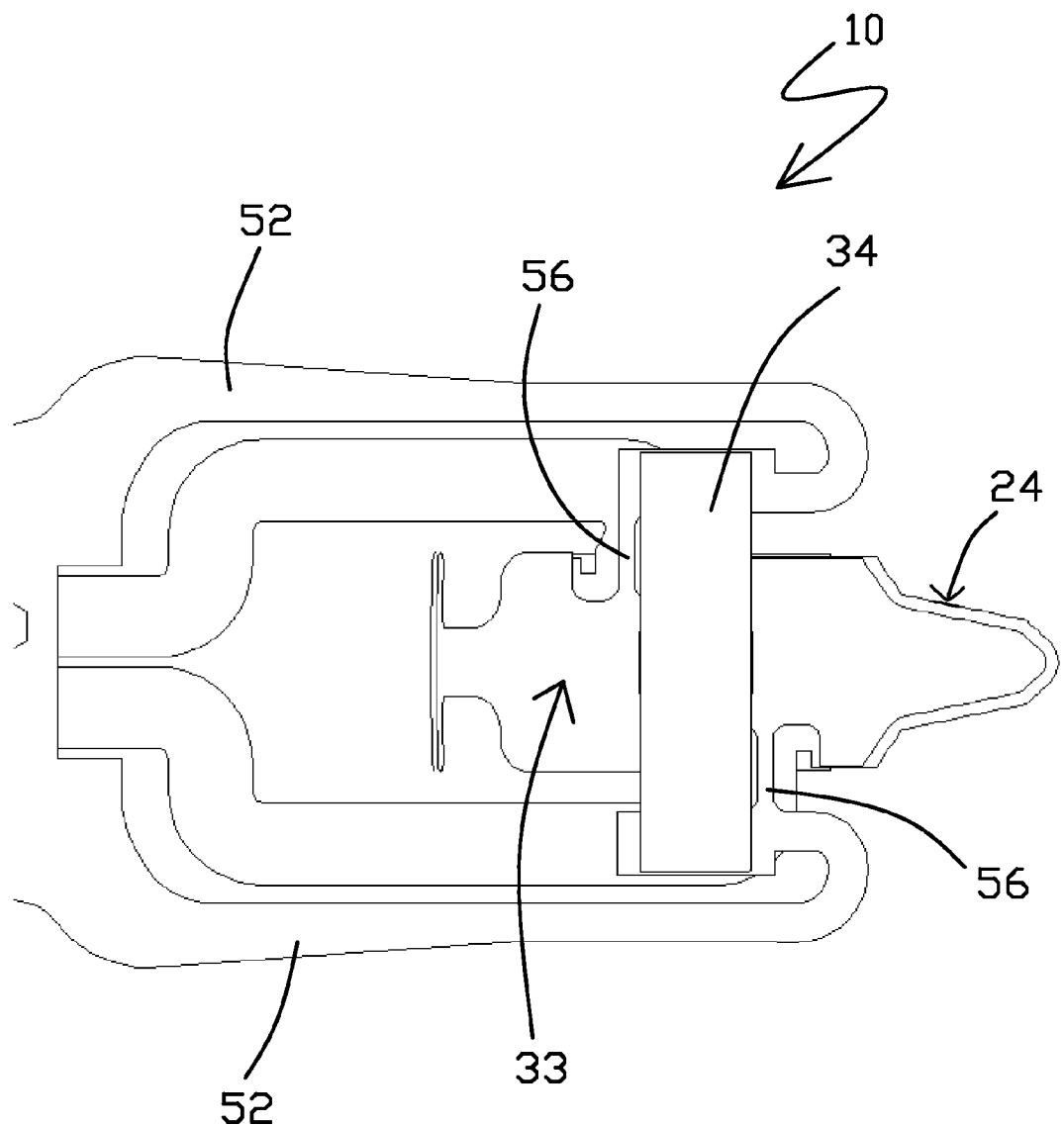

As shown in FIGS. 5A-5F, the flexure 12 is formed from overlaying spring metal such as stainless steel layer 40, polyimide or other dielectric layer 42, copper or other conductive material layer 44 and polyimide coverlay 46. The dielectric layer 42 generally electrically isolates structures formed in the conductive material layer 44 from adjacent portions of the stainless steel layer 40. Coverlay 46 generally covers and protects the structures formed in the conductive material layer 44. The gimbal 24 includes base portion 50, spring arms 52, and mounting portion 54 formed in the stainless steel layer 40. The spring arms 52 extend from the base portion 50. The mounting portion 54, which is part of the tongue 33, is supported between the spring arms 52 by a pair of struts 56 that extend from support regions 58 on the distal end portions of the spring arms 52. In some embodiments, the pair of struts 56 is the only part of the stainless steel layer 40 that connects or otherwise supports the tongue 33 between the spring arms 52. Specifically, the struts 56 can be the only structural linkage between the spring arms 52 and the tongue 33. Also, the struts 56, in connecting with the tongue 33, can be the only part of the stainless steel layer 40 that connects between the spring arms 52 distal of the base portion 50. As shown, the struts 56 are offset from one another with respect to the longitudinal axis of the flexure 12 or otherwise configured so as to provide for rotational movement of the mounting portion 54 about the tracking axis with respect to the spring arms 52. As best shown in FIG. 8B (further discussed herein), one strut 56 of the pair of struts 56 is located proximally of the motor 34 while the other strut 56 of the pair of struts 56 is located distally of the motor 34 such that the motor 34 is between the pair of struts 56. Each strut 56 has a longitudinal axis that extends generally perpendicular with respect to the longitudinal axis of the suspension 10. The longitudinal axes of the struts 56 extend parallel but do not intersect or otherwise overlap with each other when the struts 56 are not stressed (e.g., not bent). As shown in FIG. 5F, the struts 56 can each be the narrowest part of the stainless steel layer 40 in an X-Y plane (as viewed from the overhead perspective of FIG. 8B) while the thickness of the stainless steel layer 40 can be consistent along the flexure 12.

As perhaps best shown in FIGS. 4A and 5E, the opposite ends of the motor 34 are attached (e.g., by structural adhesive such as epoxy) to the support regions 58 of the spring arms 52. In this way, the support regions 58 can serve as motor mounting pads. Portions of the dielectric layer 42 extend underneath the struts 56 in FIG. 4B. As shown in FIG. 5C, a plurality of traces 60 formed in the conductive material layer 44 extend between the base portion 50 and the tongue 33 over supporting portions 62 formed in the dielectric layer 42. A number of the traces 60 terminate at locations on a distal region on the tongue 33 and are configured to be electrically attached to terminals of the read/write head (not shown) on the slider 32. Other traces 60 terminate at a contact such as copper pad 64 on the tongue 33, below the motor 34. In the illustrated embodiment, the copper pad 64 is located generally centrally between the spring arms 52. As perhaps best shown in FIG. 4B, the dielectric layer 42 has an opening over the pad 64. A structural and electrical connection, e.g., using conductive adhesive, is made between the copper pad 64 and an electrical terminal on the motor 34. Another electrical connection to a terminal on the motor 34 (e.g., a ground terminal) is made through the dimple 36 (i.e., the dimple 36 is in electrical contact with the terminal on the motor 34). In other embodiments, the electrical connections to the motor 34 can be made by other approaches and structures.

Figure 5A:
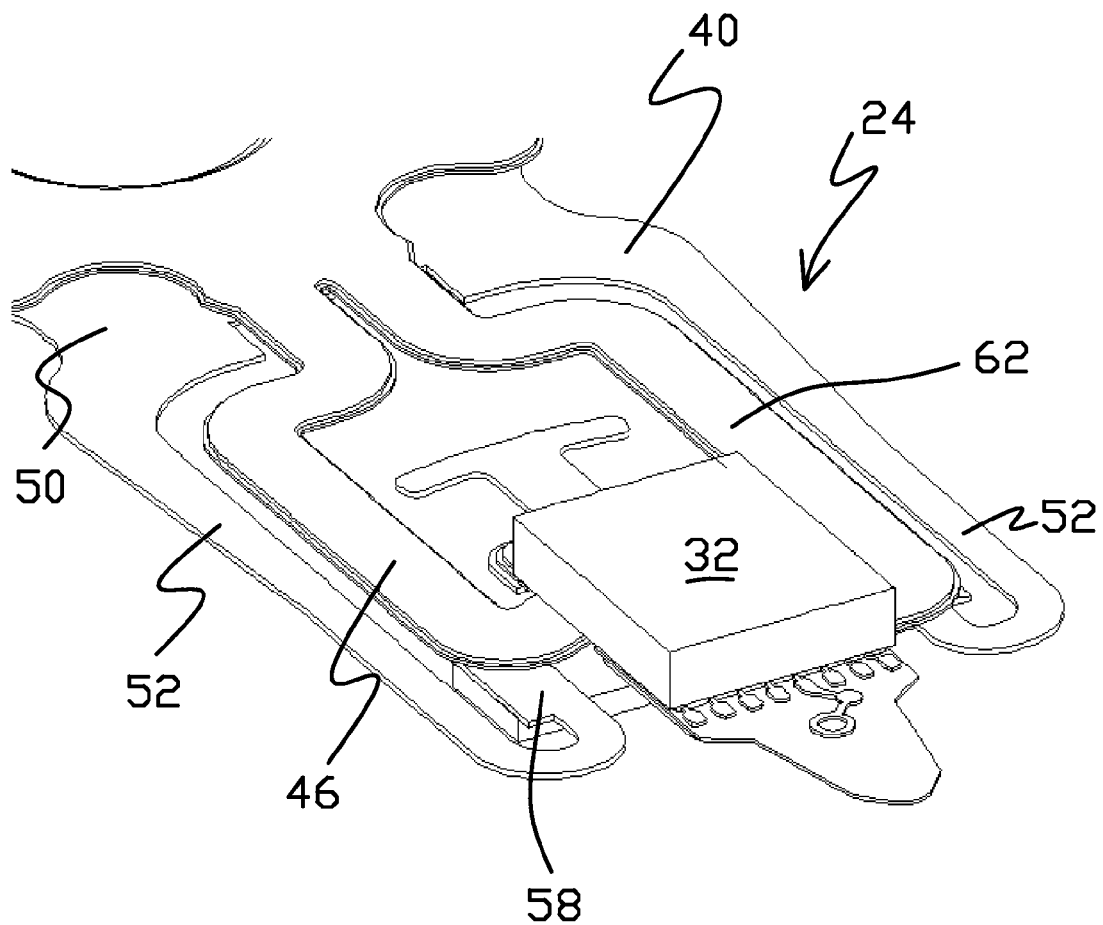
FIG. 5A is an isometric view of the trace side (i.e., the side opposite that shown in FIG. 4A) of the flexure shown in FIG. 1.
Figure 5B:
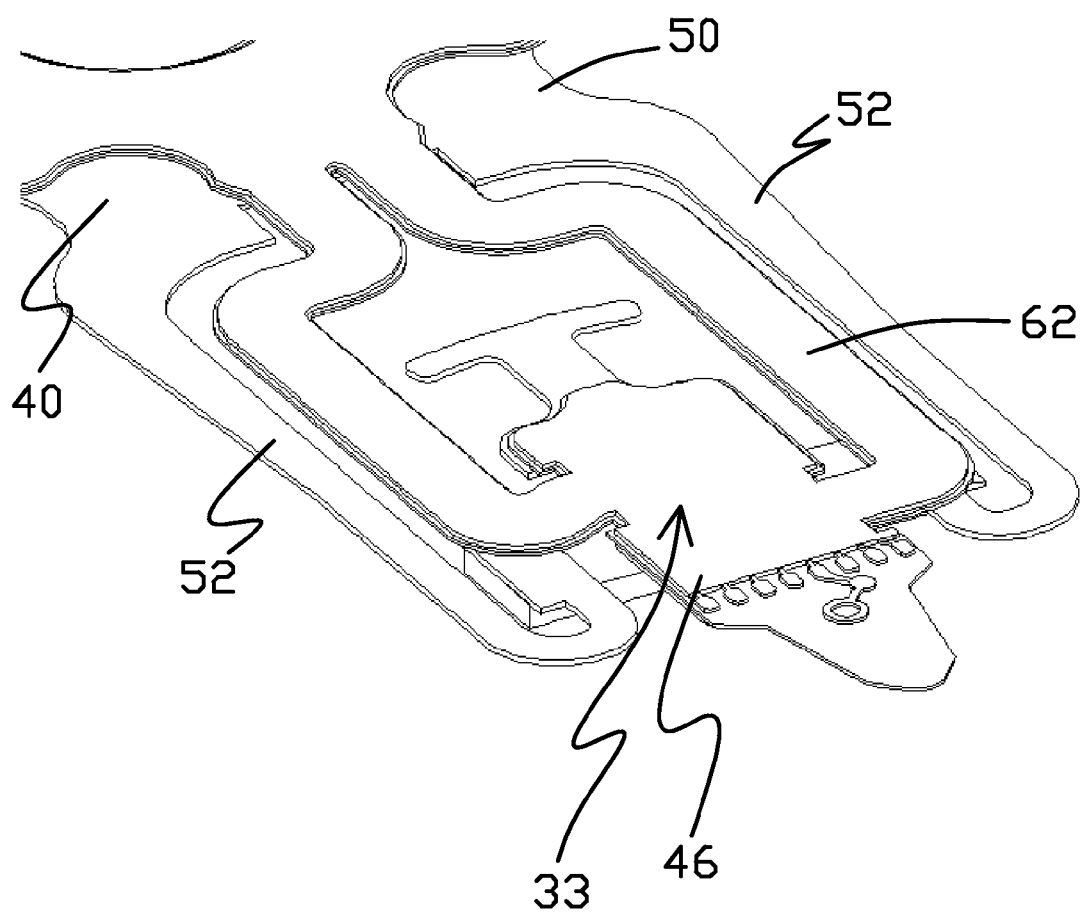
FIG. 5B is the view of FIG. 5A but with the head slider removed.
Figure 5C:
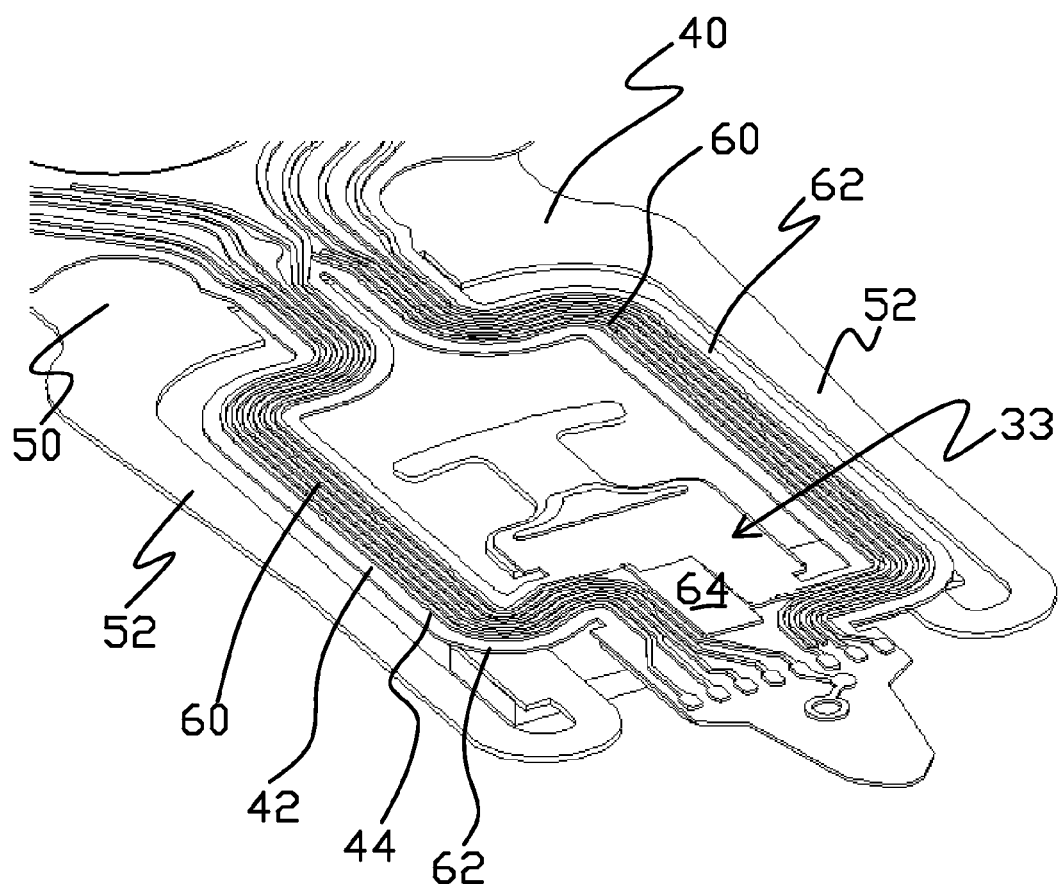
FIG. 5C is the view of FIG. 5B but with the polyimide coverlay removed.
Figure 5D:
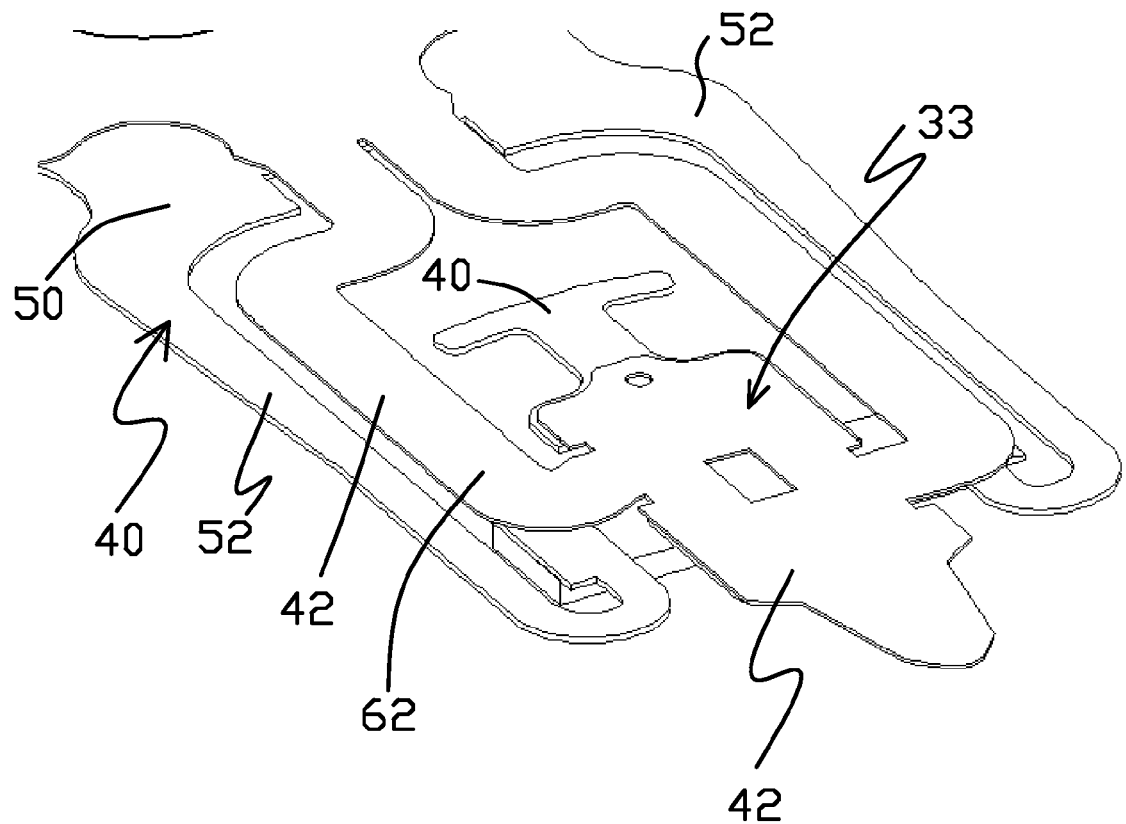
FIG. 5D is the view of FIG. 5C but with the conductive material layer removed.
Figure 5E:
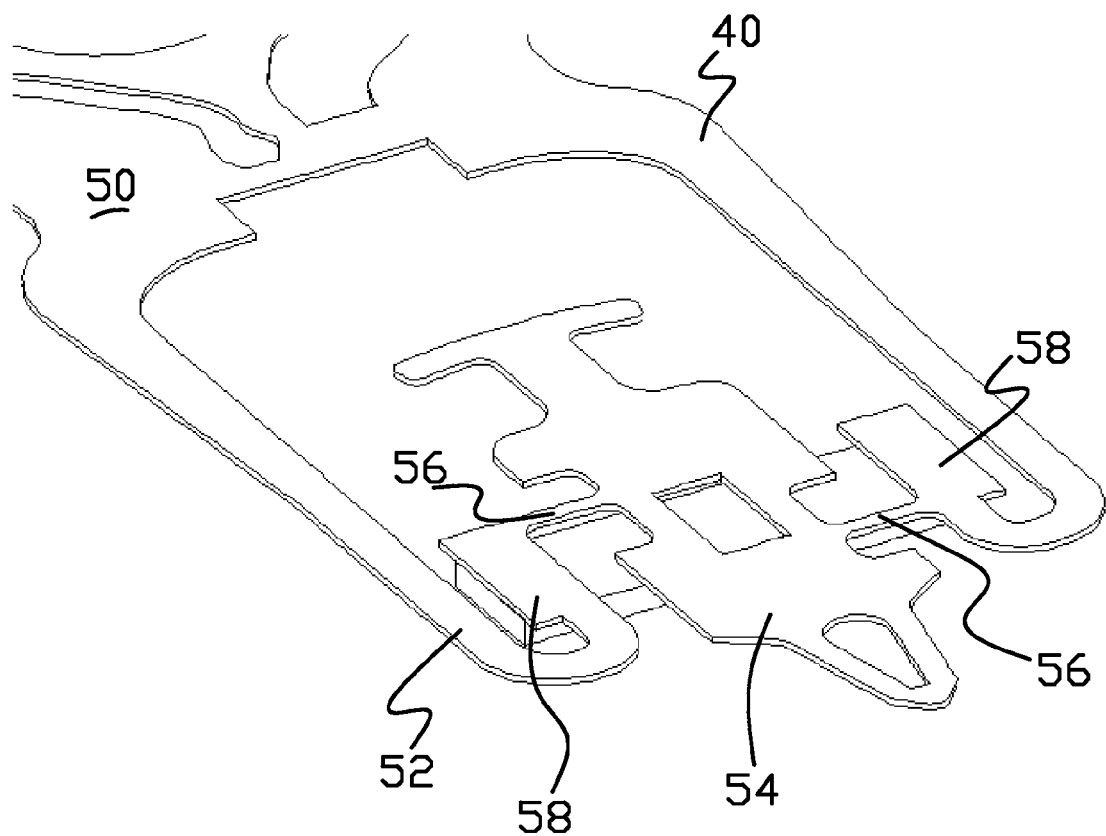
FIG. 5E is the view of FIG. 5D but with the dielectric material layer removed.
Figure 5F:
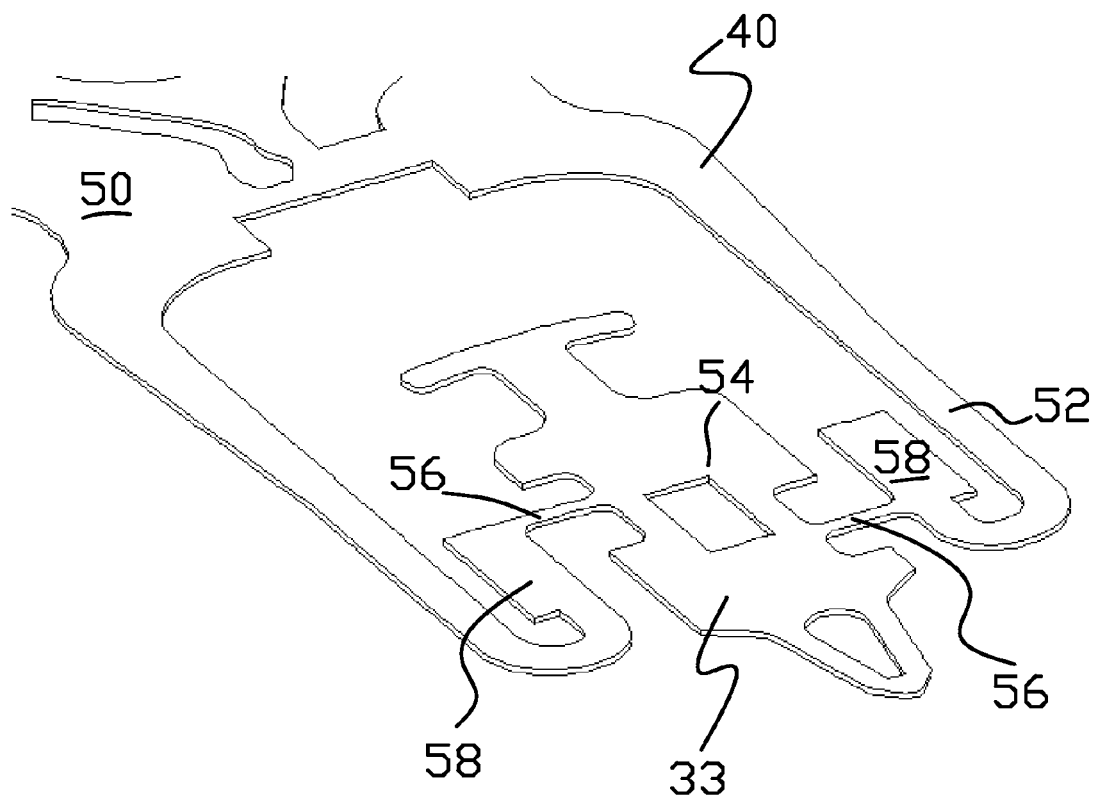
FIG. 5F is the view of FIG. 5E but with the piezoelectric motor removed.

As shown in FIGS. 5A and 5B, the slider 32 sits on the coverlay 46 of the tongue 33. Coverlay 46 provides protection for the traces 60. As shown in FIGS. 5A-5C, which show that the supporting portions 62 are offset with respect to the longitudinal direction of the flexure 12, portions of the traces 60 on the opposite sides of the flexure 12 are offset from each other in a manner similar to that of the struts 56 (e.g., portions of the traces overlay the struts in the illustrated embodiment). Offset traces of this type can increase the stroke performance of the DSA structure 14. Other embodiments of the invention (not shown) do not have offset traces. It is noted that, in some embodiments, the supporting portions 62 may provide negligible mechanical support to the tongue 33 relative to the struts 56.

Figure 6:
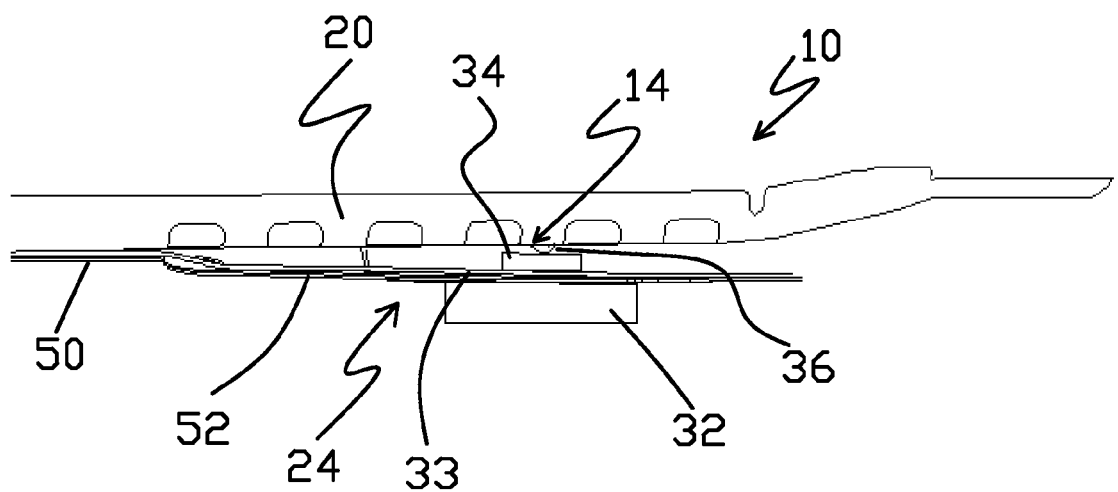
FIG. 6 is a side view of the distal end of the suspension shown in FIG. 1.
Figure 7:
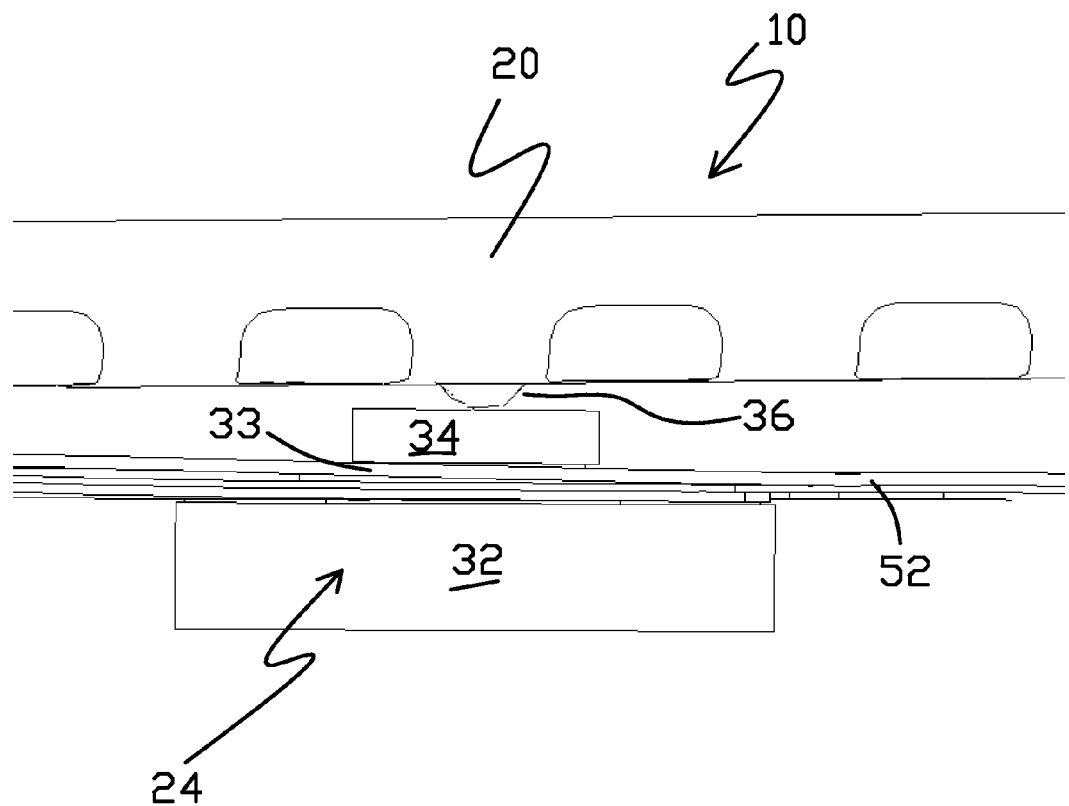
FIG. 7 is a closer view of the portion of FIG. 6 showing the dimple, motor, and head slider.

FIGS. 6 and 7 are side views of the suspension 10, illustrating the gimbal 24 and DSA structure 14. As shown, the dimple 36, which is a structure formed in the stainless steel material that forms the loadbeam 18, and which extends from the loadbeam 18, engages the motor 34 and functions as a load point by urging the portion of the gimbal 24 to which the motor 34 is connected out of plane with respect to the base portion 50 of the flexure 12. A bend or transition in the flexure 12 can occur at any desired location along the spring arms 52 due to the urging of the gimbal 24 by the dimple 36. The dimple 36 can also provide an electrical contact to a terminal (not visible) on the portion of the motor 34 engaged by the dimple. For example, if the stainless steel loadbeam 18 is electrically grounded or otherwise part of an electrical circuit, the dimple 36 can provide an electrical ground potential or electrical connection to the terminal on the motor 34. Other embodiments of the invention (not shown) include other dimple structures such as plated structures that provide these functions. The dimple 36 can be plated with conductive material such as gold to enhance the electrical connection to the terminal of the motor 34 which can also be plated with conductive material such as gold. Still other embodiments (not shown) use structures other than the dimple 36 to provide a grounding or other electrical connection to the motor 34. In one such embodiment, for example, there is another copper pad on the end of one of the support regions 58, and an electrical connection (e.g., a ground connection) can be made by a structure such as conductive adhesive between a terminal on the motor 34 and the conductive material pad on the support region of the flexure 12. In some embodiments, the motor 34 is structurally attached to the tongue 33 at a location between the opposite lateral end portions of the tongue 33. In such embodiments, the motor 34 is attached to the tongue 33 of the gimbal 24 in addition to the motor 34 being attached to the support regions 58 of the spring arms 52.

The operation of DSA structure 14 can be described with reference to FIGS. 8A-8C that are plan views of the stainless steel side of the gimbal 24 of the flexure 12. As shown in FIG. 8B, the DSA structure 14 and tongue 33 are in a neutral, undriven state with the tongue 33 generally centrally located between the spring arms 52 when no tracking drive signal is applied to the motor 34. As shown in FIG. 8A, when a first potential (e.g., positive) tracking drive signal is applied to the motor 34, the shape of the motor changes and its length generally expands. This change in shape increases the distance between the support regions 58 as shown in FIG. 8A, which in connection with the mechanical action of the linking struts 56, causes the tongue 33 to move or rotate in a first direction with respect to the spring arms 52 about the tracking axis. As shown, the lengthening of the motor 34 stretches the gimbal 24 laterally and causes the struts 56 to bend (e.g., bow inward). Because of the offset arrangement of the struts 56, the struts 56 bend such that the tongue 33 rotates in the first direction.

Figure 8C:
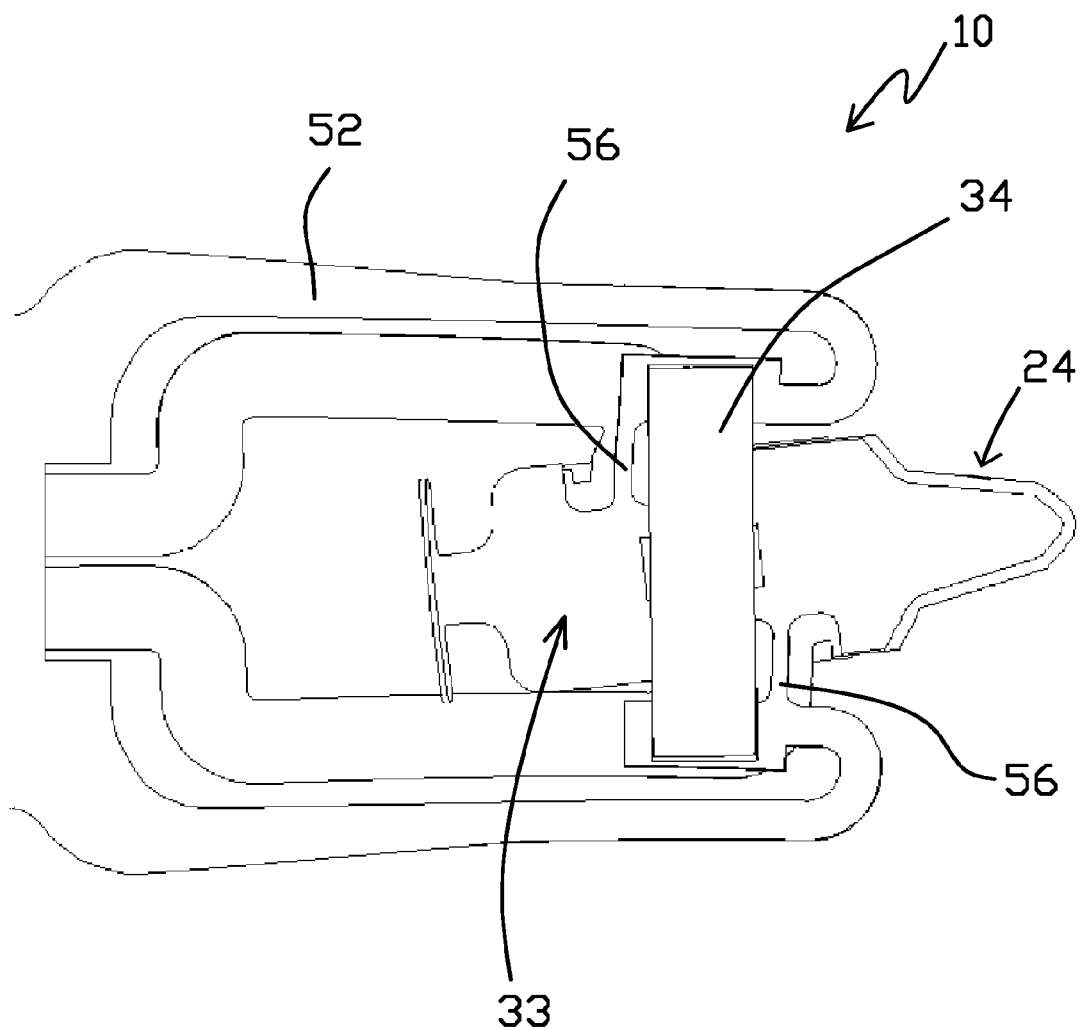

As shown in FIG. 8C, when a second potential (e.g., negative) tracking drive signal is applied to the motor 34, the shape of the motor changes and its length generally contracts. This change in shape decreases the distance between the support regions 58 as shown in FIG. 8C, which in connection with the mechanical action of the linking struts 56, causes the tongue 33 to move or rotate in a second direction with respect to the spring arms 52 about the tracking axis. The second direction is opposite the first direction. As shown, the shortening of the motor 34 compresses the gimbal 24 laterally and causes the struts 56 to bend (e.g., bow outward). Because of the offset arrangement of the struts 56, the struts 56 bend such that the tongue 33 rotates in the second direction. Some, although relatively little, out-of-plane motion of other portions of the gimbal 24 is produced during the tracking action of DSA structure 14 as described above. With this embodiment of the invention the, flexure slider mounting region on the tongue 33 generally rotates with respect to the spring arms 52 as the spring arms 52 stay stationary or experience little movement.

Figure 10:
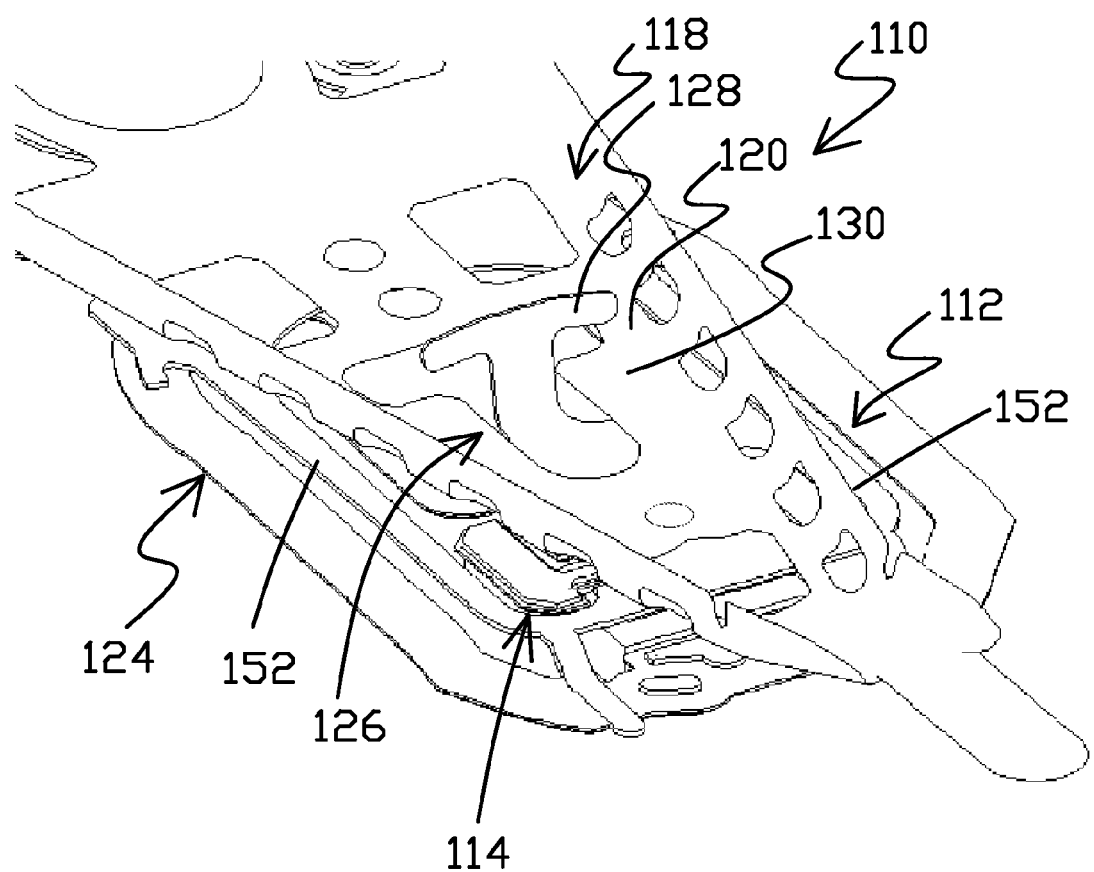
FIG. 10 is an isometric view of the loadbeam side of the distal end of the suspension shown in FIG. 9.
Figure 11:
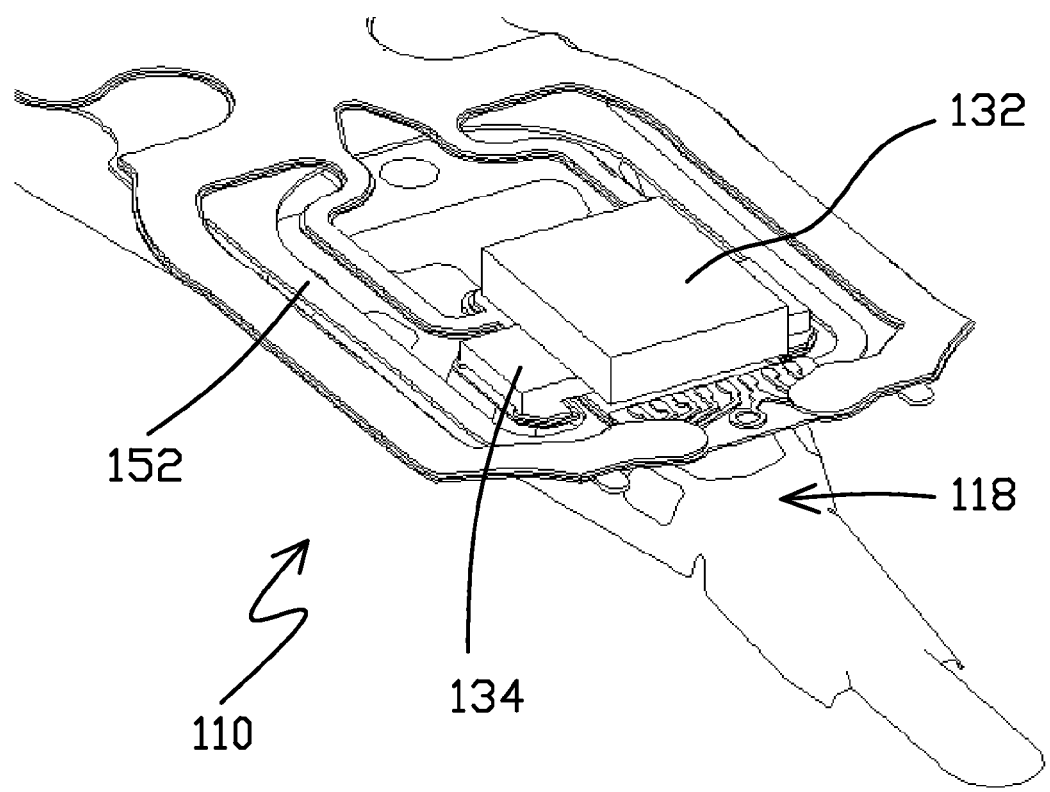
FIG. 11 is an isometric view of the flexure side (i.e., the side opposite that shown in FIG. 10) of the distal end of the suspension shown in FIG. 9.

FIG. 9 is an isometric view of the loadbeam-side of a suspension 110 having a flexure 112 with a co-located or gimbal-based dual stage actuation (DSA) structure 114 in accordance with a second embodiment of the invention (i.e., a trace side version). The components of the suspension 110 can be configured similarly to the previously discussed suspension 10 unless otherwise described or illustrated. FIG. 10 is an isometric view of the distal end of the suspension 110. FIG. 11 is an isometric view of the flexure-side of the distal end of the suspension 110, showing the side opposite that shown in FIG. 10. As shown in FIG. 10, the suspension 110 includes a baseplate 116 as a proximal mounting structure. As further shown in FIG. 11, the suspension 110 includes a loadbeam 118 having a rigid or beam region 20 coupled to the baseplate 116 along a spring or hinge region 122. The loadbeam 18 can be formed from stainless steel. Flexure 112 includes a gimbal 124 at its distal end. A DSA structure 114 is located on the gimbal 124, adjacent the distal end of the loadbeam 118. The illustrated embodiment of the suspension 110 also includes a gimbal limiter 126 comprising a tab 128 configured to engage a stop portion 130 of the loadbeam 118. The DSA structure 114 includes a motor 134, which is a PZT actuator in the illustrated embodiment, mounted to a motor mounting region of the tongue 133, on the side of the flexure 112 opposite the loadbeam 118. A head slider 132 is mounted to the side of the motor 134 opposite the flexure 112. As described in greater detail below, in response to electrical drive signals applied to the motor 134, the motor drives portions of the gimbal 124, including portions of the tongue 133, motor 134 and slider 132, about a generally transverse tracking axis.

Figure 12:
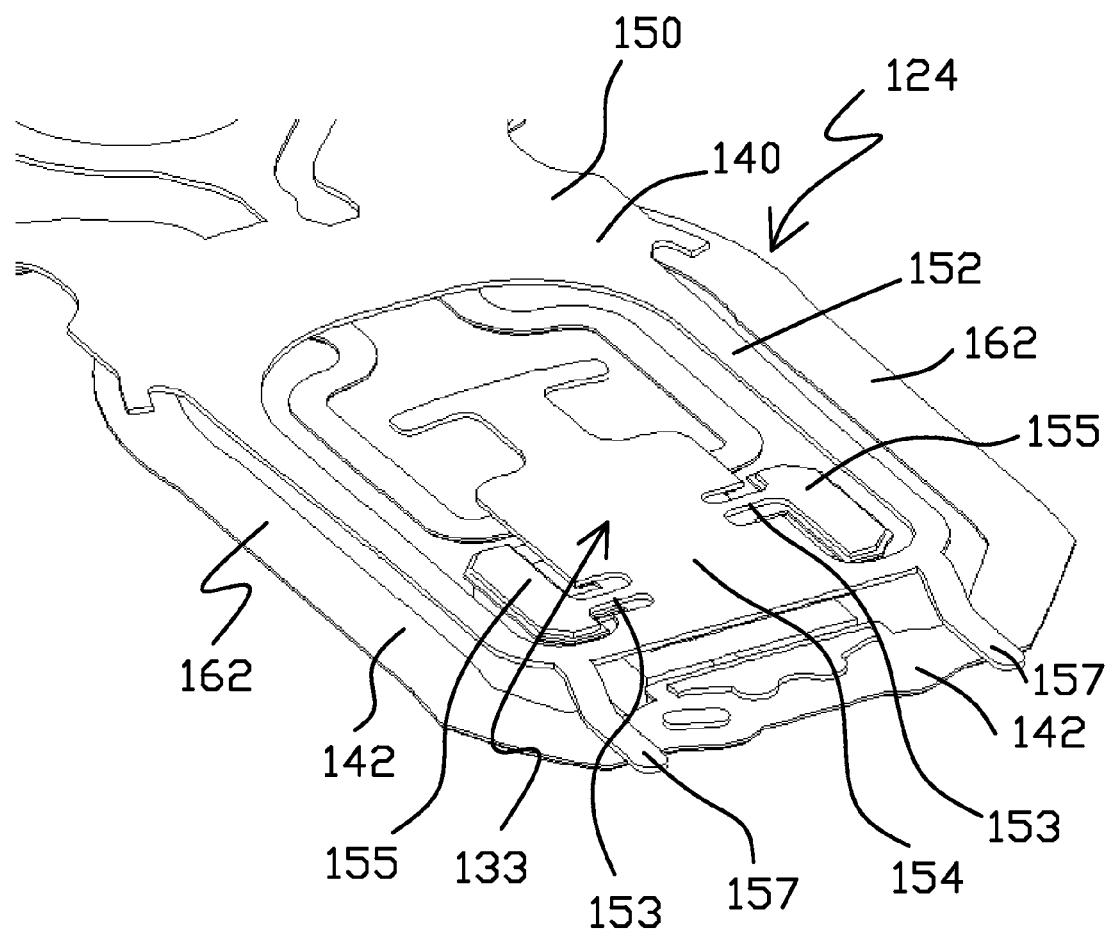
FIG. 12 is an isometric view of the stainless steel side of the flexure shown in FIG. 9.
Figure 13A:
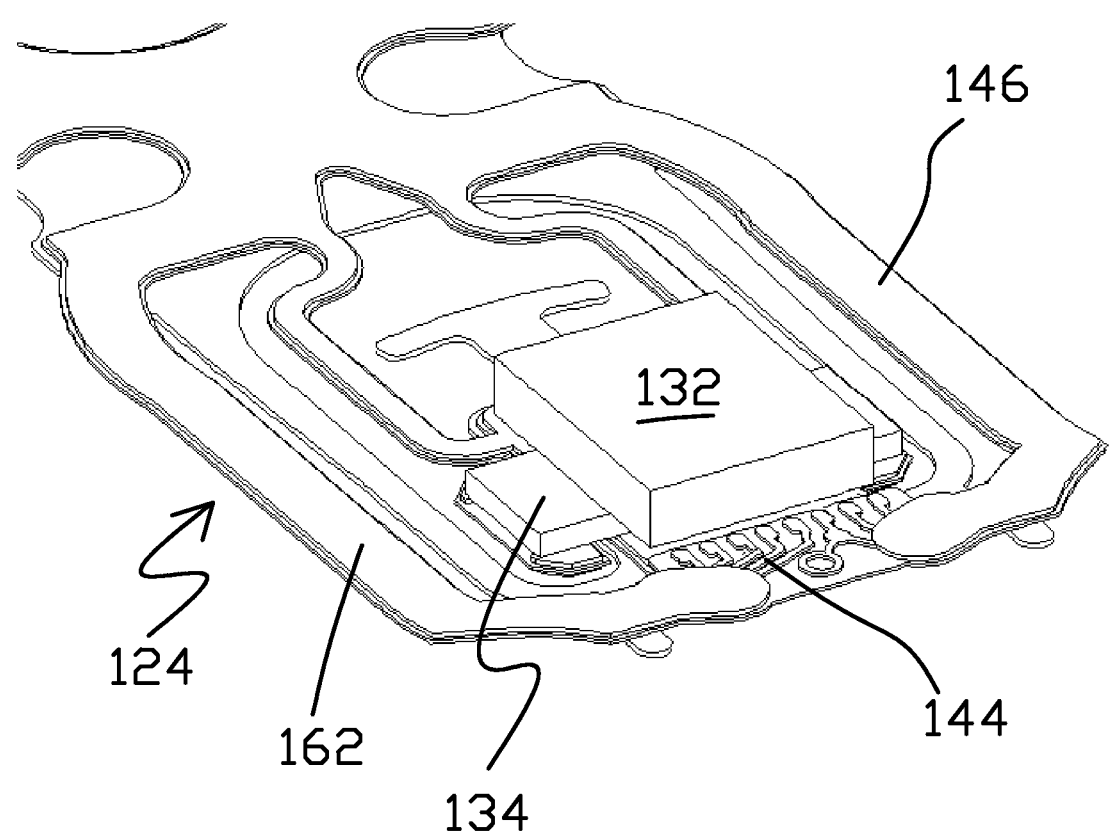
FIG. 13A is an isometric view of the trace side (i.e., the side opposite that shown in FIG. 12) of the flexure shown in FIG. 9.
Figure 13B:
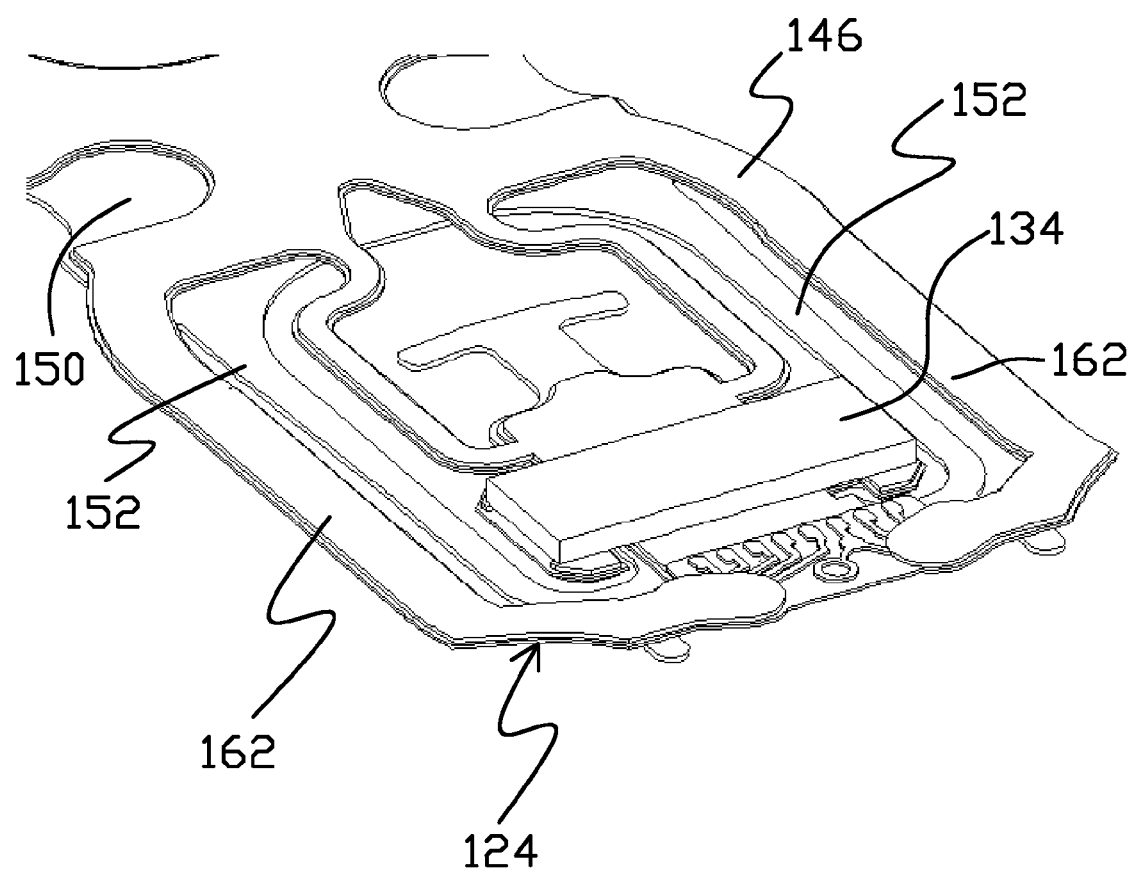
FIG. 13B is the view of FIG. 13A but with the head slider removed.
Figure 13C:
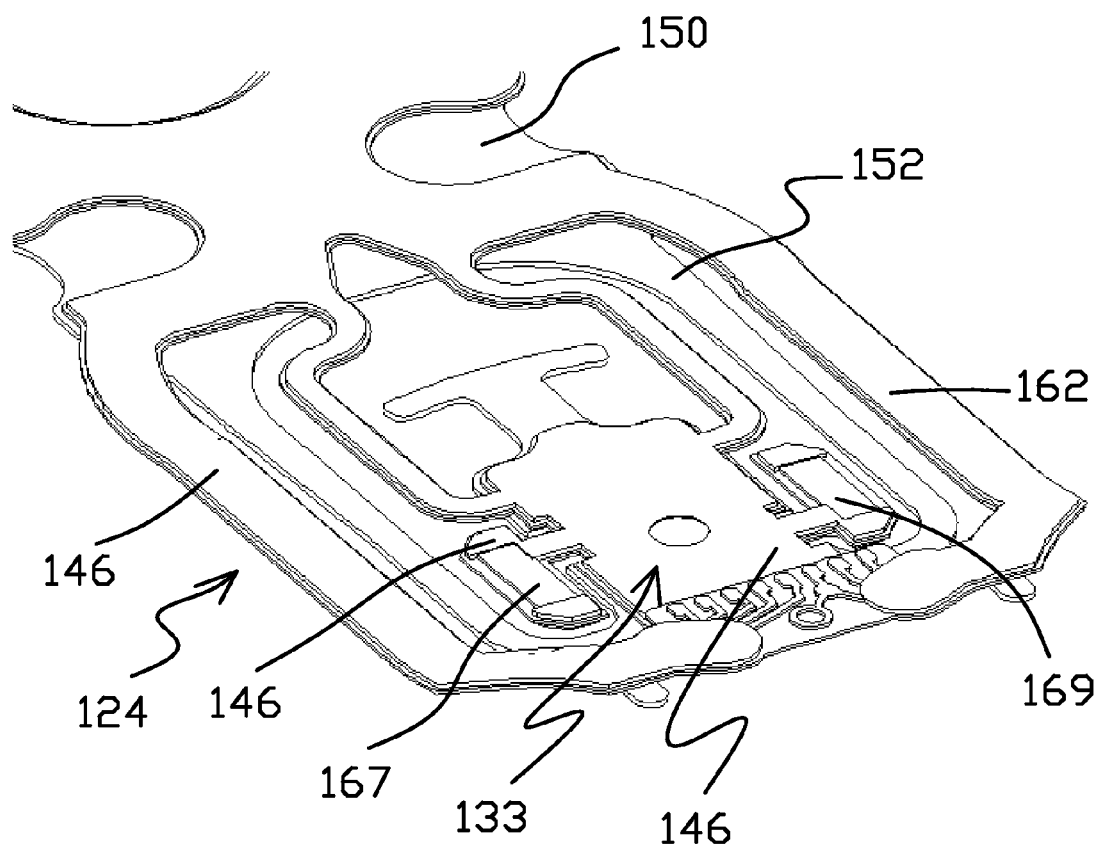
FIG. 13C is the view of FIG. 13B but with the motor removed.
Figure 13D:
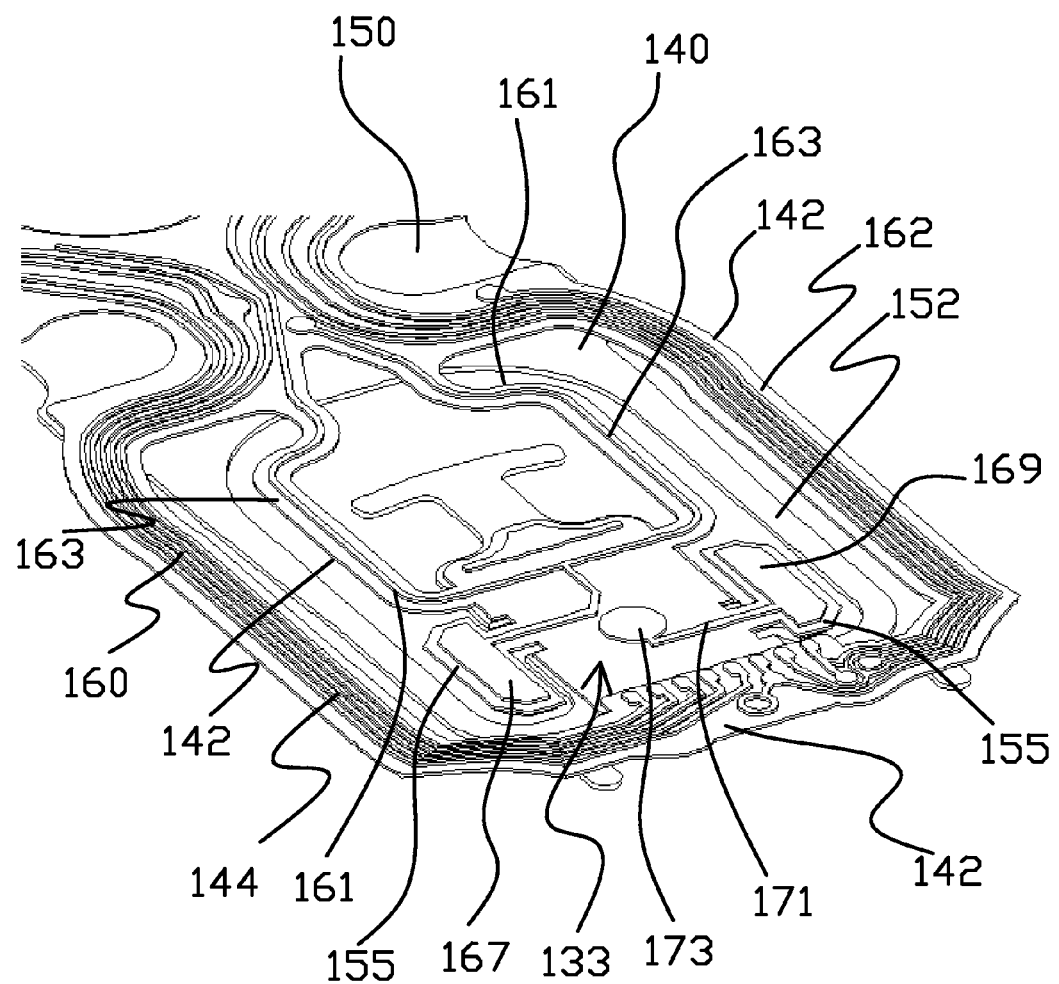
FIG. 13D is the view g of FIG. 13C but with the coverlay removed.
Figure 13E:
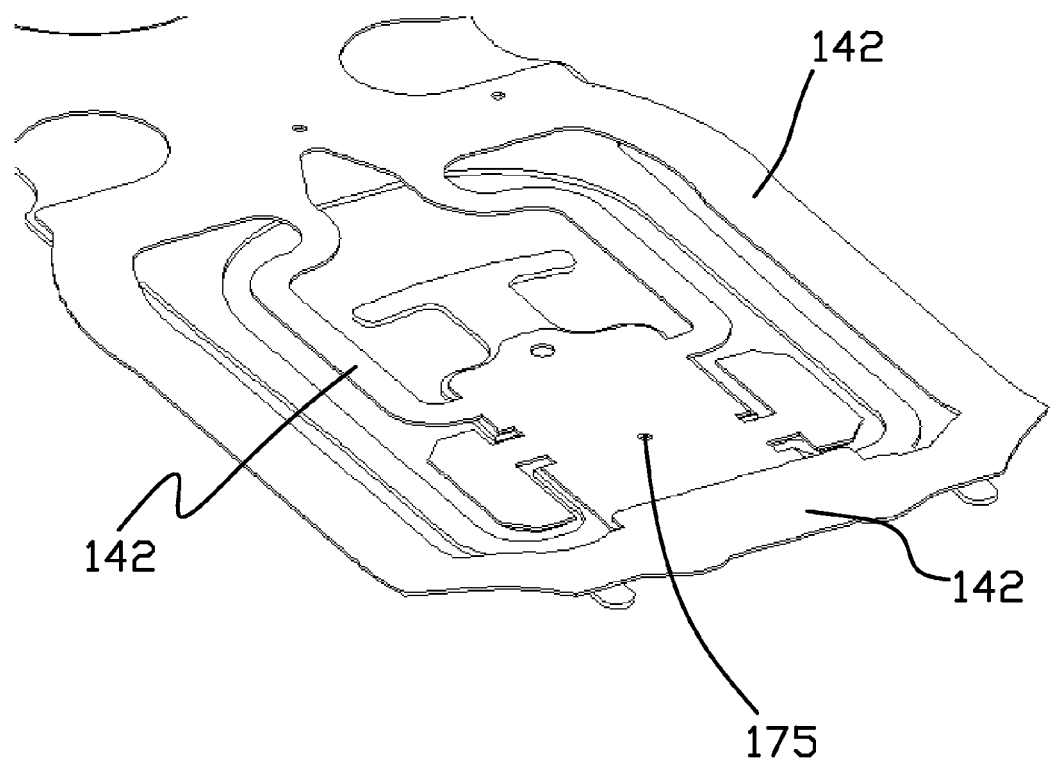
FIG. 13E is the view of FIG. 13D but with the conductive material layer removed.
Figure 13F:
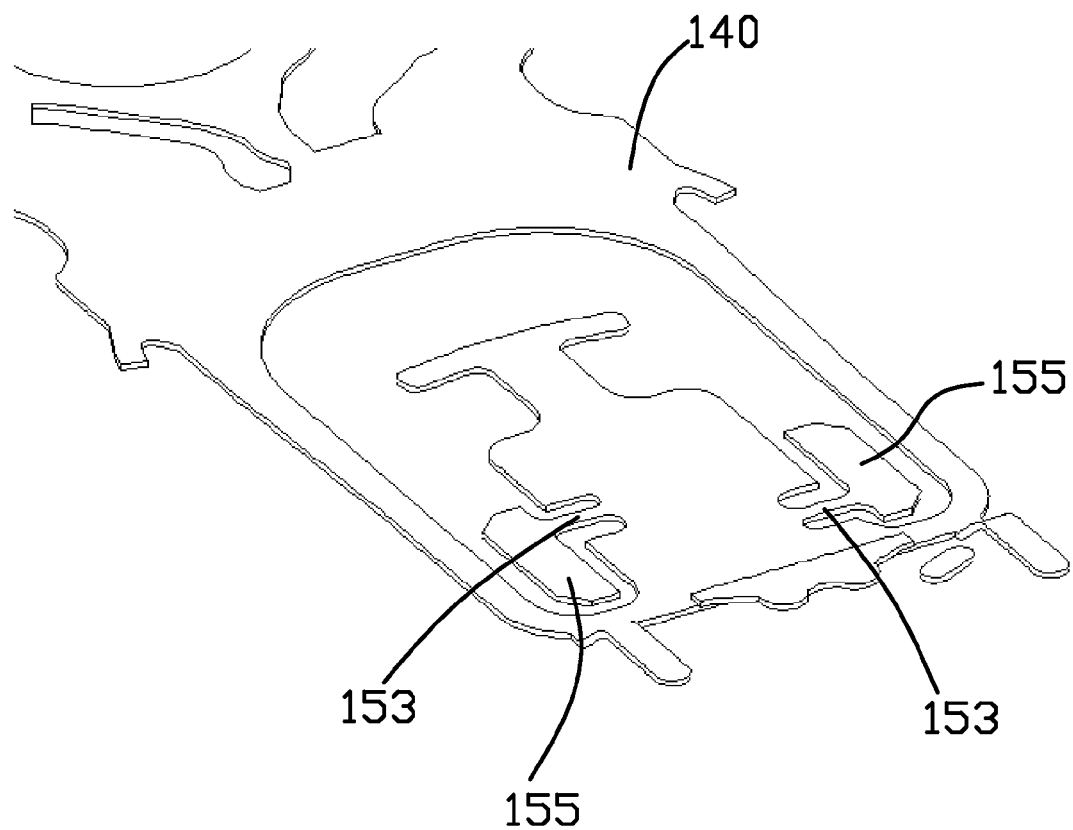
FIG. 13F is the view of FIG. 13E but with the dielectric material layer removed.

FIG. 12 is a detailed isometric view of the stainless steel-side of the flexure 112 and DSA structure 14 shown in FIG. 9. FIGS. 13A-13F are isometric views of the flexure 112 and DSA structure 114 showing the side opposite that shown in FIG. 12. Specifically, FIGS. 13A-13F show the various layers that comprise the flexure 112 and DSA structure 114. FIG. 13B is the drawing of FIG. 13A but with the head slider 132 removed to further show details of the motor 134 on the tongue 133. FIG. 13C is the drawing of FIG. 13B but with the motor 134 removed to reveal details of the tongue 133. FIG. 13D is the drawing of FIG. 13C but with the coverlay 146 removed to reveal a conductive material layer 144 including traces 160 and other structures formed in the conductive material layer 144. FIG. 13E is the drawing of FIG. 13D but with the conductive material layer 144 removed to further reveal the dielectric layer 142. FIG. 13F is the drawing of FIG. 13E but with the dielectric layer 142 removed to show only the stainless steel layer 140 of the flexure 112. It will be understood that the stainless steel layer 140 could alternatively be formed from another metal or rigid material. As shown, the flexure 112 is formed from overlaying spring metal such as stainless steel layer 140, polyimide or other dielectric layer 142, copper or other conductive material layer 144, and coverlay 146. The dielectric layer 142 generally electrically isolates structures formed in the conductive material layer 144 from adjacent portions of the stainless steel layer 140. Coverlay 146 generally covers and protects the structures formed in the conductive material layer 144.

The gimbal 124 includes base portion 150, spring arms 152, and center region 154 of the tongue 133. The base portion 150, the spring arms 152, and the center region 154 are each formed from the stainless steel layer 140. The spring arms 152 extend from the base portion 150. The center region 154, which is a center part of the tongue 133, is connected to the distal ends of the spring arms 152 and is supported between the spring arms 152. Also formed in the stainless steel layer 140 is a pair of struts 153. Each of the struts 153 extends from one of the opposite lateral sides of the center region 154 and has a motor mounting flag or pad 155 on its outer end. As shown, the struts 153 are offset from one another with respect to the longitudinal axis of the flexure 112 or otherwise configured so as to provide for rotational movement of the motor 134 and the head slider 132 mounted thereto about the tracking axis with respect to the center region 154. Each strut 153 comprises a longitudinal axis that extends generally perpendicular with respect to the longitudinal axis of the suspension 110. The longitudinal axes of the struts 153 extend parallel but do not intersect or otherwise overlap with each other when the struts 153 are not stressed (e.g., not bent). The struts 153 can be the only structural linkage between the center region 154 and the pads 155 (e.g., the only part of the stainless steel layer 140 connecting the center region 154 with the pads 155 is the struts 153, a single strut 153 for each pad 155). As shown in FIG. 13F, the struts 153 can each be the narrowest part of the stainless steel layer 140 in an X-Y plane (as viewed from the overhead perspective of FIG. $16B_1$) while the thickness of the stainless steel layer 140 can be consistent along the flexure 112.

As shown in FIG. 13D, a plurality of traces 160 are formed in the conductive material layer 144 and extend between the base portion 150 and tongue 133 along paths generally laterally outside the spring arms 152 and over supporting portions 162 formed in the dielectric layer 142. A number of the traces 160 terminate at locations adjacent the distal region of the tongue 133 and are configured to be electrically attached to read/write head terminals (not shown) on the slider 132. A pair of power traces 161 for powering the motor 134 are also formed in the conductive material layer 144, and extend between the base portion 150 and a proximal portion of the tongue 133 along paths generally inside the spring arms 152 and over supporting portions 163 formed in the dielectric layer 142. The motor power traces 161 terminate at a first motor terminal pad 167 on one of the motor mounting pads 155. A second motor terminal pad 169 is formed in the conductive material layer 144 on the other motor mounting pad 155, and is coupled by a trace 171 to a conductive via 173 that is shown on the tongue 133 at a location between the motor mounting pads 155. As best viewed in FIG. 13D, via 173 extends through an opening 175 in the dielectric layer 142 (shown in FIG. 13E) to electrically contact the stainless steel layer 140 of the flexure 112. The motor terminal pad 169 can be electrically connected to a ground potential at the stainless steel layer 140 by the trace 171 and the via 173. As shown in FIG. 12, structures such as tabs 157 in the stainless steel layer 140 are formed out of the plane of the stainless steel layer and engage the distal portion of the trace supporting portions 162 to push the terminal ends of the traces 161 down so the terminals on the slider 132 can be correctly electrically attached (e.g., by solder bonds) to the traces while accommodating the thickness of the motor 134. FIG. 13E also illustrates other holes in the dielectric layer that can be used in connection with conductive vias to electrically connect (e.g., ground) traces and other structures in the conductive material layer 144 to the stainless steel layer 140. In other embodiments, other approaches and structures can be used to couple the tracking drive signals to the terminals on the motor 134.

The electrical terminals on the motor 134 may be on the same side (e.g., top or bottom) but opposite longitudinal ends of the motor 134. As shown in FIGS. 13B and 13C, the motor 134 can be attached to the gimbal 124 by bonding the electrical terminals of the motor 134 to the motor terminal pads 167 and 169 using conductive adhesive. By this approach, the motor 134 is both structurally and electrically connected to the gimbal 124. As shown in FIG. 13C, the motor terminal pads 167 and 169 are exposed through openings in the coverlay 146 to provide access for the conductive adhesive.

Figure 14:
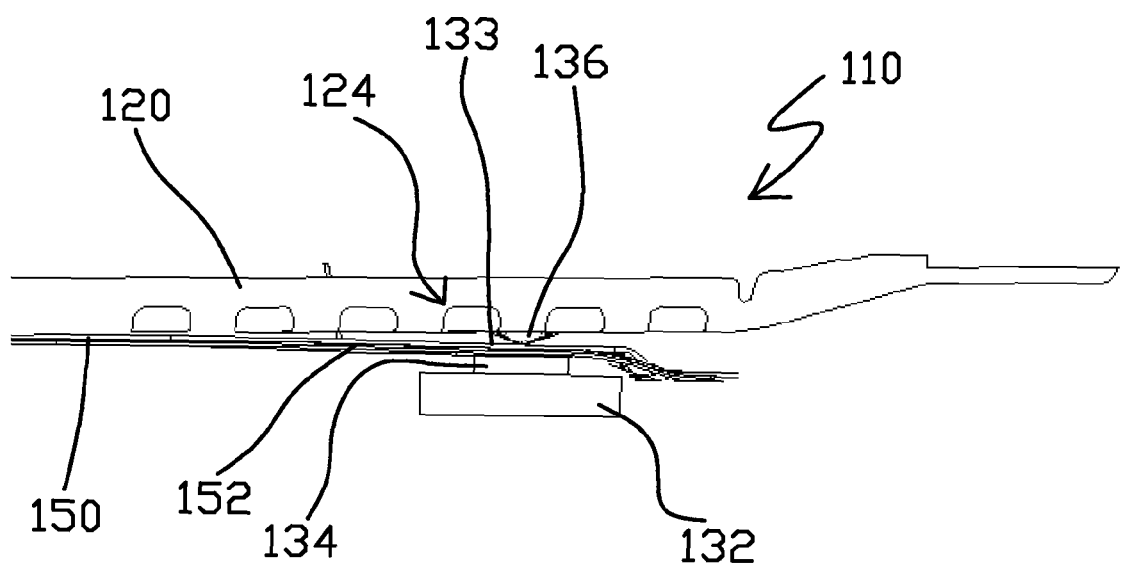
FIG. 14 is a side view of the distal end of the suspension shown in FIG. 9.
Figure 15:
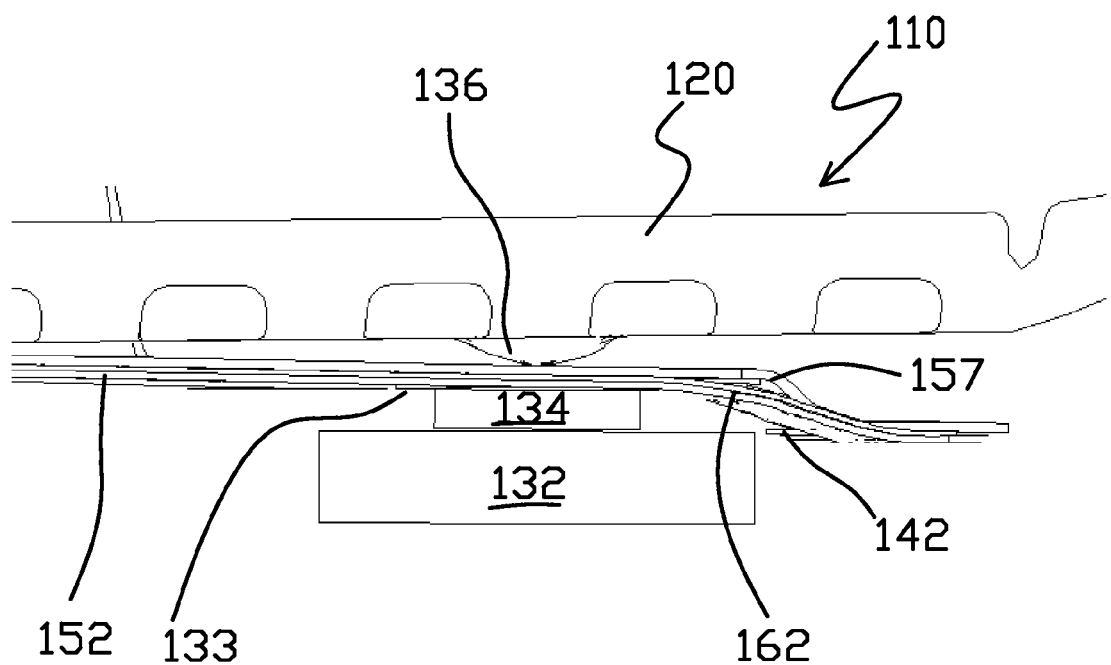
FIG. 15 is a closer view of the portion of FIG. 14 showing the dimple, motor, and head slider.

FIGS. 14 and 15 are side views of the suspension 110, illustrating the gimbal 124 and DSA structure 114. As shown, the dimple 136, which is a structure formed in the stainless steel of the loadbeam 118 and which projects from the loadbeam 118, engages the center region 154 of stainless steel layer 140 on the side of the tongue 133 opposite the motor 134. Dimple 136 functions as a load point by urging the portion of the gimbal 124 to which the motor 134 is connected out of plane with respect to the base portion 150 of the flexure 112. In the illustrated embodiment, the motor 134 is located between the tongue 133 and the head slider 132 (e.g., the motor 134 is sandwiched in a vertical axis). As shown in FIGS. 14 and 15, the slider 132 is structurally supported by the motor 134 such that the only structural linkage between the flexure 112 and the slider 132 runs through or otherwise includes the motor 134. The manner by which the stainless steel tabs 157 locate the portion of dielectric layer 142 with the terminal ends of the traces 160 at the correct z-height and adjacent to the portion of the head slider 132 that includes the read/write head terminals is shown in FIG. 15.

The operation of DSA structure 114 can be described with reference to FIGS. $16A_1$, $16A_2$, $16B_1$, $16B_2$, $16C_1$ and $16C_2$ that are plan views of the gimbal 124 of the flexure 112. FIGS. $16A_1$, $16B_1$ and $16C_1$ illustrate the stainless steel side of the flexure 112, and FIGS. $16A_2$, $16B_2$ and $16C_2$ illustrate the trace side of the flexure 112, with the motor 134 and head slider 132 shown. As shown in FIGS. $16B_1$ and $16B_2$, the DSA structure 114 and tongue 133, as well as the motor 134 on the linkage formed by the motor mounting pads 155 and struts 153, are in a neutral, undriven state with the head slider positioned generally parallel to the longitudinal axis of the flexure 112 when no tracking drive signal is applied to the motor 134. The struts 153 are not bent or otherwise stressed in this state. As shown in FIGS. $16A_1$ and $16A_2$, when a first potential (e.g., positive) tracking drive signal is applied to the motor 134, the shape of the motor changes and its length generally expands. This change in shape increases the distance between the motor mounting pads 155, which in connection with the mechanical action of the linking struts 153, causes the motor 134, and therefore the head slider 132 mounted thereto, to move or rotate in a first direction with respect to the longitudinal axis of the flexure 112 about the tracking axis. As shown, the lengthening of the motor 134 stretches the struts 153 laterally and causes the struts 153 to bend (e.g., bow inward). Because of the offset arrangement of the struts 153, the struts 153 bend such that the motor 134 and the head slider 132 rotate in the first direction.

As shown in FIGS. $16C_1$ and $16C_2$, when a second potential (e.g., negative) tracking drive signal is applied to the motor 134, the shape of the motor changes and its length generally contracts. This change in shape decreases the distance between the motor mounting pads 155, which in connection with the mechanical action of the linkage including struts 153, causes the motor 134, and therefore the head slider 132 mounted thereto, to move or rotate in a second direction with respect to the longitudinal axis of the flexure 112 about the tracking axis. The second direction is opposite the first direction. As shown, the shortening of the motor 134 compresses the struts 153 laterally and causes the struts 153 to bend (e.g., bow outward). Because of the offset arrangement of the struts 153, the struts 153 bend such that the motor 134 and the head slider 132 rotate in the second direction.

Some, although relatively little, out-of-plane motion of other portions of the gimbal 124 may be produced during the tracking action of DSA structure 114. The linkage provided by the struts 153 accommodates the motion of the motor 134 so the remaining portions of the tongue 133 remain generally aligned with respect to the longitudinal axis of the flexure 112 during this tracking action. For example, the motor 134 and slider 132 rotate, but the center region 154 (or more broadly the tongue 133) does not rotate or rotates only an insignificant or trivial amount.

FIG. 17 is an illustration of a suspension 210 in accordance with another embodiment of the invention. As shown, the suspension 210 includes a co-located or gimbal-based DSA structure 214 and a loadbeam or baseplate-type DSA structure 290. In this way, the suspension 210 is a tri-stage actuated suspension. In one embodiment, the DSA structure 214 is substantially the same as the DSA structure 114 described above (e.g., is configured with any aspect described or shown in connection with FIGS. 9-$16C_2$) except as otherwise specified or shown. In another embodiment, the DSA structure 214 is substantially the same as the DSA structure 14 described above (e.g., is configured with any aspect described or shown in connection with FIGS. 1-8C) except as otherwise specified or shown. Other embodiments of suspension 210 include other gimbal-based DSA structures. The DSA structure 290 can be any known or conventional DSA structure such as any of those described above in the background section.

FIG. 18 is a detailed isometric view of a co-located or gimbal-based DSA structure 314 on the distal end of a suspension 310. The suspension 310 can be configured similarly to the previously discussed suspension 10 unless otherwise described or illustrated. For example, the proximal end (not illustrated) of the suspension 310 can be configured similarly to the proximal end of the previously described suspension 10.

Flexure 312 includes a gimbal 324 at the distal end of the flexure 312. A DSA structure 314 is located on the gimbal 324, adjacent the distal end of the loadbeam 318. The suspension 310 includes a gimbal limiter 326 comprising a tab 328 configured to engage a stop portion 330 of the loadbeam 318. A head slider 332 is mounted to a slider mounting region or tongue 333 of the gimbal 324, on the side of the suspension 310 that is opposite the loadbeam 318. DSA structure 314 includes a motor 334, which is a PZT or other piezoelectric actuator in the illustrated embodiment, mounted to the gimbal 324 of the flexure 312 between the loadbeam 318 and the head slider 332. As described in greater detail below, in response to electrical drive signals applied to the motor 334, the motor 334 drives portions of the gimbal 324, including the tongue 333 and slider 332, about a generally transverse tracking axis.

FIG. 19 is an isometric view of the stainless steel side of the flexure 312 and DSA structure 314 shown in FIG. 18. As shown, a stiffener 339 is mounted on the motor 334. The stiffener 339 is an asymmetric stiffener. Any type of stiffener or other component or configuration referenced in U.S. provisional patent application 61/711,988, filed Oct. 10, 2012, which is hereby incorporated by reference herein in its entirety, can be used in any embodiment of the present disclosure. It is noted that some embodiments may not include the stiffener 339. FIG. 19 further shows electrical connectors 345 connecting with respective anode and cathode terminals of the motor 334. The electrical connectors 345 can connect with respective traces of the flexible circuit 349. The flexible circuit 349 can be configured similarly to the layering of the dielectric layer 42, the traces 60 of conductive material layer 44, and the coverlay 46 of the previously described suspension 10.

FIG. 20 is an isometric view of the opposite side of the flexure 312 and without the slider 332 with respect to the view of FIG. 19. FIGS. 21-25 are isometric views of the flexure 312 and DSA structure 314. Specifically, FIGS. 21-25 show the various layers that comprise the flexure 312 and DSA structure 314. FIG. 21 is the drawing of FIG. 19 but with a stiffener 339 removed from the motor 334. As shown in FIG. 21, the motor 334 includes a non-conductive section 338 on the motor 334 which can isolate the anode and cathode terminals of the motor 334. FIG. 22 is the drawing of FIG. 19 but with the motor 334 removed to further show details of the tongue 333. FIG. 22 shows the pair of struts 356. As shown in FIG. 22, the suspension 310 includes a motor pad 341 on the stainless steel layer 340. The motor pad 341 can be a viscoelastic material, and may further be adhesive to attach to the tongue 333 and/or the motor 334. The motor pad 341 can dampen vibration. The motor pad 341 or other damper can be configured as described in U.S. provisional patent application 61/711,988, filed Oct. 10, 2012, previously incorporated herein. FIG. 22 further shows two strips of adhesive 343. The adhesive 343 can be a non-conductive adhesive such as epoxy. As shown, the strips of adhesive 343 are placed on the spring arms 352 of the stainless steel layer 340. The strips of adhesive 343 can attach the motor 334 to the pair of spring arms 352. FIG. 23 is the drawing of FIG. 22 but with the electrical connectors 345 removed to reveal the conductive pads 347 respectively positioned on the spring arms 352. The electrical connectors 345 can comprise solder, conductive epoxy (e.g., silver filled), or other material for forming an electrode connection. The electrical connectors 345 can electrically connect with respective anode and cathode terminals of the motor 334. The conductive pads 347 can comprise copper surfaces on a dielectric layer. The conductive pads 347 can electrically connect with respective circuits of the flexible circuit 349 for controlling an electrical signal applied across the motor 334.

FIG. 24 is the drawing of FIG. 23 but with the motor pad 341 and the strips of adhesive 343 removed. FIG. 25 shows only the stainless steel layer 340. As shown in FIG. 25, the stainless steel layer 340 forms the spring arms 352, the struts 356, and the tongue 333. The pair of struts 356 is the only part of the stainless steel layer 340 that connects or otherwise supports the tongue 333 between the spring arms 352. Specifically, the struts 356 can be the only structural linkage between the spring arms 352 and the tongue 333. Also, the struts 356, in connecting with the tongue 333, can be the only part of the stainless steel layer 340 that connects between the spring arms 352 distal of the base portion 350. As shown, the struts 356 are offset from one another with respect to the longitudinal axis of the flexure 312 or otherwise configured so as to provide for rotational movement of the tongue 333 about the tracking axis with respect to the spring arms 352. As best shown in FIG. 22, one strut 356 of the pair of struts 356 is located proximally of the motor 334 while the other of the pair of struts 356 is located distally of the motor 334 such that the motor 334 is between the pair of struts 356. Each strut 356 has a longitudinal axis that extends generally perpendicular with the longitudinal axis of the suspension 310. The longitudinal axes of the struts 356 extend parallel but do not intersect or otherwise overlap with each other when the struts 356 are not stressed (e.g., not bent). As shown in FIG. 25, the struts 356 can each be the narrowest part of the stainless steel layer 340 in an X-Y plane while the thickness of the stainless steel layer 340 can be consistent along the flexure 312.

FIG. 26 is a side view of the suspension 310, illustrating the gimbal 324 and DSA structure 314. As shown, the dimple 36, which is a structure formed in the stainless steel of the loadbeam 318 and which extends from the loadbeam 318, engages the stiffener 339 or, alternatively, the motor 334, and functions as a load point by urging the portion of the gimbal 324 to which the motor 334 is connected out of plane with respect to the base portion 350 of the flexure 312. A bend or transition in the flexure 312 can occur at any desired location along the spring arms 352 due to the urging of the gimbal 324 by the dimple 336. In some embodiments, the motor 334 is structurally attached to the tongue 333 at a location between the opposite lateral end portions of the tongue 333. In such embodiments, the motor 334 can be attached to the tongue 333 in addition to the motor 334 being attached to the spring arms 352. In some other embodiments, the motor 334 is attached to the spring arms 352 but is not attached to the tongue 333 to allow the motor 334 to move relative to the tongue 333.

FIG. 27 shows a detailed view of the motor 334 mounted on the flexure 312. As shown, the electrical connectors 345 are bonded to the conductive pads 347 and wrap around to the top of the motor 334 to mechanically and electrically connect with terminals of the motor 334. FIG. 28 shows a front view of the flexure 312 which further shows the electrical connectors 345 wrapping around to the top of the motor 334. As shown in FIG. 28, the stiffener comprises a top layer 348 and a bottom layer 351. The top layer 348 can comprises a layer of metal material, such as stainless steel. The bottom layer 351 can comprises an adhesive, the adhesive separating and coupling the top layer 348 and the top side of the motor 334.

The operation of DSA structure 314 can be described with reference to FIGS. 29A-29C, each showing an overhead view of the flexure 312 during some stage of activation or non-activation of the motor 334. As shown in FIG. 29B, the DSA structure 314 and tongue 333 are in a neutral, undriven state with the tongue 333 generally centrally located between the spring arms 352 when no tracking drive signal is applied to the motor 334. As shown in FIG. 29A, when a first potential (e.g., positive) tracking drive signal is applied to the motor 334, the shape of the motor changes and its length generally expands. This change in shape, in connection with the mechanical action of the linkage including struts 356, causes the tongue 333 to move or rotate in a first direction with respect to the spring arms 352 about the tracking axis. As shown, the lengthening of the motor 334 stretches the gimbal 324 laterally and causes the struts 356 to bend (e.g., bow inward). Because of the offset arrangement of the struts 356, the struts 356 bend such that the tongue 333 rotates in the first direction.

As shown in FIG. 29C, when a second potential (e.g., negative) tracking drive signal is applied to the motor 334, the shape of the motor changes and its length generally contracts. This change in shape, in connection with the mechanical action of the linking struts 356, causes the tongue 333 to move or rotate in a second direction with respect to the spring arms 352 about the tracking axis. The second direction is opposite the first direction. As shown, the shortening of the motor 334 compresses the gimbal 324 laterally and causes the struts 356 to bend (e.g., bow outward). Because of the offset arrangement of the struts 356, the struts 356 bend such that the tongue 333 rotates in the second direction. Some, although relatively little, out-of-plane motion of other portions of the gimbal 324 may be produced during the tracking action of DSA structure 314 as described above. With this embodiment of the invention, the flexure slider mounting region on the tongue 333 generally rotates with respect to the spring arms 352 as the spring arms 352 stay stationary or experience little movement.

FIG. 30 shows an overhead view of a flexure 412. The flexure 412 can be embodied in the suspension 10 of FIGS. 1-8C or other suspension. The flexure 412 can be configured similarly to the flexure 12 of FIGS. 1-8C except as otherwise described or shown. FIGS. 31A-C are overhead views of the stainless steel side of the gimbal 424 of the flexure 412 shown in different movement states and without a motor 434 to reveal further aspects of the flexure 412. The flexure 412 includes a base portion 450 and spring arms 452 branching therefrom. The spring arms 452 include support regions 458, which can respectively serve as motor mounting pads. As shown in FIG. 30, a motor 434 is mounted on the flexure 412. Specifically, opposite longitudinal ends of the motor 434 are mounted on the support regions 458. Adhesive can be used to mount the motor 434 as described herein. A slider (not shown) can be mounted to the tongue 433 in any manner referenced herein, such as similarly to the embodiment of FIGS. 1-8C. For example, the slider can be located on the opposite side of the flexure 412 with respect to the motor 434.

As shown in FIG. 31A, the tongue 433 is connected to the spring arms 452 (specifically the support regions 458) by a pair of struts 456. The tongue 433, struts 456, spring arms 452, and base portion 450 can be formed from a stainless steel layer 440 (or other type of metal). The flexure 412 includes a gimbal 424 which can function as other gimbals discussed herein. While the flexure 12 of FIGS. 1-8C show struts 56 having respective longitudinal axes that are parallel with each other and parallel with a longitudinal axis of the motor 34, the struts 456 of the flexure 412 have respective longitudinal axes that are parallel with respect to each other but that are not parallel with respect to the longitudinal axis of the motor 434. In yet another embodiment, a flexure can be similar to that shown in FIG. 31A except that the longitudinal axes of the struts of the flexure do not extend parallel with respect to each other and neither of the longitudinal axes of the struts extend parallel with the longitudinal axis of the motor. Returning to the embodiment of FIG. 31A, the pair of struts 456 is the only part of the stainless steel layer 440 that connects or otherwise structurally supports the tongue 433 between the spring arms 452. Specifically, the struts 456 can be the only structural linkage between the spring arms 452 and the tongue 433. Also, the struts 456, in connecting with the tongue 433, can be the only part of the stainless steel layer 440 that connects between the spring arms 452 distal of the base portion 450.

The operation of the DSA structure of the flexure 412 can be described with reference to FIGS. 31A-C. As shown in FIG. 31A, the tongue 433 is in a neutral, undriven state with the tongue 433 generally centrally located between the spring arms 452 when no tracking drive signal is applied to the motor 434 (shown in FIG. 30 but not shown in FIGS. 31A-C). When a first potential (e.g., positive) tracking drive signal is applied to the motor 434, the shape of the motor changes and its length generally expands. This change in shape increases the distance between the support regions 458 as shown in FIG. 31B, which in connection with the mechanical action of the linking struts 456 causes the tongue 433 to move or rotate in a first direction with respect to the spring arms 452 about the tracking axis. As shown, the lengthening of the motor 434 stretches the gimbal 424 laterally and causes the struts 456 to bend (e.g., bow inward). Because of the offset arrangement of the struts 456, the struts 456 bend such that the tongue 433 rotates in the first direction.

When a second potential (e.g., negative) tracking drive signal is applied to the motor 434, the shape of the motor changes and its length generally contracts. This change in shape decreases the distance between the support regions 458 as shown in FIG. 31C, which in connection with the mechanical action of the linking struts 456 causes the tongue 433 to move or rotate in a second direction with respect to the spring arms 452 about the tracking axis. The second direction is opposite the first direction. As shown, the shortening of the motor 434 compresses the gimbal 424 laterally and causes the struts 456 to bend (e.g., bow outward). Because of the offset arrangement of the struts 456, the struts 456 bend such that the tongue 433 rotates in the second direction. Some, although relatively little, out-of-plane motion of other portions of the gimbal 424 is produced during the tracking action as described above. With this embodiment of the invention the, flexure slider mounting region on the tongue 433 generally rotates with respect to the spring arms 452 as the spring arms 452 stay stationary or experience little movement.

It is noted that the embodiments of FIGS. 1-31C show various DSA structures that are actuated by a single motor. It will be understood, however, that multiple motors could alternatively be used in various embodiments while utilizing aspects of the invention.

Embodiments of the invention offer important advantages. For example, in some cases they can significantly increase servo bandwidth (e.g., from about 3-4 kHz for baseplate or loadbeam based DSA structures to 5-8 kHz or more). Stroke can be increased. The DSA structures can be efficiently manufactured.

Although the present invention has been described with reference to preferred embodiments, those skilled in the art will recognize that changes can be made in form and detail without departing from the spirit and scope of the invention. Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

The invention claimed is:

1. A gimbaled flexure having a dual stage actuation (DSA) structure, comprising:
    a flexure comprising:
        a pair of spring arms;
        a tongue located between the spring arms and structurally supported by the pair of spring arms; and
        a pair of struts, the struts positioned respectively between the pair of spring arms and the tongue, each strut connecting a respective one of the pair of spring arms to the tongue by extending inwardly from the spring arm to the tongue, each strut elongated along a respective longitudinal axis, the longitudinal axes of the struts parallel and offset with respect to each other;
    a slider mounting; and
    a motor mounted on the flexure, the motor having a longitudinal axis that is parallel with the longitudinal axes of the struts, wherein electrical activation of the motor bends the pair of struts to rotate the tongue and the slider mounting about a tracking axis.

2. The gimbaled flexure of claim 1, wherein each of the spring arms, the tongue, and the pair of struts are formed from a layer of metal.

3. The gimbaled flexure of claim 1, wherein the flexure is cantilevered from a loadbeam and gimbaled about a dimple of the loadbeam.

4. The gimbaled flexure of claim 1, wherein a first strut of the pair of struts is located proximal of the motor and a second strut of the pair of struts is located distal of the motor.

5. The gimbaled flexure of claim 1, wherein opposite ends of the motor are respectively mounted on the spring arms.

6. The gimbaled flexure of claim 1, wherein the slider mounting is a surface on a first side of the tongue and the motor is positioned on a second side of the tongue that is opposite the first side of the tongue.

7. The gimbaled flexure of claim 1, further comprising a slider mounted on the slider mounting.

8. The gimbaled flexure of claim 1, wherein the tongue rotates and the pair of spring arms remain relatively stationary when the motor is electrically activated.

9. The gimbaled flexure of claim 1, further comprising a loadbeam, the loadbeam comprising a dimple, wherein the flexure gimbals about the dimple, and the dimple impinges on the motor.

10. The gimbaled flexure of claim 9, wherein an electrical connection is made with a terminal on the motor through contact between the dimple and the terminal.

11. The gimbaled flexure of claim 1, wherein each of the pair of spring arms, the tongue, and the pair of struts are formed from a layer of metal, and the pair of struts is the only part of the layer of metal that connects the spring arms to the tongue.

12. The gimbaled flexure of claim 1, wherein the slider mounting is a surface on the motor.

13. A gimbaled flexure having a dual stage actuation (DSA) structure, comprising:
a flexure comprising a metal layer, the metal layer defining:
a pair of spring arms;
a tongue located between the spring arms; and
a pair of struts, the pair of struts respectively connecting the pair of spring arms to the tongue, wherein the pair of struts is the only part of the metal layer that connects the spring arms to the tongue;
a slider mounting on the tongue; and
a motor having opposite ends respectively mounted on the pair of spring arms, wherein electrical activation of the motor bends the pair of struts to rotate the slider mounting about a tracking axis.

14. The gimbaled flexure of claim 13, wherein each strut connects a respective one of the pair of spring arms to the tongue by extending inwardly from the spring arm to the tongue.

15. The gimbaled flexure of claim 13, wherein the pair of struts are longitudinally offset with respect to each other.

16. The gimbaled flexure of claim 13, further comprising a loadbeam, wherein the loadbeam comprises a loadpoint dimple and the flexure is cantilevered from the loadbeam and gimbaled about the dimple.

17. The gimbaled flexure of claim 16, wherein the dimple impinges on the motor.

18. The gimbaled flexure of claim 17, wherein an electrical connection is made with a terminal on the motor through contact between the dimple and the terminal.

19. The gimbaled flexure of claim 13, wherein a first strut of the pair of struts is located proximal of the motor and a second strut of the pair of struts is located distal of the motor.

20. The gimbaled flexure of claim 13, wherein the slider mounting is a surface on a first side of the tongue and the motor is positioned on a second side of the tongue that is opposite the first side of the tongue.

21. The gimbaled flexure of claim 13, wherein the tongue rotates and the pair of spring arms remain relatively stationary when the motor is electrically activated.

22. The gimbaled flexure of claim 13, further comprising a pair of conductor pads respectively located on the pair of spring arms, wherein the motor comprises a pair of terminals and the pair of terminals is electrically connected with the pair of conductor pads, respectively.

23. The gimbaled flexure of claim 13, wherein:
each strut of the pair of struts has a respective longitudinal axis and the longitudinal axes of the struts are parallel with respect to each other; and
the motor has a longitudinal axis that is not parallel with the longitudinal axes of the struts.

24. The gimbaled flexure of claim 13, wherein:
each strut of the pair of struts has a respective longitudinal axis and the longitudinal axes of the struts are not parallel with respect to each other; and
the motor has a longitudinal axis that is not parallel with either of the longitudinal axes of the struts.

25. A gimbaled flexure having a dual stage actuation (DSA) structure, comprising:
a flexure comprising:
a pair of spring arms;
a tongue located between the spring arms and structurally supported by the pair of spring arms; and
a pair of motor mounting pads, the motor mounting pads respectively connected to the tongue by a pair of struts, wherein the pair of struts are longitudinally offset with respect to each other and the struts are not attached to the spring arms;
a slider mounting; and
a motor having opposite ends respectively mounted on the pair of motor mounting pads, wherein the slider mounting is located on the motor and electrical activation of the motor bends the pair of struts and moves to rotate the slider mounting about a tracking axis.

26. The gimbaled flexure of claim 25, wherein the tongue does not rotate about the tracking axis while the slider mounting is moved about the tracking axis by electrical activation of the motor.

27. The gimbaled flexure of claim 25, wherein each of the spring arms, the tongue, and the pair of struts are formed from a layer of metal.

* * * * *

UNITED STATES PATENT AND TRADEMARK OFFICE
CERTIFICATE OF CORRECTION

| | |
|---|---|
| PATENT NO. | : 8,681,456 B1 |
| APPLICATION NO. | : 14/026427 |
| DATED | : March 25, 2014 |
| INVENTOR(S) | : Mark A. Miller et al. |

It is certified that error appears in the above-identified patent and that said Letters Patent is hereby corrected as shown below:

In the Claims:

In Claim 25, column 16, line 43, delete "and moves".

Signed and Sealed this
Twenty-fourth Day of June, 2014

Michelle K. Lee
*Deputy Director of the United States Patent and Trademark Office*